US010968350B2

(12) United States Patent
Shen

(10) Patent No.: US 10,968,350 B2
(45) Date of Patent: Apr. 6, 2021

(54) ADHESIVE COMPOSITIONS AND METHODS

(71) Applicant: Saudi Aramco Technologies Company, Dhahran (SA)

(72) Inventor: Chin-Chang Shen, Missouri City, TX (US)

(73) Assignee: Saudi Aramco Technologies Company, Dhahran (SA)

( * ) Notice: Subject to any disclaimer, the term of this patent is extended or adjusted under 35 U.S.C. 154(b) by 57 days.

(21) Appl. No.: 16/207,420

(22) Filed: Dec. 3, 2018

(65) Prior Publication Data

US 2019/0177536 A1 Jun. 13, 2019

Related U.S. Application Data

(60) Provisional application No. 62/595,227, filed on Dec. 6, 2017.

(51) Int. Cl.

| | | |
|---|---|---|
| *C08G 81/02* | (2006.01) | |
| *C09J 175/04* | (2006.01) | |
| *C08F 214/26* | (2006.01) | |
| *C08F 210/02* | (2006.01) | |
| *C08L 53/00* | (2006.01) | |
| *C08L 75/14* | (2006.01) | |
| *C09D 175/04* | (2006.01) | |
| *C08G 18/48* | (2006.01) | |
| *C08G 18/10* | (2006.01) | |
| *C08G 18/80* | (2006.01) | |
| *C08G 18/76* | (2006.01) | |
| *C08G 18/42* | (2006.01) | |
| *C08G 18/44* | (2006.01) | |
| *C08G 18/72* | (2006.01) | |
| *C09J 175/14* | (2006.01) | |
| *C08F 210/06* | (2006.01) | |

(52) U.S. Cl.
CPC .............. *C08L 75/14* (2013.01); *C08G 18/10* (2013.01); *C08G 18/42* (2013.01); *C08G 18/44* (2013.01); *C08G 18/48* (2013.01); *C08G 18/724* (2013.01); *C08G 18/76* (2013.01); *C08G 18/7621* (2013.01); *C08G 18/7671* (2013.01); *C08G 18/80* (2013.01); *C08G 81/024* (2013.01); *C09D 175/04* (2013.01); *C09J 175/04* (2013.01); *C08F 210/02* (2013.01); *C08F 210/06* (2013.01); *C08F 214/26* (2013.01); *C08G 2150/90* (2013.01); *C08G 2170/20* (2013.01); *C08L 53/00* (2013.01); *C09J 175/14* (2013.01)

(58) Field of Classification Search
CPC ......... C09J 175/04; C08L 27/12; C08L 75/04; C08L 75/06; C08L 75/08; C08L 75/10; C08L 75/14; C08L 53/00
See application file for complete search history.

(56) References Cited

U.S. PATENT DOCUMENTS

| | | |
|---|---|---|
| 6,323,389 B1 | 11/2001 | Thomas et al. |
| 6,669,887 B2 | 12/2003 | Hilston et al. |
| 6,787,624 B2 | 9/2004 | Coates et al. |
| 6,805,872 B2 | 10/2004 | Mougin |
| 6,824,734 B2 | 11/2004 | Boggs et al. |
| 7,119,154 B2 | 10/2006 | Coates et al. |
| 7,300,994 B2 | 11/2007 | Coates et al. |
| 7,560,523 B2 | 7/2009 | Coates et al. |
| 7,582,716 B2 | 9/2009 | Liang et al. |
| 7,842,770 B2 | 11/2010 | Liang et al. |
| 7,879,270 B2 | 2/2011 | Varma et al. |
| 7,888,444 B2 | 2/2011 | Coates et al. |
| 7,923,505 B2 | 4/2011 | Zhou et al. |
| 8,012,558 B2 | 9/2011 | Behrens |
| 8,389,655 B2 | 3/2013 | Arriola et al. |
| 8,551,196 B2 | 10/2013 | Chadha |
| 8,933,156 B2 | 1/2015 | Castelluccio et al. |
| 8,940,839 B2 | 1/2015 | Hagadorn et al. |
| 9,301,914 B1 | 4/2016 | Rustici et al. |
| 9,611,342 B2 | 4/2017 | Banat et al. |
| 9,663,645 B2 | 5/2017 | Esseghir et al. |
| 9,848,619 B2 | 12/2017 | Liu et al. |
| 2010/0055358 A1* | 3/2010 | Weaver ................ C09D 123/02 428/17 |
| 2011/0230108 A1* | 9/2011 | Arriola .................. C08F 10/00 442/327 |
| 2012/0060997 A1 | 3/2012 | Mitchell et al. |
| 2016/0151272 A1 | 6/2016 | Alves et al. |
| 2017/0247536 A1 | 8/2017 | Peng et al. |

(Continued)

FOREIGN PATENT DOCUMENTS

| | | |
|---|---|---|
| EP | 0 293 602 A2 | 12/1988 |
| EP | 0 420 246 A1 | 4/1991 |
| JP | 2009-091385 A | 4/2009 |

(Continued)

OTHER PUBLICATIONS

International Search Report for PCT/US2018/063560, 5 pages (dated Mar. 11, 2019).

(Continued)

*Primary Examiner* — Jeffrey C Mullis

(74) *Attorney, Agent, or Firm* — Choate, Hall & Stewart LLP; John P. Rearick; Nicholas J. Pace

(57) ABSTRACT

The present invention encompasses compositions comprising a polyurethane and a block copolymer with at least two homopolymer subunits. In one aspect, compositions of the present disclosure are coating compositions. In another aspect, compositions of the present disclosure are adhesive compositions.

20 Claims, No Drawings

(56) References Cited

U.S. PATENT DOCUMENTS

2017/0342251 A1    11/2017    Diehl et al.

FOREIGN PATENT DOCUMENTS

| WO | WO-99/17926 A1 | 4/1999 |
|----|----|----|
| WO | WO-2001/089470 A1 | 11/2001 |
| WO | WO-2003/025025 A1 | 3/2003 |
| WO | WO-2003/031151 A1 | 4/2003 |
| WO | WO-2005/090426 A1 | 9/2005 |
| WO | WO-2006/057850 A2 | 6/2006 |
| WO | WO-2007/117267 A2 | 10/2007 |
| WO | WO-2009/155155 A1 | 12/2009 |
| WO | WO-2010/103191 A1 | 9/2010 |
| WO | WO-2012/061032 A1 | 5/2012 |
| WO | WO-2014/026122 A2 | 2/2014 |
| WO | WO-2014/036292 A1 | 3/2014 |
| WO | WO-2014/101154 A1 | 7/2014 |
| WO | WO-2015/001069 A1 | 1/2015 |
| WO | WO-2015/054896 A1 | 4/2015 |
| WO | WO-2015/078816 A1 | 6/2015 |
| WO | WO-2017/205774 A1 | 11/2017 |
| WO | WO-2019/112930 A1 | 6/2019 |

OTHER PUBLICATIONS

Eagan, J.M. et al., Combining polyethylene and polypropylene: Enhanced performance with PE/iPP multiblock polymers, Science, 355: 814-816 (2017).

Fleischman, T., Polymer additive could revolutionize plastics recycling, Cornell Chronicle, 6 pages (Feb. 23, 2017). URL: http://news.cornell.edu/stories/2017/02/polymer-additive-could-revolutionize-plastics-recy . . . [Retrieved Sep. 13, 2017].

KRATONTM Polymers for Modification of Thermoplastics, 20 pages (Retrieved Sep. 14, 2017).

* cited by examiner

ADHESIVE COMPOSITIONS AND METHODS

CROSS-REFERENCE TO RELATED APPLICATIONS

This application claims priority to U.S. Provisional Patent Application No. 62/595,227, filed Dec. 6, 2017, the entire of which is hereby incorporated by reference.

FIELD OF THE INVENTION

This invention pertains to the field of adhesive compositions. More particularly, the invention pertains to compositions comprising a polyurethane and a block copolymer. Such compositions may be used for improving adhesion onto low energy substrates as well as joining two substrates to one another.

BACKGROUND OF THE INVENTION

Polyurethane adhesives are a unique urethanes product group that vary widely in composition and are used in many different applications and market segments. Typical product forms include reactive types such as 1-component, 2-component and hot-melt compositions, as well as non-reactive types such as solvent-borne, water-borne and hot-melt compositions, among others.

Polyurethane adhesives are normally defined as those adhesives that contain a number of urethane groups in the molecular backbone of a polymer comprising the adhesive or which are formed during use, regardless of the chemical composition of the rest of the chain. Thus a typical urethane adhesive may contain, in addition to urethane linkages, aliphatic and aromatic hydrocarbons, esters, ethers, amides, urea and allophonate groups. An isocyanate group reacts with the hydroxyl groups of a polyol to form the repeating urethane linkage. Isocyanates will react with water to form a urea linkage and carbon dioxide as a by-product. Linear polyurethane adhesives may be obtained by using compounds with two reactive groups such as diisocyanates and diols. When polyols with three or more hydroxyl groups (i.e. a functionality of 3 or more) are reacted with a polyisocyanate, or when isocyanates with three or more isocyanate groups are reacted with a polyol the resulting polymer is crosslinked. In reaction systems where there is an excess of isocyanate, crosslinking reactions may occur. Often, excess isocyante in the composition reacts with atmospheric water or moisture contained in the substrate.

One component adhesives are usually viscous liquid isocyanate-terminated pre-polymers at room temperature. They set by reaction of the free isocyantes groups with atmospheric moisture or with moisture contained in the substrate to form polyurea groups. They typically do not require mixing with other components before curing. The prepolymers are prepared by reacting an excess of isocyanate with polyols. If the functionality of the prepolymer is greater than two the cured film will be chemically crosslinked.

Two component polyurethane adhesive compositions generally comprise components that are liquids or pastes at room temperature before they are mixed together. The first component of the composition comprises a polyol and other ingredients, such as chain extenders, catalysts, blocking agents and other additives as desired. The second component comprises monomeric, polymeric or prepolymeric polyisocyanate. In order to make a bond, the two components of the adhesive are fully mixed together and the composition is then applied to a substrate. The mixed composition then initiates cure and develops bonding strength while transforming into a solid form. The curing reaction takes place between the free isocyanate groups and the active hydrogens from the polyol. If there are excess free isocyanate groups after the main curing reaction, the excess free isocyanate groups are cured by ambient or surface moisture from the substrates. The isocyanates and polyols employed may have a functionality of two or higher to provide crosslinking in the adhesive.

Reactive hot melt adhesives are characterized as a readily meltable polyisocyanate polyurethane (NCO prepolymer) which is usually solid or highly viscous at room temperature. They set both physically by cooling and chemically by reaction with atmospheric moisture. Depending on the formulation, reactive polyurethane hot-melt adhesives cure to form elastomers with flexible to hard properties and tough adhesive layers. The prepolymers typically have a low free isocyanate content.

Non-reactive solvent borne and water borne adhesives typically consist of a hydroxyl terminated polyurethane dissolved in a solvent. The polyurethanes are usually obtained by reacting a diol with a diisocynate. The polymer solutions are applied to both substrate surfaces to be bonded, sometime is allowed for the solvents to evaporate and the surfaces are bonded together, at which point interdiffusions of the polymer chains will occur.

Non-reactive hot melt adhesives typically consist of linear chains that are solid at room temperature and are often used in the lamination of textiles although they have many other applications. They usually consist of hydroxyl-terminated polyurethanes that form the adhesive bond by cooling from the molten state. In some cases these are also known as thermoplastic polyurethane adhesives.

However, in some cases, traditional polyurethane adhesive compositions do not adhere well to low energy substrates. In some cases, traditional methods utilize surface treatment or the use of primer to improve adhesion. In other cases, an additional low energy polymer is added to the polyol component and thereby incorporated into the resulting polyurethane composition; however, these polyurethane compositions typically require substantial amounts of the additional low energy polymer and result in materials with diminished adhesive properties. Thus, there remains a need for new polyurethane adhesive compositions with improved adhesion to low energy substrates, particular those that do not require surface treatment or the use of primer.

SUMMARY OF THE INVENTION

In one aspect, the present invention encompasses compositions comprising a polyurethane and a block copolymer with at least two homopolymer subunits. In one aspect, the block copolymer comprises at least two homopolymer subunits selected from the group consisting of polyolefins and fluoropolymers.

As noted above, such compositions are different from existing polyurethane adhesive compositions. In certain embodiments, the incorporation of such a block copolymer leads to unique and unexpected properties in the resulting polyurethane adhesives. In certain aspects, a composition of the present disclosure comprising a polyurethane and a block copolymer have unexpectedly superior properties relative to those lacking the block copolymer. For example, in some embodiments, a composition comprising a polyurethane and a block copolymer has improved adhesion to low energy substrates relative to those polyurethane compositions lacking the block copolymer.

In another aspect, the present disclosure provides substrates coated with a composition comprising a polyurethane and a block copolymer. In some embodiments, the substrate comprises a first polyolefin and the block copolymer comprises one or more subunits of the first polyolefin and one or more subunits of a second polyolefin that is structurally different from the first polyolefin.

In another aspect, the present invention provides methods for using the adhesive polyurethane compositions comprising block copolymers. In some embodiments, the present disclosure provides a method of joining two substrates using the polyurethane composition comprising block copolymers, the method comprising the steps of applying said adhesive composition to the surface of at least one of the two substrates, arranging the two substrates so that the surface of both the substrates are in contact with the adhesive composition, and curing the adhesive composition.

In another aspect, compositions of the present disclosure are coating compositions. In some embodiments, the present disclosure provides methods of coating a substrate with a coating composition according to the present invention.

DEFINITIONS

Definitions of specific functional groups and chemical terms are described in more detail below. For purposes of this invention, the chemical elements are identified in accordance with the Periodic Table of the Elements, CAS version, Handbook of Chemistry and Physics, $75^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, $5^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, $3^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain embodiments, mixtures of enantiomers or diastereomers are provided.

Certain compounds described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound or polymer is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high-pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGraw-Hill, N Y, 1962); Wilen, S. H. *Tables of Resolving Agents and Optical Resolutions* p. 268 (E. L. Eliel, Ed., Univ. of Notre Dame Press, Notre Dame, Ind. 1972).

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of substantially alternating units derived from $CO_2$ and an epoxide (e.g., poly(ethylene carbonate). In certain embodiments, a polymer of the present invention is a copolymer, terpolymer, heteropolymer, block copolymer, or tapered heteropolymer incorporating two or more different epoxide monomers. With respect to the structural depiction of such higher polymers, the convention of showing enchainment of different monomer units separated by a slash may be used as depicted herein, e.g.,

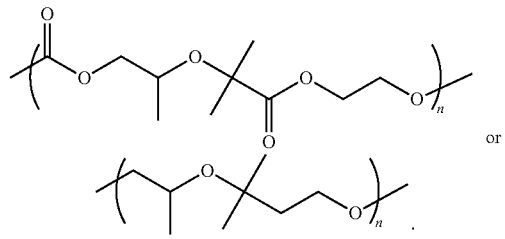

These structures are to be interpreted to encompass copolymers incorporating any ratio of the different monomer units depicted unless otherwise specified. This depiction is also meant to represent random, tapered, block co-polymers, and combinations of any two or more of these and all of these are implied unless otherwise specified.

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-40 carbon atoms. In certain embodiments, aliphatic groups contain 1-20 carbon atoms. In certain embodiments, aliphatic groups contain 3-20 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in some embodiments aliphatic groups contain 1-3 carbon atoms, and in some embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, sulfur, nitrogen, or phosphorus. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated or partially unsaturated groups.

As used herein, the term "bivalent $C_{1-8}$ (or $C_{1-3}$) saturated or unsaturated, straight or branched, hydrocarbon chain", refers to bivalent alkyl, alkenyl, and alkynyl, chains that are straight or branched as defined herein.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In certain embodiments, the term "3- to 7-membered carbocycle" refers to a 3- to 7-membered saturated or partially unsaturated monocyclic carbocyclic ring. In certain embodiments, the term "3- to 8-membered carbocycle" refers to a 3- to 8-membered saturated or partially unsaturated monocyclic carbocyclic ring. In certain embodiments, the terms "3- to 14-membered carbocycle" and "$C_{3-14}$ carbocycle" refer to a 3- to 8-membered saturated or partially unsaturated monocyclic carbocyclic ring, or a 7- to 14-membered saturated or partially unsaturated polycyclic carbocyclic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in some embodiments alkyl groups contain 1-3 carbon atoms, and in some embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in some embodiments alkenyl groups contain 2-3 carbon atoms, and in some embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in some embodiments alkynyl groups contain 2-3 carbon atoms, and in some embodiments alkynyl groups contain 2 carbon atoms. Representative alkynyl groups include, but are not limited to, ethynyl, 2-propynyl (propargyl), 1-propynyl, and the like.

The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy.

The term "acyl," as used herein, refers to a carbonyl-containing functionality, e.g., —C(=O)R, wherein R is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like. In certain embodiments, the terms "6- to 10-membered aryl" and "$C_{6-10}$ aryl" refer to a phenyl or an 8- to 10-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 12-membered heteroaryl" refers to a 5- to 6-membered heteroaryl ring having 1 to 3 heteroatoms independently selected from nitrogen, oxygen, or sulfur, or an 8- to 12-membered bicyclic heteroaryl ring having 1 to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^{+}$NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —(CH$_2$)$_{0-4}$R$^\circ$; —(CH$_2$)$_{0-4}$OR$^\circ$; —O—(CH$_2$)$_{0-4}$C(O)OR$^\circ$; —(CH$_2$)$_{0-4}$CH(OR$^\circ$)$_2$; —(CH$_2$)$_{0-4}$SR$^\circ$; —(CH$_2$)$_{0-1}$Ph, which may be substituted with R$^\circ$; —(CH$_2$)$_{0-4}$O(CH$_2$)$_{0-4}$Ph which may be substituted with R$^\circ$; —CH=CHPh, which may be substituted with R$^\circ$; —NO$_2$; —CN; —N$_3$; —(CH$_2$)$_{0-4}$N(R$^\circ$)$_2$; —(CH$_2$)$_{0-4}$N(R$^\circ$)C(O)R$^\circ$; —N(R$^\circ$)C(S)R$^\circ$; —(CH$_2$)$_{0-4}$N(R$^\circ$)C(O)NR$^\circ$$_2$; —N(R$^\circ$)C(S)NR$^\circ$$_2$; —(CH$_2$)$_{0-4}$N(R$^\circ$)C(O)OR$^\circ$; —N(R$^\circ$)N(R$^\circ$)C(O)R$^\circ$; —N(R$^\circ$)N(R$^\circ$)C(O)NR$^\circ$$_2$; —N(R$^\circ$)N(R$^\circ$)C(O)OR$^\circ$; —(CH$_2$)$_{0-4}$C(O)R$^\circ$; —C(S)R$^\circ$; —(CH$_2$)$_{0-4}$C(O)OR$^\circ$; —(CH$_2$)$_{0-4}$C(O)N(R$^\circ$)$_2$; —(CH$_2$)$_{0-4}$C(O)SR$^\circ$; —(CH$_2$)$_{0-4}$C(O)OSiR$^\circ$$_3$; —(CH$_2$)$_{0-4}$OC(O)R$^\circ$; —OC(O)(CH$_2$)$_{0-4}$SR—, SC(S)SR$^\circ$; —(CH$_2$)$_{0-4}$SC(O)R$^\circ$; —(CH$_2$)$_{0-4}$C(O)NR$^\circ$$_2$; —C(S)NR$^\circ$$_2$; —C(S)SR$^\circ$; —SC(S)SR$^\circ$, —(CH$_2$)$_{0-4}$OC(O)NR$^\circ$$_2$; —C(O)N(OR$^\circ$)R$^\circ$; —C(O)C(O)R$^\circ$; —C(O)CH$_2$C(O)R$^\circ$; —C(NOR$^\circ$)R$^\circ$; —(CH$_2$)$_{0-4}$SSR$^\circ$; —(CH$_2$)$_{0-4}$S(O)$_2$R$^\circ$; —(CH$_2$)$_{0-4}$S(O)$_2$OR$^\circ$; —(CH$_2$)$_{0-4}$OS(O)$_2$R$^\circ$; —S(O)$_2$NR$^\circ$$_2$; —(CH$_2$)$_{0-4}$S(O)R$^\circ$; —N(R$^\circ$)S(O)$_2$NR$^\circ$$_2$; —N(R$^\circ$)S(O)$_2$R$^\circ$; —N(OR$^\circ$)R$^\circ$; —C(NH)NR$^\circ$$_2$; —P(O)$_2$R$^\circ$; —P(O)R$^\circ$$_2$; —OP(O)R$^\circ$$_2$; —OP(O)(OR$^\circ$)$_2$; SiR$^\circ$$_3$; —(C$_{1-4}$ straight or branched alkylene)O—N(R$^\circ$)$_2$; or —(C$_{1-4}$ straight or branched alkylene)C(O)O—N(R$^\circ$)$_2$, wherein each R$^\circ$ may be substituted as defined below and is independently hydrogen, C$_{1-8}$ aliphatic, —CH$_2$Ph, —O(CH$_2$)$_{0-4}$Ph, or a 5-6-membered saturated, partially unsaturated, or aryl ring having 0-4 heteroatoms independently selected from nitrogen, oxygen, or sulfur, or, notwithstanding the definition above, two independent occurrences of R$^\circ$, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R$^\circ$ (or the ring formed by taking two independent occurrences of R$^\circ$ together with their intervening atoms), are independently halogen, —(CH$_2$)$_{0-2}$R$^\bullet$, -(haloR$^\bullet$), —(CH$_2$)$_{0-2}$OH, —(CH$_2$)$_{0-2}$OR$^\bullet$, —(CH$_2$)$_{0-2}$CH(OR$^\bullet$)$_2$; —O(haloR$^\bullet$), —CN, —N$_3$, —(CH$_2$)$_{0-2}$C(O)R$^\bullet$, —(CH$_2$)$_{0-2}$C(O)OH, —(CH$_2$)$_{0-2}$C(O)OR$^\bullet$, —(CH$_2$)$_{0-4}$C(O)N(R$^\circ$)$_2$; —(CH$_2$)$_{0-2}$SR$^\bullet$, —(CH$_2$)$_{0-2}$SH, —(CH$_2$)$_{0-2}$NH$_2$, —(CH$_2$)$_{0-2}$NHR$^\bullet$, —(CH$_2$)$_{0-2}$NR$^\bullet$$_2$, —NO$_2$, —SiR$^\bullet$$_3$, —OSiR$^\circ$$_3$, —C(O)SR$^\bullet$, —(C$_{1-4}$ straight or branched alkylene)C(O)OR$^\bullet$, or —SSR$^\bullet$ wherein each R$^\bullet$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R$^\circ$ include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet$$_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^\dagger$, —NR$^\dagger$$_2$, —C(O)R$^\dagger$, —C(O)OR$^\dagger$, —C(O)C(O)R$^\dagger$, —C(O)CH$_2$C(O)R$^\dagger$, —S(O)$_2$R$^\dagger$, —S(O)$_2$NR$^\dagger$$_2$, —C(S)NR$^\dagger$$_2$, —C(NH)NR$^\dagger$$_2$, or —N(R$^\dagger$)S(O)$_2$R$^\dagger$; wherein each R$^\dagger$ is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^\dagger$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^\dagger$ are independently halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet$$_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

When substituents are described herein, the term "radical" or "optionally substituted radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent. The terms "radical" or "optionally-substituted radical" in this context are thus interchangeable with "group" or "optionally-substituted group".

As used herein, the "term head-to-tail" or "HT", refers to the regiochemistry of adjacent repeating units in a polymer chain. For example, in the context of poly(propylene carbonate) (PPC), the term head-to-tail based on the three regiochemical possibilities depicted below:

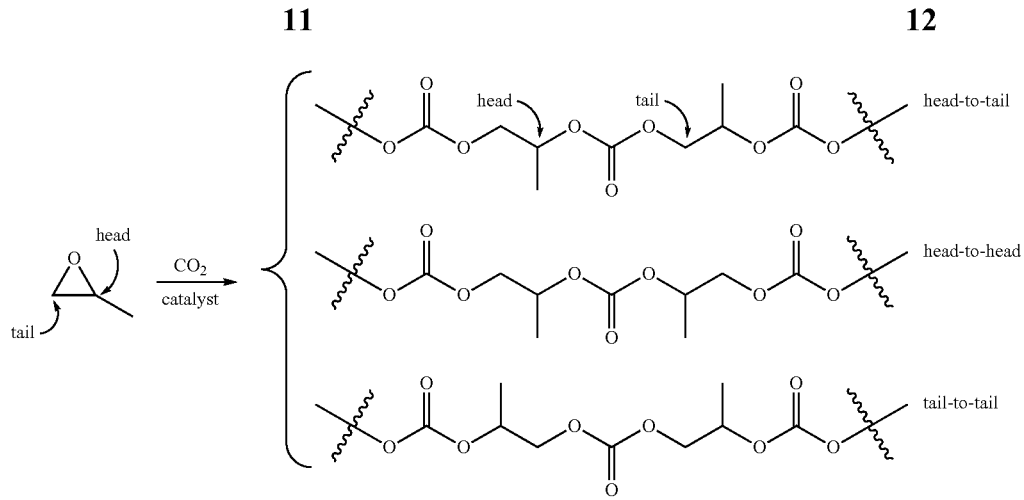

The term head-to-tail ratio (H:T) refers to the proportion of head-to-tail linkages to the sum of all other regiochemical possibilities. With respect to the depiction of polymer structures, while a specific regiochemical orientation of monomer units may be shown in the representations of polymer structures herein, this is not intended to limit the polymer structures to the regiochemical arrangement shown but is to be interpreted to encompass all regiochemical arrangements including that depicted, the opposite regiochemistry, random mixtures, isotactic materials, syndiotactic materials, racemic materials, and/or enantioenriched materials and combinations of any of these unless otherwise specified.

As used herein the term "alkoxylated" means that one or more functional groups on a molecule (usually the functional group is an alcohol, amine, or carboxylic acid, but is not strictly limited to these) has appended to it a hydroxy-terminated alkyl chain. Alkoxylated compounds may comprise a single alkyl group or they may be oligomeric moieties such as hydroxyl-terminated polyethers. Alkoxylated materials can be derived from the parent compounds by treatment of the functional groups with epoxides.

As used herein, the term "isocyanate index" means the excess of isocyanate over the theoretical amount for (1:1) reaction with all active protons in a polyurethane composition, expressed in percentage terms (i.e. 1:1=100). Thus, isocyanate index=100×(Actual amount of isocyanate used)/(Theoretical amount of isocyanate required)

DETAILED DESCRIPTION OF CERTAIN EMBODIMENTS

In one aspect, the present invention encompasses compositions comprising a polyurethane and a block copolymer with at least two homopolymer subunits. In some embodiments, the block copolymer comprises at least two homopolymer subunits selected from the group consisting of polyolefins and fluoropolymers. In certain embodiments, compositions of the present invention are adhesive compositions or coating compositions.

The field of polyurethane adhesive formulation and manufacture is well advanced. In some embodiments, the novel materials presented herein are formulated, processed, and/or used according to methods well known in the art. Combining knowledge of the art, with the disclosure and teachings herein, the skilled artisan will readily apprehend variations, modifications and applications of the inventive compositions and methods and such variations are specifically encompassed herein. The following references contain information on the formulation, manufacture and uses of polyurethane adhesives generally, the entire content of each of these references is incorporated herein by reference.

*Polyurethanes: Coatings Adhesives and Sealants*, Ulrich Maeier-Westhues, 2007 (ISBN 3-87870-334-1)

*The Polyurethanes Book*, J. Wiley & Sons, 2003 (ISBN 978-0470850411)

*Szycher's Handbook of Polyurethanes*, CRC Press LLC, 1999 (ISBN 0-8493-0602-7)

*Polyurethane Elastomers: From Morphology to Mechanical Aspects*, Springer-Verlag/Wein, 2011 (ISBN 978-3-7091-0513-9)

*Polyurethane Handbook*, Hanser, 1994 (ISBN 1569901570)

I. Polyurethanes

In certain embodiments, compositions of the present invention comprise a polyurethane. In certain embodiments, polyurethanes of the present invention are derived by combining two compositions: a first composition comprising one or more isocyanate compounds optionally containing diluents, solvents, coreactants and the like, and a second composition comprising one or more polyol compounds optionally with additional reactants, solvents, catalysts, or additives. These compositions may be formulated separately and then combined or all components of the finished polyurethane composition may be combined in a single step. Before fully describing these compositions, the polyols and isocyanates from which they are formulated will be more fully described.

In certain embodiments, polyurethanes of the present invention were prepared from a one component formulation comprising one or more polyurethane prepolymers. In some embodiments, a polyurethane prepolymer is synthesized from one or more polyols.

In some embodiments, polyurethanes of the present invention were prepared from a two component formulation, wherein the first component comprises one or more isocyanates; and the second component comprises one or more polyols.

A. Polyols

This section further describes some of the polyols that have utility in making a polyurethane component of the present invention.

In some embodiments, a polyol is selected from the group consisting of polyether polyols, polyester polyols, polybutadiene polyols, polysulfide polyols, natural oil polyols, fluorinated polyols, aliphatic polyols, polyethercarbonate polyols, polycarbonate polyols, hydroxyl-terminated polyolefins, polyether-copolyesters, polycarbonate-copolyesters, polystyrene polyols, butanediol adipate polyols, ethylene glycol adipate polyols, hexane diol adipate polyols, polycaprolactone polyols, polytetramethylene ether glycol (PTMEG) polyols, EO/PO polyether polyols, and mixtures of any two or more of these.

In certain embodiments, mixtures of the present invention comprise or derived from one or more polyols selected from the group consisting of materials available commercially under the trade names: Voranol® (Dow), SpecFlex® (Dow), Tercarol® (Dow), Caradol® (Shell), Hyperliter®, Acclaim® (Bayer Material Science), Ultracel® (Bayer Material Science), Desmophen® (Bayer Material Science), Arcol® (Bayer Material Science), Stepanpol® (Stepan), Terate® (Invista), Terol® (oxid), Agrol® (BioBased Technologies), BiOH® (Cargil), HB® (Honey Bee), Polycin® (Vertellus), Poly-BD® (Cray Valley) and Krasol® (Cray Valley).

In certain embodiments, polyols are characterized in that they have a number average molecular weight (Mn) between about 500 and about 10,000 g/mol. In certain embodiments, polyols have a Mn between about 500 and about 5,000 g/mol. In certain embodiments, polyols have a Mn between about 1,500 and about 25,000 g/mol.

In certain embodiments, polyols are characterized in that they have a functionality between 1.9 and 2.5. In certain embodiments, polyols are characterized in that they have a functionality between 1.95 and 2.2. In certain embodiments, polyols have a functionality greater than 2.5, in which cases such high-functionality polyols typically compromise a minority of the overall polyol formulation.

i. Polyester Polyols

Polyester polyols that may be present include those which can be obtained by known methods, for example, polyester polyols can be based on the reaction of adipic acid or succinic acid (or their corresponding reactive derivatives or anhydrides) with various diols including, butanediol (BDO), hexanediol (HDO), and ethylene glycol (EG), propane diol (PDO).

In certain embodiments, the polyester polyol present comprises a material based on a diol and a diacid (e.g. a polymer based on Adipic acid (AA); Sebacic acid (SBA); Succinic Acid (SA); Dodecanedioic acid (DDA); Isophthalic acid (iPA); Azelaic acid (Az); Ethylene glycol (EG); Propylene glycol (PG); 1,3 Propane diol; 1,4-Butanediol (BDO); 1,6-Hexanediol (HID); Diethylene glycol (DEG); Neopentyl glycol (NPG); 3-Methyl-1,5-Pentanediol (MPD). Examples of these include, but are not limited to:

AA-EG polyesters with molecular weights of 500, 1,000, 2,000 or 3,000 g/mol;
AA-EG/BDO polyesters with molecular weights of 500, 1,000, 2,000 or 3,000 g/mol;
AA-PG polyesters with molecular weights of 500, 1,000, 2,000 or 3,000 g/mol;
AA-BDO polyesters with molecular weights of 500, 1,000, 2,000 or 3,000 g/mol;
AA-BDO/HID polyesters with molecular weights of 500, 1,000, 2,000 or 3,000 g/mol;
AA-DEG polyesters with molecular weights of 500, 1,000, 2,000 or 3,000 g/mol;
AA-NPG polyesters with molecular weights of 500, 1,000, 2,000 or 3,000 g/mol;
AA-NPG/HID polyesters with molecular weights of 500, 1,000, 2,000 or 3,000 g/mol;
AA-HID polyesters with molecular weights of 500, 1,000, 2,000 or 3,000 g/mol;
AA-MPD polyesters with molecular weights of 500, 1,000, 2,000 or 3,000 g/mol;
SEA-HID polyesters with molecular weights of 2,000, 3,000, 4,000 or 5,000 g/mol;
DDA-HID polyesters with molecular weights of 2,000, 3,000, 4,000 or 5,000 g/mol;
Az-EG polyesters with molecular weights of 500, 1,000, 2,000 or 3,000 g/mol;
Az/iPA-EG/NPG polyesters with molecular weights of 500, 1,000, 2,000 or 3,000 g/mol;
SA-EG polyesters with molecular weights of 500, 1,000, 2,000 or 3,000 g/mol;
SA-DEG polyesters with molecular weights of 500, 1,000, 2,000 or 3,000 g/mol;
SA-NPG polyesters with molecular weights of 500, 1,000, 2,000 or 3,000 g/mol;
SA-PG polyesters with molecular weights of 500, 1,000, 2,000 or 3,000 g/mol;

In certain embodiments, the polyester polyol is formed by ring-opening-polymerization of caprolactone or propiolactone. For example, polycaprolactone with molecular weights of 500, 1,000, 2,000 or 3,000 g/mol; or polypropiolactone with molecular weights of 500, 1,000, 2,000 or 3,000 g/mol.

ii. Polyether Polyols

In certain embodiments, polyether polyols are characterized in that they have a Mn between about 500 and about 10,000 g/mol. In certain embodiments, such polyether polyols have a Mn between about 500 and about 5,000 g/mol. In certain embodiments, the polyether polyols comprise polyethylene glycol. In certain embodiments, the polyether polyols comprise polypropylene glycol.

Polyether polyols useful in the present invention include those which can be obtained by known methods, for example, polyether polyols can be produced by anionic polymerization with alkali hydroxides such as sodium hydroxide or potassium hydroxide or alkali alcoholates, such as sodium methylate, sodium ethylate, potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical. Any suitable alkylene oxide may be used such as 1,3-propylene oxide, 1,2- and 2,3 butylene oxide, amylene oxides, styrene oxide, and preferably ethylene oxide and propylene oxide and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups, preferably secondary hydroxyl groups from the addition of propylene oxide onto an initiator because these groups are slower to react. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wurtz in Encyclopedia of Chemical Technology, Vol. 7, pp. 257-262, published by Interscience Publishers, Inc. (1951) or in U.S.

Pat. No. 1,922,459. Polyethers include the alkylene oxide addition products of polyhydric alcohols such as ethylene glycol, propylene glycol, dipropylene glycol, trimethylene glycol, 1,2-butanediol, 1,5-pentanediol, 1,6hexanediol, 1,7-heptanediol, hydroquinone, resorcinol glycerol, glycerine, 1,1,1-trimethylol-propane, 1,1,1trimethylolethane, pentaerythritol, 1,2,6-hexanetriol, a-methyl glucoside, sucrose, and sorbitol. Also included within the term "polyhydric alcohol" are compounds derived from phenol such as 2,2-bis(4-hydroxyphenyl)-propane, commonly known as Bisphenol A. Particularly preferred in the polyol composition is at least one polyol which is initiated with a compound having at least two primary or secondary amine groups, a polyhydric alcohol having 4 or more hydroxyl groups, such as sucrose, or a mixture of initiators employing a polyhydric alcohol having at least 4 hydroxyl groups and compounds having at least two primary or secondary amine groups. Suitable organic amine initiators which may be condensed with alkylene oxides include aromatic amines-such as aniline, N-alkylphenylene-diamines, 2,4'-, 2,2'-, and 4,4'-methylenedianiline, 2,6- or 2,4-toluenediamine, vicinal toluenediamines, o-chloroaniline, p-aminoaniline, 1,5-diaminonaphthalene, methylene dianiline, the various condensation products of aniline and formaldehyde, and the isomeric diaminotoluenes; and aliphatic amines such as mono-, di-, and trialkanolamines, ethylene diamine, propylene diamine, diethylenetriamine, methylamine, triisopropanolamine, 1,3-diaminopropane, 1,3-diaminobutane, and 1,4-diaminobutane. Preferable amines include monoethanolamine, vicinal toluenediamines, ethylenediamines, and propylenediamine. Yet another class of aromatic polyether polyols contemplated for use in this invention are the Mannich-based polyol an alkylene oxide adduct of phenol/formaldehyde/alkanolamine resin, frequently called a "Mannich" polyol such as disclosed in U.S. Pat. Nos. 4,883,826; 4,939,182; and 5,120, 815.

iii. Aliphatic Polycarbonate Polyols

In some embodiments, a polyol is an aliphatic polycarbonate polyols derived from the copolymerization of one or more epoxides and carbon dioxide. Examples of suitable polyols, as well as methods of making them are disclosed in PCT publication WO2010/028362 the entirety of which is incorporated herein by reference.

It is advantageous for many of the embodiments described herein that the aliphatic polycarbonate polyols used have a high percentage of reactive end groups. Such reactive endgroups are typically hydroxyl groups, but other reactive functional groups may be present if the polyols are treated to modify the chemistry of the end groups, such modified materials may terminate in amino groups, thiol groups, alkene groups, carboxylate groups, isocyanate groups, silyl groups, epoxy groups and the like. For purposes of this invention, the term 'aliphatic polycarbonate polyol' includes both traditional hydroxy-terminated materials as well as these end-group modified compositions.

In certain embodiments, at least 90% of the end groups of the polycarbonate polyol used are reactive end groups. In certain embodiments, at least 95%, at least 96%, at least 97% or at least 98% of the end groups of the polycarbonate polyol used are reactive end groups. In certain embodiments, more than 99%, more than 99.5%, more than 99.7%, or more than 99.8% of the end groups of the polycarbonate polyol used are reactive end groups. In certain embodiments, more than 99.9% of the end groups of the polycarbonate polyol used are reactive end groups.

In certain embodiments, at least 90% of the end groups of the polycarbonate polyol used are —OH groups. In certain embodiments, at least 95%, at least 96%, at least 97% or at least 98% of the end groups of the polycarbonate polyol used are —OH groups. In certain embodiments, more than 99%, more than 99.5%, more than 99.7%, or more than 99.8% of the end groups of the polycarbonate polyol used are —OH groups. In certain embodiments, more than 99.9% of the end groups of the polycarbonate polyol used are —OH groups.

Another way of expressing the —OH end-group content of a polyol composition is by reporting its OH# which is measured using methods well known in the art. In certain embodiments, the aliphatic polycarbonate polyols used in the present invention have an OH# greater than about 20. In certain embodiments, the aliphatic polycarbonate polyols utilized in the present invention have an OH# greater than about 40. In certain embodiments, the aliphatic polycarbonate polyols have an OH# greater than about 50, greater than about 75, greater than about 100, or greater than about 120.

In certain embodiments, it is advantageous if the aliphatic polycarbonate polyol compositions have a substantial proportion of primary hydroxyl end groups. These are the norm for compositions comprising poly(ethylene carbonate), but for polyols derived from copolymerization of substituted epoxides with $CO_2$, it is common for some or most of the chain ends to consist of secondary hydroxyl groups. In certain embodiments, such polyols are treated to increase the proportion of primary —OH end groups. This may be accomplished by reacting the secondary hydroxyl groups with reagents such as ethylene oxide, reactive lactones, and the like. In certain embodiments, the aliphatic polycarbonate polyols are treated with beta lactones, caprolactone and the like to introduce primary hydroxyl end groups. In certain embodiments, the aliphatic polycarbonate polyols are treated with ethylene oxide to introduce primary hydroxyl end groups.

In certain embodiments, aliphatic polycarbonate chains comprise a copolymer of carbon dioxide and one or more epoxides. In certain embodiments, aliphatic polycarbonate chains comprise a copolymer of carbon dioxide and ethylene oxide. In certain embodiments, aliphatic polycarbonate chains comprise a copolymer of carbon dioxide and propylene oxide. In certain embodiments, aliphatic polycarbonate chains comprise a copolymer of carbon dioxide and 1,2-butene oxide and/or 1,2-hexene oxide. In certain embodiments, aliphatic polycarbonate chains comprise a copolymer of carbon dioxide and cyclohexene oxide. In certain embodiments, aliphatic polycarbonate chains comprise a copolymer of carbon dioxide and cyclopentene oxide. In certain embodiments, aliphatic polycarbonate chains comprise a copolymer of carbon dioxide and 3-vinyl cyclohexene oxide. In certain embodiments, aliphatic polycarbonate chains comprise a copolymer of carbon dioxide and 3-ethyl cyclohexene oxide.

In certain embodiments, aliphatic polycarbonate chains comprise a terpolymer of carbon dioxide and ethylene oxide along with one or more additional epoxides selected from the group consisting of propylene oxide, 1,2-butene oxide, 2,3-butene oxide, cyclohexene oxide, 3-vinyl cyclohexene oxide, 3-ethyl cyclohexene oxide, cyclopentene oxide, epichlorohydrin, glicydyl esters, glycidyl ethers, styrene oxides, and epoxides of higher alpha olefins. In certain embodiments, such terpolymers contain a majority of repeat units derived from ethylene oxide with lesser amounts of repeat units derived from one or more additional epoxides. In certain embodiments, terpolymers contain about 50% to about 99.5% ethylene oxide-derived repeat units. In certain embodiments, terpolymers contain greater than about 60% ethylene oxide-derived repeat units. In certain embodiments, terpolymers contain greater than 75% ethylene oxide-derived repeat units. In certain embodiments, terpolymers contain greater than 80% ethylene oxide-derived repeat units. In certain embodiments, terpolymers contain greater than 85% ethylene oxide-derived repeat units. In certain embodiments, terpolymers contain greater than 90% ethylene oxide-derived repeat units. In certain embodiments, terpolymers contain greater than 95% ethylene oxide-derived repeat units.

In embodiments, the aliphatic polycarbonate chains comprise a copolymer of carbon dioxide and propylene oxide along with one or more additional epoxides selected from the group consisting of ethylene oxide, 1,2-butene oxide, 2,3-butene oxide, cyclohexene oxide, 3-vinyl cyclohexene oxide, cyclopentene oxide, epichlorohydrin, glicydyl esters, glycidyl ethers, styrene oxides, and epoxides of higher alpha olefins. In certain embodiments, such terpolymers contain a majority of repeat units derived from propylene oxide with lesser amounts of repeat units derived from one or more additional epoxides. In certain embodiments, terpolymers contain about 50% to about 99.5% propylene oxide-derived repeat units. In certain embodiments, terpolymers contain greater than 60% propylene oxide-derived repeat units. In certain embodiments, terpolymers contain greater than 75% propylene oxide-derived repeat units. In certain embodiments, terpolymers contain greater than 80% propylene oxide-derived repeat units. In certain embodiments, terpolymers contain greater than 85% propylene oxide-derived repeat units. In certain embodiments, terpolymers contain greater than 90% propylene oxide-derived repeat units. In certain embodiments, terpolymers contain greater than 95% propylene oxide-derived repeat units.

In certain embodiments, in the polymer compositions described hereinabove, aliphatic polycarbonate chains have a $M_n$ in the range of 500 g/mol to about 250,000 g/mol.

In certain embodiments, aliphatic polycarbonate chains have a Mn less than about 100,000 g/mol. In certain embodiments, aliphatic polycarbonate chains have a Mn less than about 70,000 g/mol. In certain embodiments, aliphatic polycarbonate chains have a Mn less than about 50,000 g/mol. In certain embodiments, aliphatic polycarbonate chains have a Mn between about 500 g/mol and about 40,000 g/mol. In certain embodiments, aliphatic polycarbonate chains have a Mn less than about 25,000 g/mol. In certain embodiments, aliphatic polycarbonate chains have a Mn between about 500 g/mol and about 20,000 g/mol. In certain embodiments, aliphatic polycarbonate chains have a Mn between about 500 g/mol and about 10,000 g/mol. In certain embodiments, aliphatic polycarbonate chains have a Mn between about 500 g/mol and about 5,000 g/mol. In certain embodiments, aliphatic polycarbonate chains have a Mn between about 1,000 g/mol and about 5,000 g/mol. In certain embodiments, aliphatic polycarbonate chains have a Mn between about 5,000 g/mol and about 10,000 g/mol. In certain embodiments, aliphatic polycarbonate chains have a Mn between about 500 g/mol and about 1,000 g/mol. In certain embodiments, aliphatic polycarbonate chains have a Mn between about 1,000 g/mol and about 3,000 g/mol. In certain embodiments, aliphatic polycarbonate chains have a Mn of about 5,000 g/mol. In certain embodiments, aliphatic polycarbonate chains have a Mn of about 4,000 g/mol. In certain embodiments, aliphatic polycarbonate chains have a Mn of about 3,000 g/mol. In certain embodiments, aliphatic polycarbonate chains have a Mn of about 2,500 g/mol. In certain embodiments, aliphatic polycarbonate chains have a Mn of about 2,000 g/mol. In certain embodiments, aliphatic polycarbonate chains have a Mn of about 1,500 g/mol. In certain embodiments, aliphatic polycarbonate chains have a Mn of about 1,000 g/mol. In certain embodiments, aliphatic polycarbonate chains have a Mn of about 750 g/mol. In certain embodiments, aliphatic polycarbonate chains have a Mn of about 500 g/mol.

In certain embodiments, the aliphatic polycarbonate polyols used are characterized in that they have a narrow molecular weight distribution. This can be indicated by the polydispersity indices (PDI) of the aliphatic polycarbonate polymers. In certain embodiments, aliphatic polycarbonate compositions have a PDI less than 3. In certain embodiments, aliphatic polycarbonate compositions have a PDI less than 2. In certain embodiments, aliphatic polycarbonate compositions have a PDI less than 1.8. In certain embodiments, aliphatic polycarbonate compositions have a PDI less than 1.5. In certain embodiments, aliphatic polycarbonate compositions have a PDI less than 1.4. In certain embodiments, aliphatic polycarbonate compositions have a PDI between about 1.0 and 1.2. In certain embodiments, aliphatic polycarbonate compositions have a PDI between about 1.0 and 1.1.

In certain embodiments, the aliphatic polycarbonate polyols used do not have a narrow PDI. This can be the case if, for example, a polydisperse chain transfer agent is used to initiate an epoxide $CO_2$ copolymerization, or if a plurality of aliphatic polycarbonate polyol compositions with different molecular weights are blended. In certain embodiments, aliphatic polycarbonate compositions have a PDI greater than 3. In certain embodiments, aliphatic polycarbonate compositions have a PDI greater than 2. In certain embodiments, aliphatic polycarbonate compositions have a PDI greater than 1.8. In certain embodiments, aliphatic polycarbonate compositions have a PDI greater than 1.5. In certain embodiments, aliphatic polycarbonate compositions have a PDI greater than 1.4.

In certain embodiments, aliphatic polycarbonate compositions of the present invention comprise substantially alternating polymers containing a high percentage of carbonate linkages and a low content of ether linkages. In certain embodiments, aliphatic polycarbonate compositions of the present invention are characterized in that, on average in the composition, the percentage of carbonate linkages is 85% or greater. In certain embodiments, aliphatic polycarbonate compositions of the present invention are characterized in that, on average in the composition, the percentage of carbonate linkages is 90% or greater. In certain embodiments, aliphatic polycarbonate compositions of the present invention are characterized in that, on average in the composition, the percentage of carbonate linkages is 91% or greater. In certain embodiments, aliphatic polycarbonate compositions of the present invention are characterized in that, on average in the composition, the percentage of carbonate linkages is 92% or greater. In certain embodiments, aliphatic polycarbonate compositions of the present invention are characterized in that, on average in the composition, the percentage of carbonate linkages is 93% or greater. In certain embodiments, aliphatic polycarbonate compositions of the present invention are characterized in that, on average in the composition, the percentage of carbonate linkages is 94% or greater. In certain embodiments, aliphatic polycarbonate compositions of the present invention are characterized in that, on average in the composition, the percentage of carbonate linkages is 95% or greater. In certain embodiments, aliphatic polycarbonate compositions of the present invention are characterized in that, on average in the composition, the percentage of carbonate linkages is 96% or greater. In certain embodiments, aliphatic polycarbonate compositions of the present invention are characterized in that, on average in the composition, the percentage of carbonate linkages is 97% or greater. In certain embodiments, aliphatic polycarbonate compositions of the present invention are characterized in that, on average in the composition, the percentage of carbonate linkages is 98% or greater. In certain embodiments, aliphatic polycarbonate compositions of the present invention are characterized in that, on average in the composition, the percentage of carbonate linkages is 99% or greater. In certain embodiments, aliphatic polycarbonate compositions of the present invention are characterized in that, on average in the composition, the percentage of carbonate linkages is 99.5% or greater. In certain embodiments, the percentages above exclude ether linkages present in polymerization initiators or chain transfer agents and refer only to the linkages formed during epoxide $CO_2$ copolymerization.

In certain embodiments, aliphatic polycarbonate compositions of the present invention are characterized in that they contain essentially no ether linkages either within the polymer chains derived from epoxide $CO_2$ copolymerization or within any polymerization initiators, chain transfer agents or end groups that may be present in the polymer. In certain embodiments, aliphatic polycarbonate compositions of the present invention are characterized in that they contain, on average, less than one ether linkage per polymer chain within the composition. In certain embodiments, aliphatic polycarbonate compositions of the present invention are characterized in that they contain essentially no ether linkages.

In certain embodiments where an aliphatic polycarbonate is derived from monosubstituted epoxides (e.g. such as propylene oxide, 1,2-butylene oxide, epichlorohydrin, epoxidized alpha olefins, or a glycidol derivative), the aliphatic polycarbonate is characterized in that it is regioregular. Regioregularity may be expressed as the percentage of adjacent monomer units that are oriented in a head-to-tail arrangement within the polymer chain. In certain embodiments, aliphatic polycarbonate chains in the inventive polymer compositions have a head-to-tail content higher than about 80%. In certain embodiments, the head-to-tail content is higher than about 85%. In certain embodiments, the head-to-tail content is higher than about 90%. In certain embodiments, the head-to-tail content is greater than about 91%, greater than about 92%, greater than about 93%, greater than about 94%, or greater than about 95%. In certain embodiments, the head-to-tail content of the polymer is as determined by proton or carbon-13 NMR spectroscopy.

In certain embodiments, compositions of the present invention comprise aliphatic polycarbonate polyols having a structure P1:

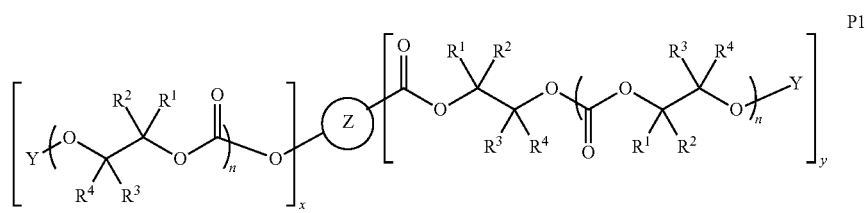

wherein, $R^1$, $R^2$, $R^3$, and $R^4$ are, at each occurrence in the polymer chain, independently selected from the group consisting of —H, fluorine, an optionally substituted $C_{1-30}$ aliphatic group, and an optionally substituted $C_{1-40}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms;

Y is, at each occurrence, independently —H, a reactive group (as defined hereinabove), or a site of attachment to any of the chain-extending moieties or isocyanates described in the classes and subclasses herein;

n is at each occurrence, independently an integer from about 2 to about 50;

Ⓩ is a bond or a multivalent moiety; and x and y are each independently an integer from 0 to 6, where the sum of x and y is between 2 and 6.

In certain embodiments, the multivalent moiety Ⓩ embedded within the aliphatic polycarbonate chain is derived from a polyfunctional chain transfer agent having two or more sites from which epoxide/$CO_2$ copolymerization can occur. In certain embodiments, such copolymerizations are performed in the presence of polyfunctional chain transfer agents as exemplified in published PCT application WO 2010/028362. In certain embodiments, such copolymerizations are performed as exemplified in US 2011/0245424. In certain embodiments, such copolymerizations are performed as exemplified in Green Chem. 2011, 13, 3469-3475.

In certain embodiments, a polyfunctional chain transfer agent has a formula:

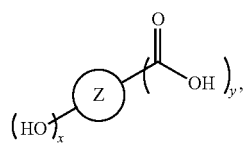

wherein each of Ⓩ, x, and y is as defined above and described in classes and subclasses herein.

In certain embodiments, aliphatic polycarbonate chains in the inventive polymer compositions are derived from the copolymerization of one or more epoxides with carbon dioxide in the presence of such polyfunctional chain transfer agents as shown in Scheme 2:

Scheme 2

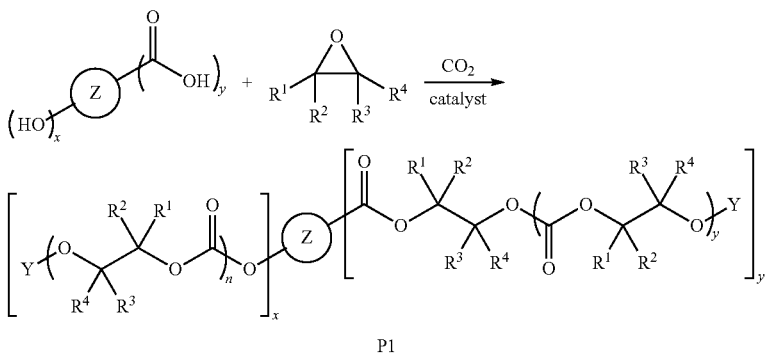

In certain embodiments, aliphatic polycarbonate chains in polymer compositions of the present invention comprise chains with a structure P2:

P2

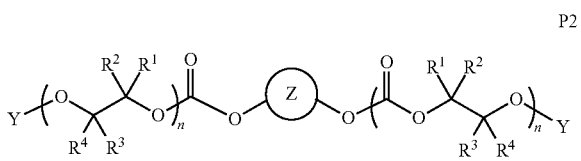

wherein each of $R^1$, $R^2$, $R^3$, $R^4$, Y, Ⓩ and n is as defined above and described in the classes and subclasses herein.

In certain embodiments where aliphatic polycarbonate chains have a structure P2, Ⓩ is derived from a dihydric alcohol. In such instances Ⓩ represents the carbon-containing backbone of the dihydric alcohol, while the two oxygen atoms adjacent to Ⓩ are derived from the —OH groups of the diol. For example, if the polyfunctional chain transfer agent were ethylene glycol, then Ⓩ would be —$CH_2CH_2$— and P2 would have the following structure:

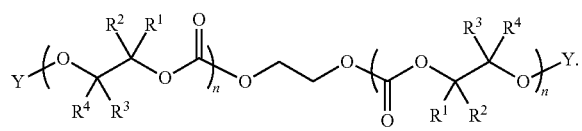

In certain embodiments where Ⓩ is derived from a dihydric alcohol, the dihydric alcohol comprises a $C_{2-40}$ diol. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentane diol, 2-ethyl-1,3-hexane diol, 2-methyl-1,3-propane diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these.

In certain embodiments where Ⓩ is derived from a dihydric alcohol, the dihydric alcohol is selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly(propylene glycol) such as those having number average molecular weights of from 234 to about 2000 g/mol.

In certain embodiments where Ⓩ is derived from a dihydric alcohol, the dihydric alcohol comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments where Ⓩ is derived from a dihydric alcohol, the dihydric alcohol comprises a polymeric diol. In certain embodiments, a polymeric diol is selected from the group consisting of polyethers, polyesters, hydroxy-terminated polyolefins, polyether-copolyesters, polyether polycarbonates, polycarbonate-copolyesters, polyoxymethylene polymers, and alkoxylated analogs of any of these. In certain embodiments, the polymeric diol has an average molecular weight less than about 2000 g/mol.

In certain embodiments, Ⓩ is derived from a polyhydric alcohol with more than two hydroxy groups. In embodiments in which Ⓩ is derived from a polyhydric alcohol with more than two hydroxyl groups, these >2 functional polyols are a component of a polyol mixture containing predominantly polyols with two hydroxyl groups. In certain embodiments, these >2 functional polyols are less than 20% of the total polyol mixture by weight. In certain embodiments, these >2 functional polyols are less than 10% of the total polyol mixture. In certain embodiments, these >2 functional polyols are less than 5% of the total polyol mixture. In certain embodiments, these >2 functional polyols are less than 2% of the total polyol mixture. In certain embodiments, the aliphatic polycarbonate chains in polymer compositions of the present invention comprise aliphatic polycarbonate chains where the moiety Ⓩ is derived from a triol. In certain embodiments, such aliphatic polycarbonate chains have the structure P3:

P3

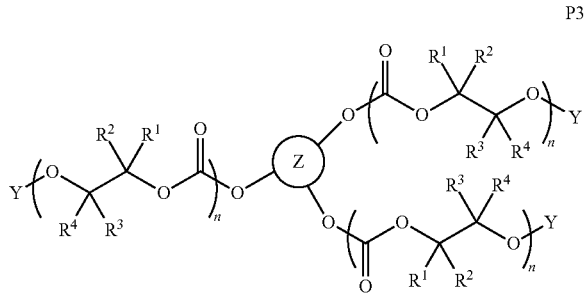

wherein each of $R^1$, $R^2$, $R^3$, $R^4$, Y, Z and n is as defined above and described in classes and subclasses herein.

In certain embodiments where Z is derived from a triol, the triol is selected from the group consisting of: glycerol, 1,2,4-butanetriol, 2-(hydroxymethyl)-1,3-propanediol; hexane triols, trimethylol propane, trimethylol ethane, trimethylolhexane, 1,2,4-cyclohexanetrimethanol, pentaerythritol mono esters, pentaerythritol mono ethers, and alkoxylated analogs of any of these. In certain embodiments, such alkoxylated derivatives comprise ethoxylated or propoxylated compounds.

In certain embodiments, Z is derived from an alkoxylated derivative of a trifunctional carboxylic acid or trifunctional hydroxy acid. In certain embodiments, alkoxylated derivatives comprise ethoxylated or propoxylated compounds.

In certain embodiments, where Z is derived from a polymeric triol, the polymeric triol is selected from the group consisting of polyethers, polyesters, hydroxy-terminated polyolefins, polyether-copolyesters, polyether polycarbonates, polyoxymethylene polymers, polycarbonate-copolyesters, and alkoxylated analogs of any of these. In certain embodiments, the alkoxylated polymeric triols comprise ethoxylated or propoxylated compounds.

In certain embodiments, Z is derived from a polyhydric alcohol with four hydroxy groups. In certain embodiments, aliphatic polycarbonate chains in polymer compositions of the present invention comprise aliphatic polycarbonate chains where the moiety Z is derived from a tetraol. In certain embodiments, aliphatic polycarbonate chains in polymer compositions of the present invention comprise chains with the structure P4:

P4

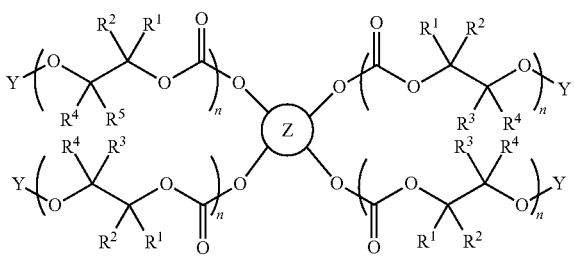

wherein each of $R^1$, $R^2$, $R^3$, $R^4$, Y, Z and n is as defined above and described in classes and subclasses herein.

In certain embodiments, Z is derived from a polyhydric alcohol with more than four hydroxy groups. In certain embodiments, Z is derived from a polyhydric alcohol with six hydroxy groups. In certain embodiments, a polyhydric alcohol is dipentaerythritol or an alkoxylated analog or other derivative thereof. In certain embodiments, a polyhydric alcohol is sorbitol or an alkoxylated analog thereof. In certain embodiments, aliphatic polycarbonate chains in polymer compositions of the present invention comprise chains with the structure P5:

P5

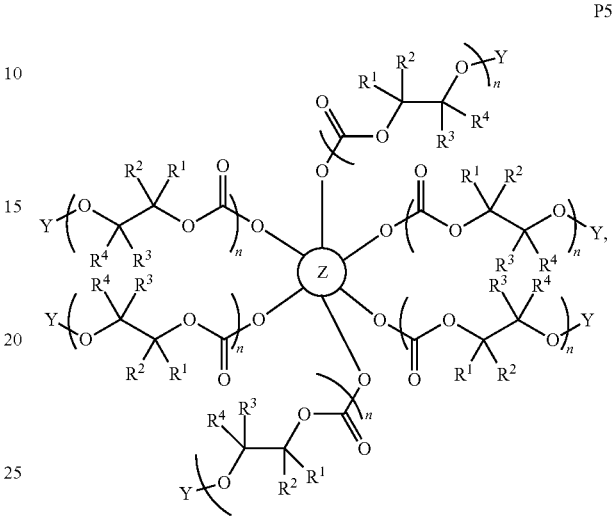

wherein each of $R^1$, $R^2$, $R^3$, $R^4$, Y, Z and n is as defined above and described in classes and subclasses herein.

In certain embodiments, aliphatic polycarbonates of the present invention comprise a combination of bifunctional chains (e.g. polycarbonates of formula P2) in combination with higher functional chains (e.g. one or more polycarbonates of formulae P3 to P5).

In certain embodiments, Z is derived from a hydroxy acid. In certain embodiments, aliphatic polycarbonate chains in polymer compositions of the present invention comprise chains with the structure P6:

P6

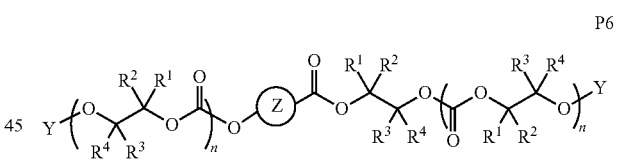

wherein each of $R^1$, $R^2$, $R^3$, $R^4$, Y, Z and n is as defined above and described in classes and subclasses herein. In such instances, Z represents the carbon-containing backbone of the hydroxy acid, while ester and carbonate linkages adjacent to Z are derived from the —$CO_2H$ group and the hydroxy group of the hydroxy acid. For example, if Z were derived from 3-hydroxypropanoic acid, then Z would be —$CH_2CH_2$— and P6 would have the following structure:

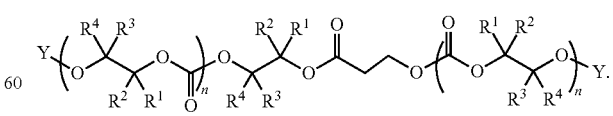

In certain embodiments, Z is derived from an optionally substituted $C_{2-40}$ hydroxy acid. In certain embodiments, Z is derived from a polyester. In certain embodiments, such polyesters have a molecular weight less than about 2000 g/mol.

In certain embodiments, a hydroxy acid is an alpha-hydroxy acid. In certain embodiments, a hydroxy acid is selected from the group consisting of: glycolic acid, DL-lactic acid, D-lactic acid, L-lactic, citric acid, and mandelic acid.

In certain embodiments, a hydroxy acid is a beta-hydroxy acid. In certain embodiments, a hydroxy acid is selected from the group consisting of: 3-hydroxypropionic acid, DL 3-hydroxybutryic acid, D-3 hydroxybutryic acid, L-3-hydroxybutyric acid, DL-3-hydroxy valeric acid, D-3-hydroxy valeric acid, L-3-hydroxy valeric acid, salicylic acid, and derivatives of salicylic acid.

In certain embodiments, a hydroxy acid is a α-ω hydroxy acid. In certain embodiments, a hydroxy acid is selected from the group consisting of: of optionally substituted $C_{3-20}$ aliphatic α-ω hydroxy acids and oligomeric esters.

In certain embodiments, a hydroxy acid is selected from the group consisting of:

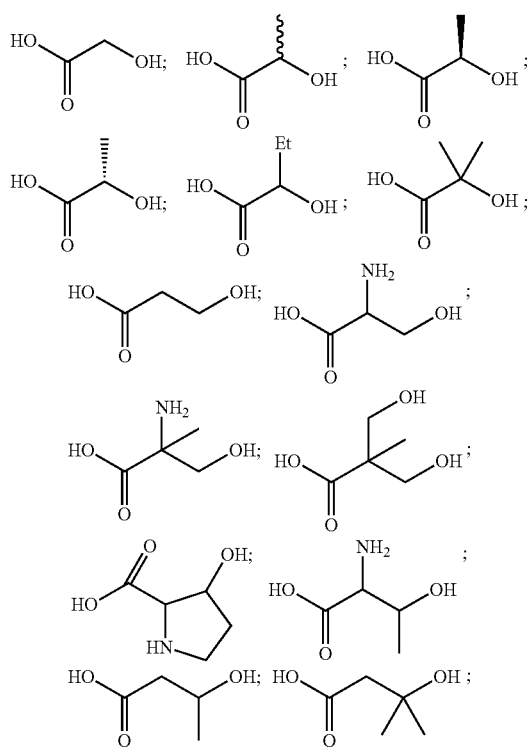

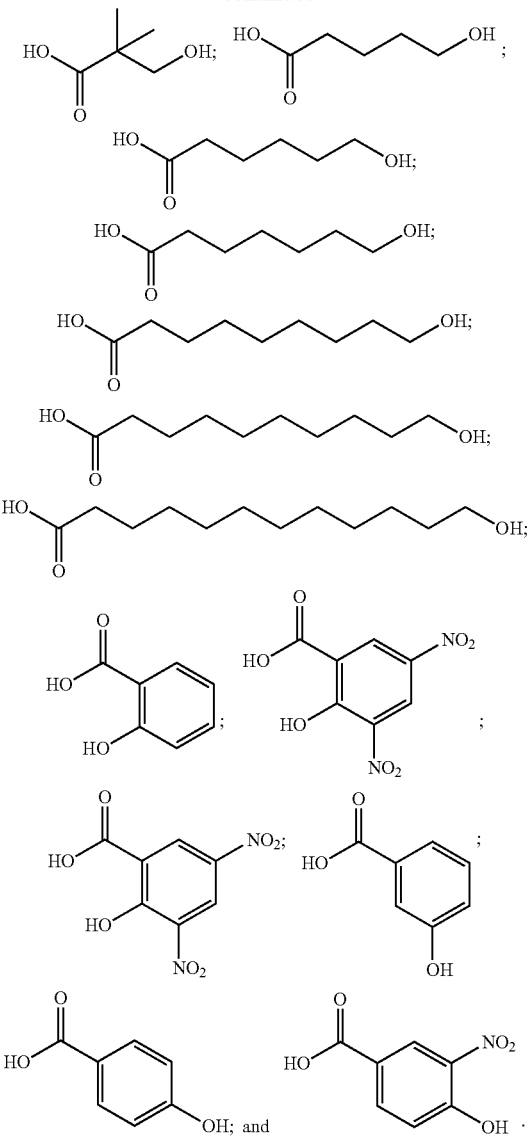

In certain embodiments, Ⓩ is derived from a polycarboxylic acid. In certain embodiments, aliphatic polycarbonate chains in polymer compositions of the present invention comprise chains with the structure P7:

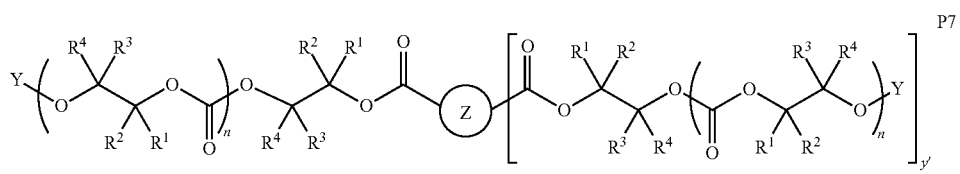

wherein each of $R^1$, $R^2$, $R^3$, $R^4$, Y, Ⓩ and n is as defined above and described in classes and subclasses herein, and y' is an integer from 1 to 5 inclusive.

In embodiments where the aliphatic polycarbonate chains have a structure P7, Ⓩ represents the carbon-containing backbone (or a bond in the case of oxalic acid) of a polycarboxylic acid, while ester groups adjacent to Ⓩ are derived from —CO₂H groups of the polycarboxylic acid. For example, if Z were derived from succinic acid (HO₂CCH₂CH₂CO₂H), then Z would be —CH₂CH₂— and P7 would have the following structure:

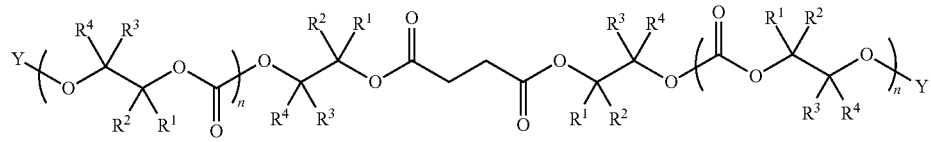

wherein each of $R^1$, $R^2$, $R^3$, $R^4$, Y, Z and n is as defined above and described in classes and subclasses herein.

In certain embodiments, Z is derived from a dicarboxylic acid. In certain embodiments, aliphatic polycarbonate chains in polymer compositions of the present invention comprise chains with the structure P8:

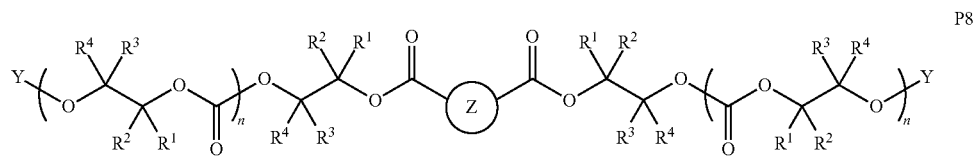

P8

In certain embodiments, Z is selected from the group consisting of: phthalic acid, isophthalic acid, terephthalic acid, maleic acid, succinic acid, malonic acid, glutaric acid, adipic acid, pimelic acid, suberic acid, and azelaic acid.

In certain embodiments, Z is derived from a diacid selected from the group consisting of:

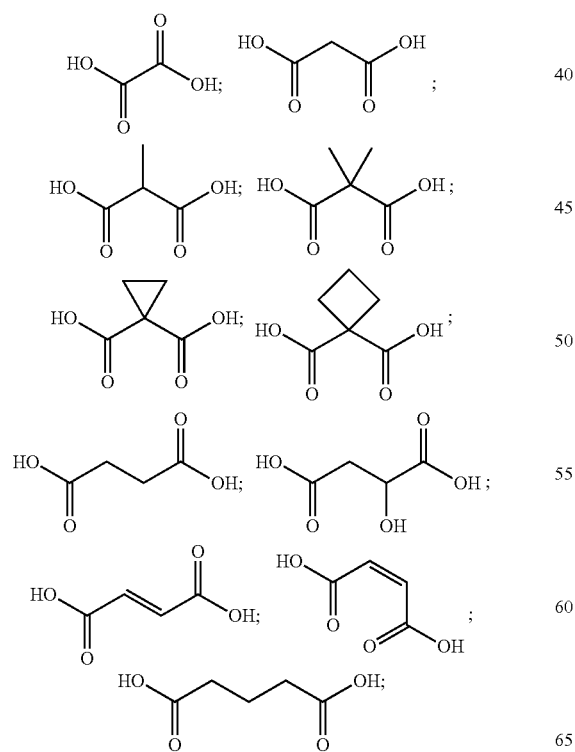

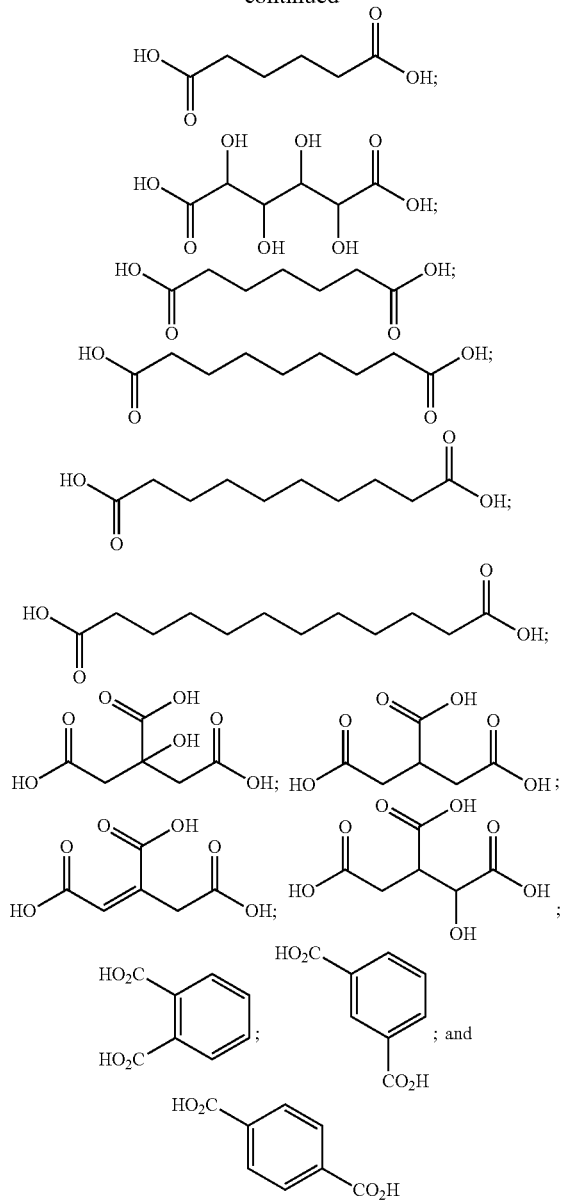

wherein each of $R^1$, $R^2$, $R^3$, $R^4$, Y, Ⓩ and n is as defined above and described in classes and subclasses herein.

In certain embodiments, Ⓩ is derived from a phosphorous-containing molecule selected from the group consisting of:

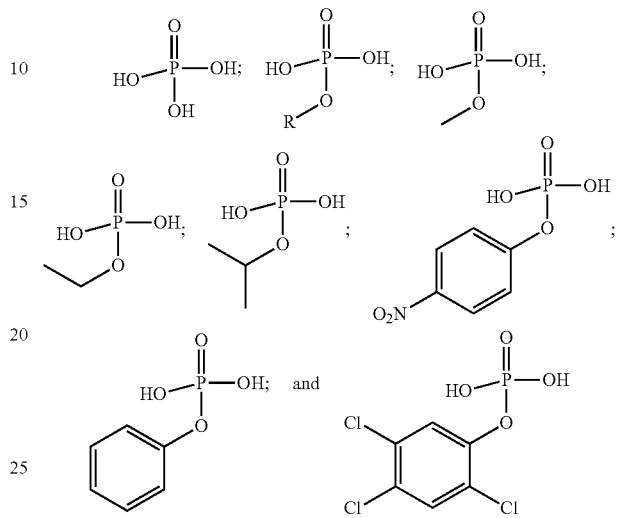

In certain embodiments, Ⓩ has a formula —P(O)(R)— where R is an optionally substituted $C_{1-20}$ aliphatic group or an optionally substituted aryl group and k is 0, 1, or 2. In certain embodiments, Ⓩ is derived from a phosphorous-containing molecule selected from the group consisting of:

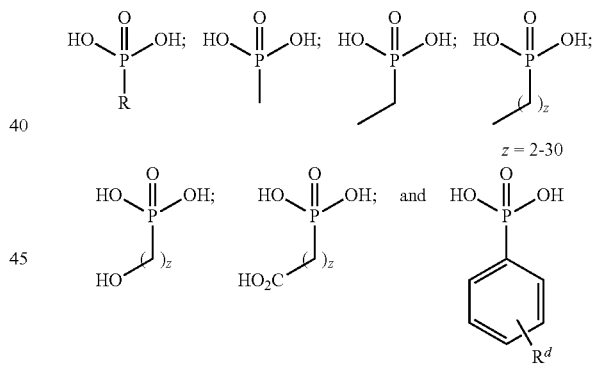

where each of R and $R^d$ is as defined above and in the classes and subclasses herein.

In certain embodiments, Ⓩ has a formula —PR— where R is an optionally substituted $C_{1-20}$ aliphatic group or an optionally substituted aryl group.

In certain embodiments, Ⓩ is derived from a phosphorous-containing molecule. In certain embodiments, Ⓩ has a formula —P(O)(OR)$_k$— where each R is independently an optionally substituted $C_{1-20}$ aliphatic group or an optionally substituted aryl group and k is 0, 1, or 2.

For example, if Ⓩ were derived from PhO—P(O)(OH)$_2$, then Ⓩ would be —P(O)(OPh)- and P7 would have the following structure:

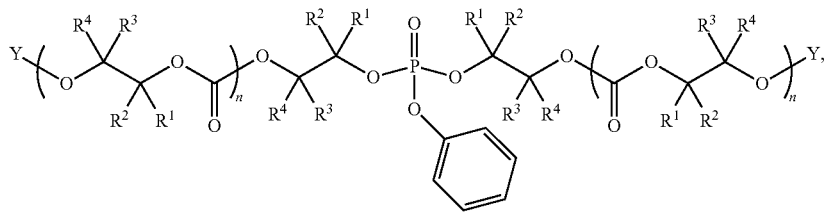

In certain embodiments, each

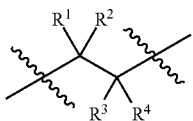

in the structures herein is independently selected from the group consisting of:

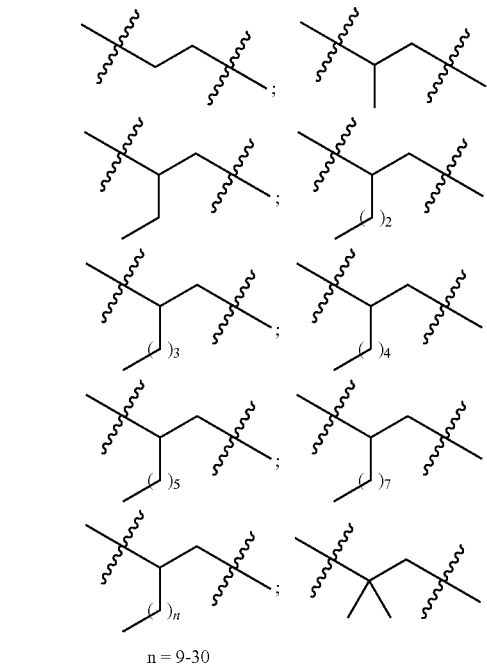

n = 9-30

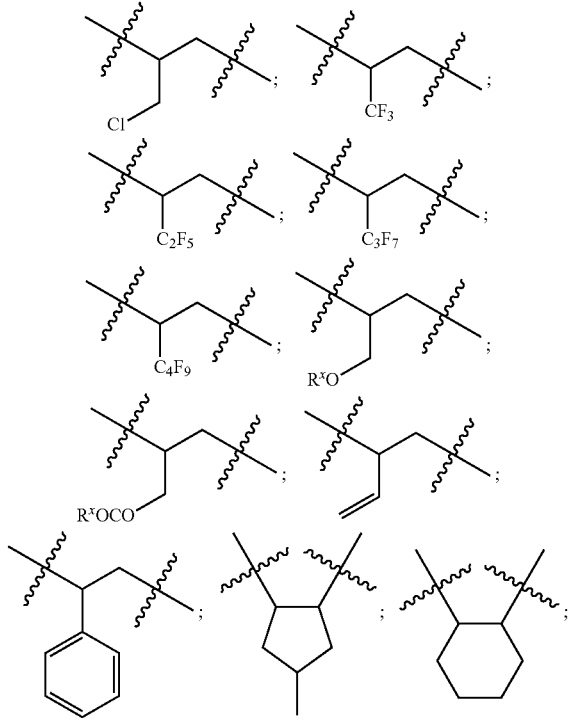

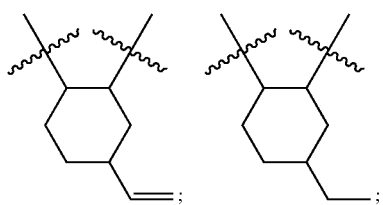

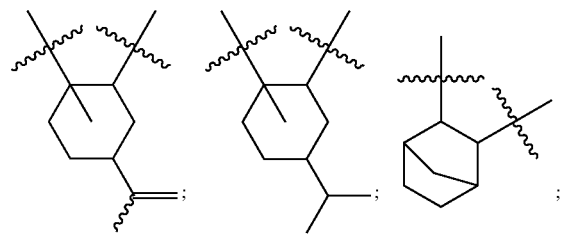

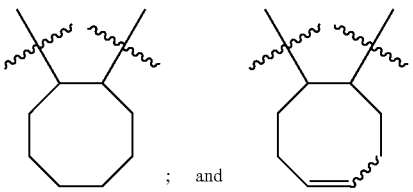 [SMILES: *C1CCCCCCC1* ; *C1CCC=CCCC1*]

; and wherein each $R^X$ is independently an optionally substituted moiety selected from the group consisting of $C_{2-20}$ aliphatic, $C_{2-20}$ heteroaliphatic, 3- to 14-membered carbocyclic, 6- to 10-membered aryl, 5- to 10-membered heteroaryl, and 3- to 12-membered heterocyclic.

In certain embodiments, each

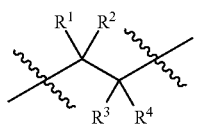

in the structures herein is independently selected from the group consisting of:

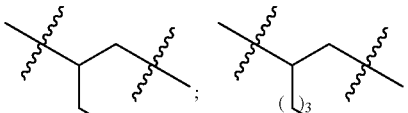

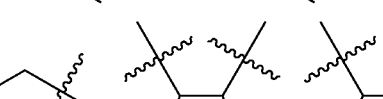

-continued

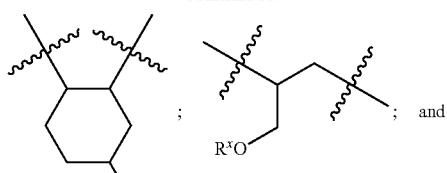

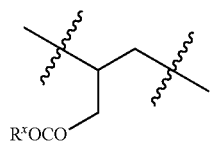

wherein $R^x$ is as defined above and described in classes and subclasses herein.

In certain embodiments, the moiety —Y in the structures herein is —H.

In certain embodiments, —Y comprises an ester linkage to an optionally substituted $C_{2-40}$ linker terminated with an —OH group. In certain embodiments, —Y is selected from the group consisting of:

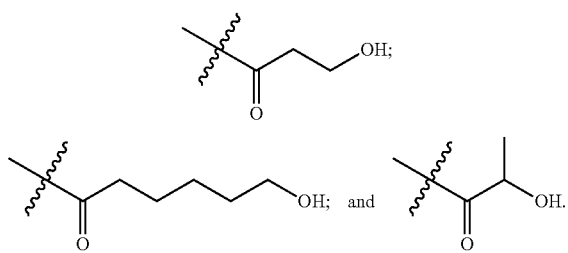

In certain embodiments, —Y comprises an ester linkage to an optionally substituted $C_{2-40}$ linker terminated with an —CO$_2$H group. In certain embodiments, —Y is selected from the group consisting of:

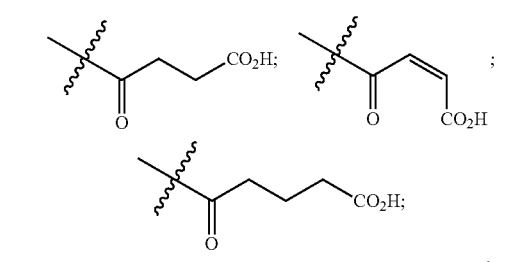

In certain embodiments, the moiety —Y in the structures herein comprises a hydroxy-terminated polymer. In certain embodiments, —Y comprises a hydroxy-terminated polyether. In certain embodiments, —Y comprises

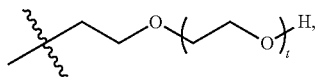

where t is an integer from 1 to 20.

In certain embodiments, —Y comprises a hydroxy-terminated polyester. In certain embodiments, —Y is selected from the group consisting of:

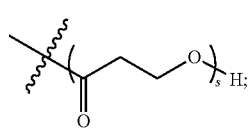

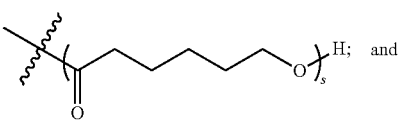

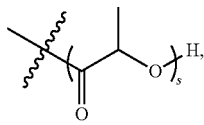

where s is an integer from 2 to 20.

In certain embodiments, aliphatic polycarbonate chains comprise:

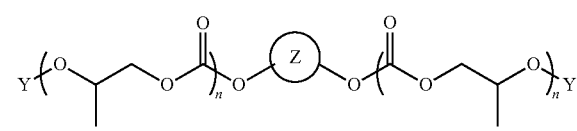

P2a wherein each of ⓩ, —Y, and n is as defined above and described in classes and subclasses herein.

In certain embodiments, aliphatic polycarbonate chains comprise:

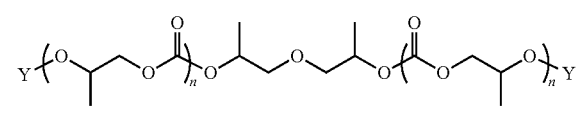

P2b wherein each of —Y and n is as defined above and described in classes and subclasses herein.

In certain embodiments, aliphatic polycarbonate chains comprise:

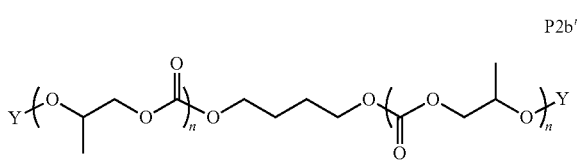

wherein each of —Y and n is as defined above and described in classes and subclasses herein.

In certain embodiments, aliphatic polycarbonate chains comprise:

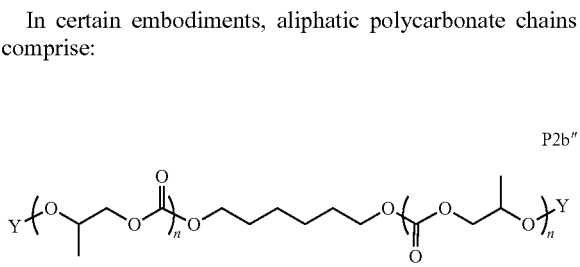

wherein each of —Y and n is as defined above and described in classes and subclasses herein.

In certain embodiments, aliphatic polycarbonate chains comprise:

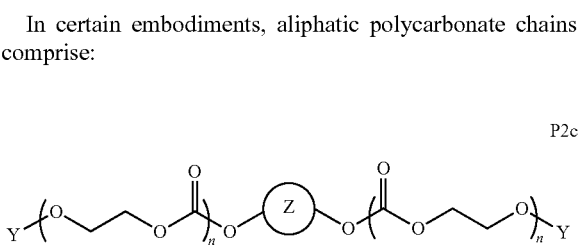

wherein each of (Z), —Y, and n is as defined above and described in classes and subclasses herein.

In certain embodiments, aliphatic polycarbonate chains comprise:

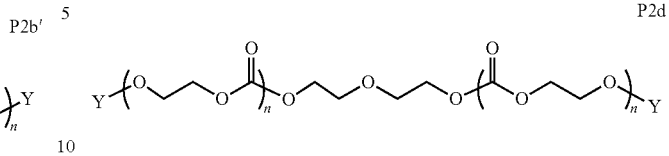

wherein each of —Y and n is as defined above and described in classes and subclasses herein.

In certain embodiments, aliphatic polycarbonate chains comprise:

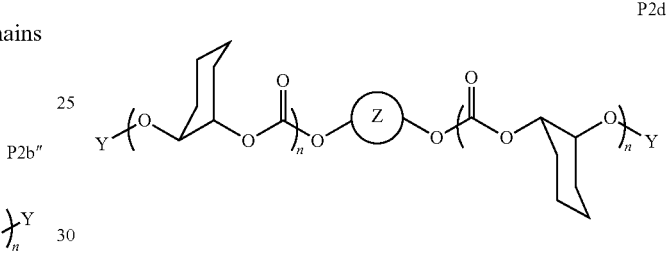

wherein each of (Z), —Y, and n is as defined above and described in classes and subclasses herein.

In certain embodiments, aliphatic polycarbonate chains comprise:

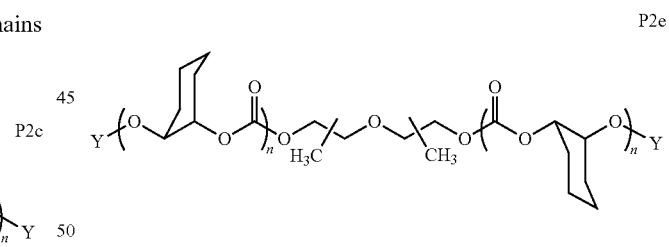

wherein each of —Y and n are is as defined above and described in classes and subclasses herein.

In certain embodiments, aliphatic polycarbonate chains comprise:

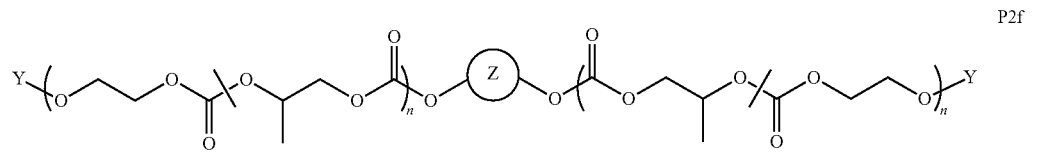

wherein each of ⓩ, —Y, and n is as defined above and described in classes and subclasses herein.

In certain embodiments, aliphatic polycarbonate chains comprise:

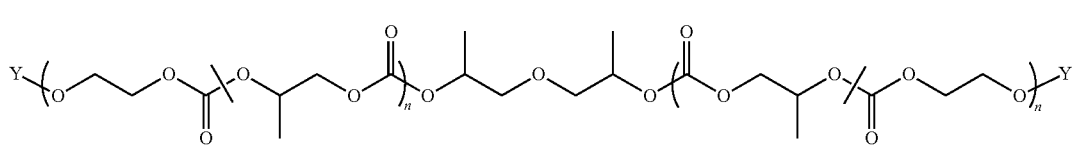
P2g wherein each of —Y and n is as defined above and described in classes and subclasses herein.

In certain embodiments, aliphatic polycarbonate chains comprise:

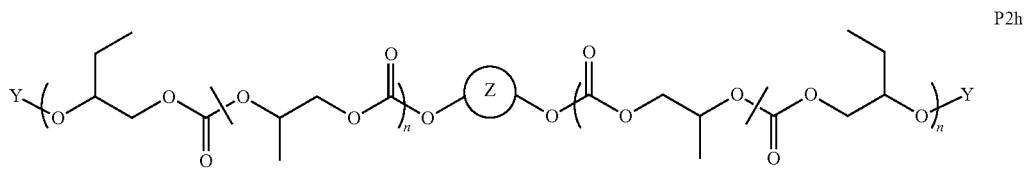
P2h wherein each of ⓩ, —Y, and n is as defined above and described in classes and subclasses herein.

In certain embodiments, aliphatic polycarbonate chains comprise:

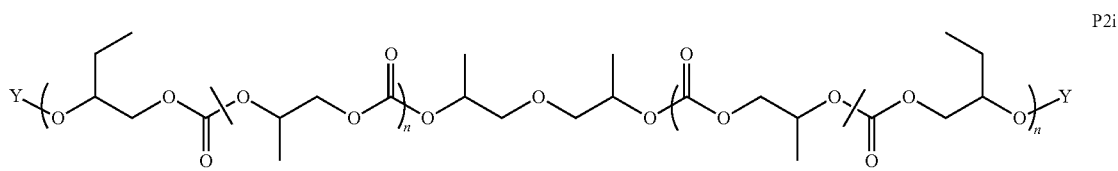
P2i wherein each of —Y and n is as defined above and described in classes and subclasses herein.

In certain embodiments, aliphatic polycarbonate chains comprise:

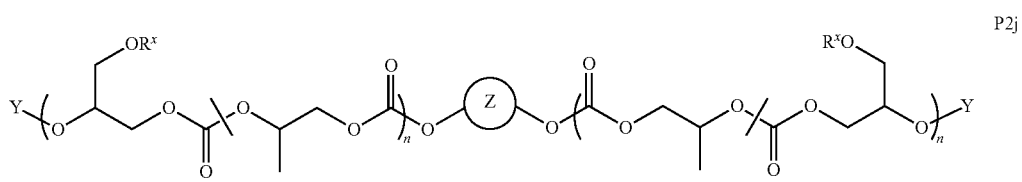
P2j wherein each of ⓩ, —Y, $R^x$, and n is as defined above and described in classes and subclasses herein.

In certain embodiments, aliphatic polycarbonate chains comprise:

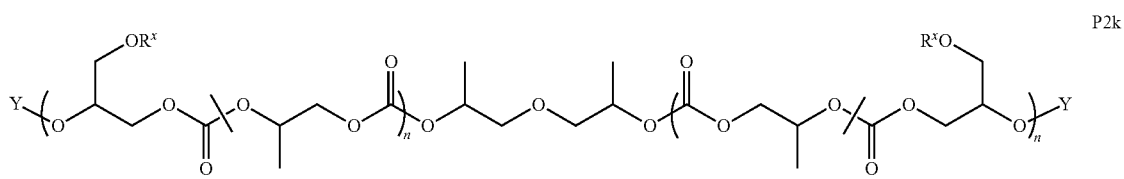
P2k wherein each of —Y, $R^x$, and n is as defined above and described in classes and subclasses herein.

In certain embodiments, aliphatic polycarbonate chains comprise:

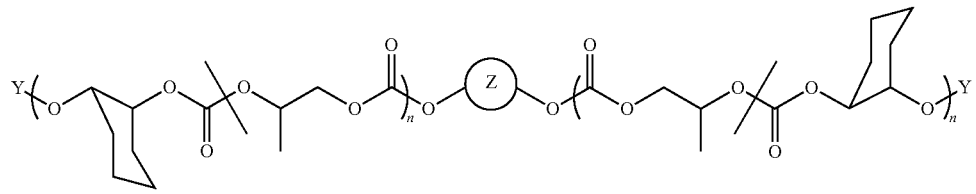

P21 wherein each of Z, —Y, and n is as defined above and described in classes and subclasses herein.

In certain embodiments, aliphatic polycarbonate chains comprise:

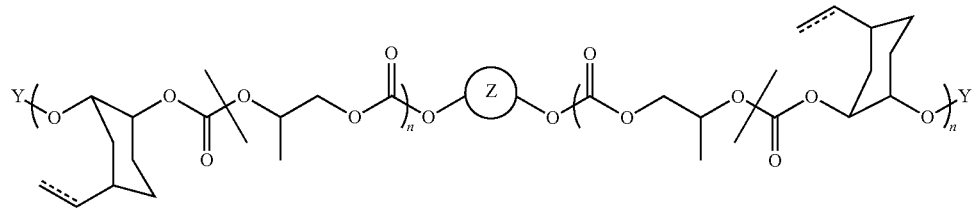

P21-a wherein each of Z, —Y, and n are is as defined above and described in classes and subclasses herein; and each ═══ independently represents a single or double bond.

In certain embodiments, aliphatic polycarbonate chains comprise:

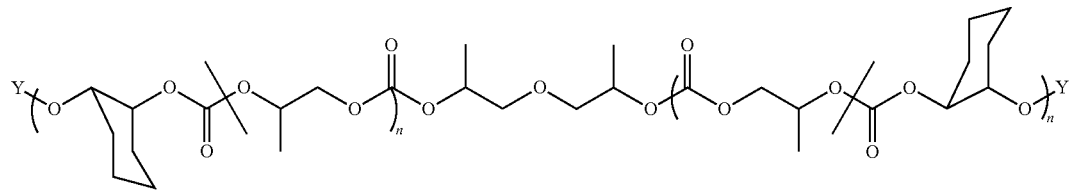

P2m wherein each of —Y and n is as defined above and described in classes and subclasses herein.

In certain embodiments, aliphatic polycarbonate chains comprise:

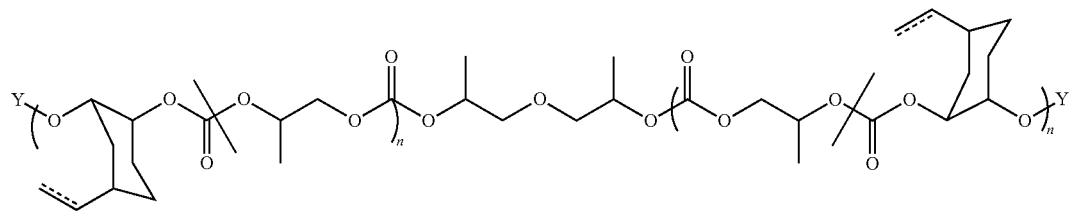

P2m-a wherein each of —Y, =====, and n is as defined above and described in classes and subclasses herein.

In certain embodiments, aliphatic polycarbonate chains comprise:

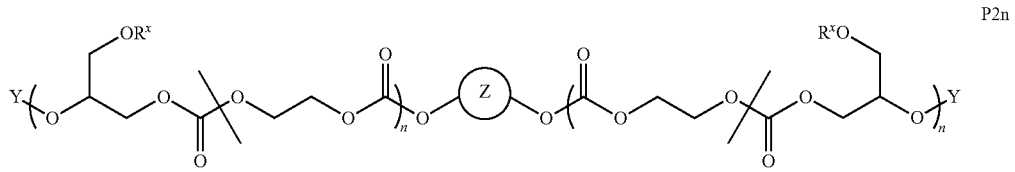

P2n wherein each of Ⓩ, $R^x$, —Y and n is as defined above and described in classes and subclasses herein.

In certain embodiments, aliphatic polycarbonate chains comprise:

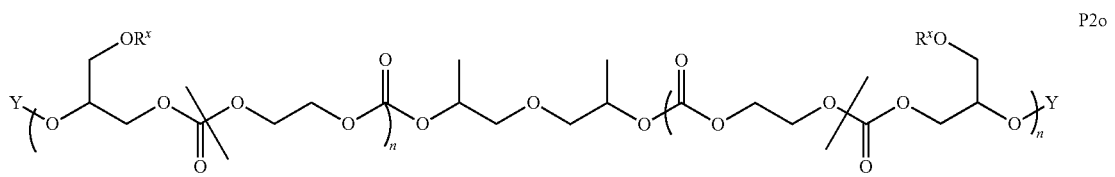

P2o wherein each of —Y, $R^x$, and n is as defined above and described in classes and subclasses herein.

In certain embodiments, aliphatic polycarbonate chains comprise:

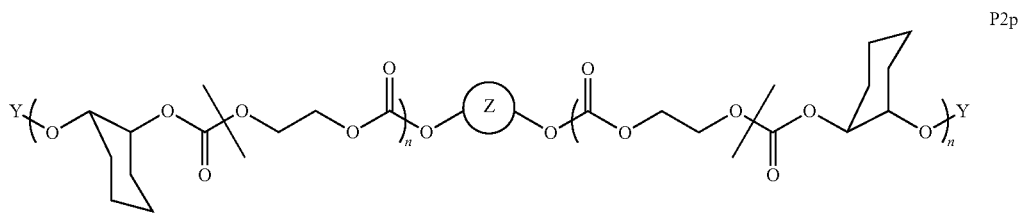

P2p wherein each of Ⓩ, —Y, and n is as defined above and described in classes and subclasses herein.

In certain embodiments, aliphatic polycarbonate chains comprise:

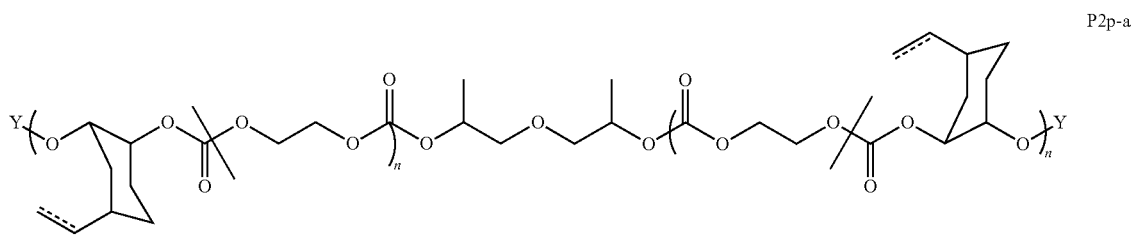

P2p-a wherein each of —Y, =====, and n is as defined above and described in classes and subclasses herein.

In certain embodiments, aliphatic polycarbonate chains comprise:

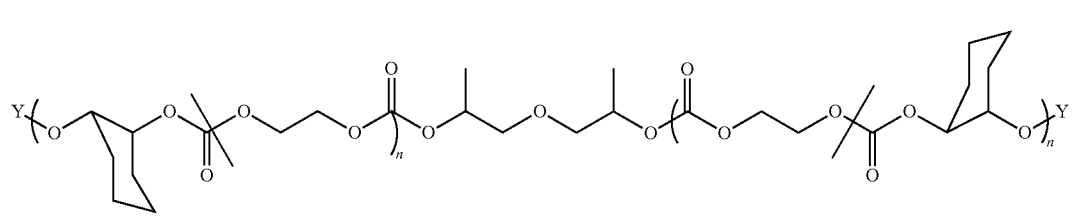

P2q wherein each of —Y and n is as defined above and described in classes and subclasses herein.

In certain embodiments, aliphatic polycarbonate chains comprise:

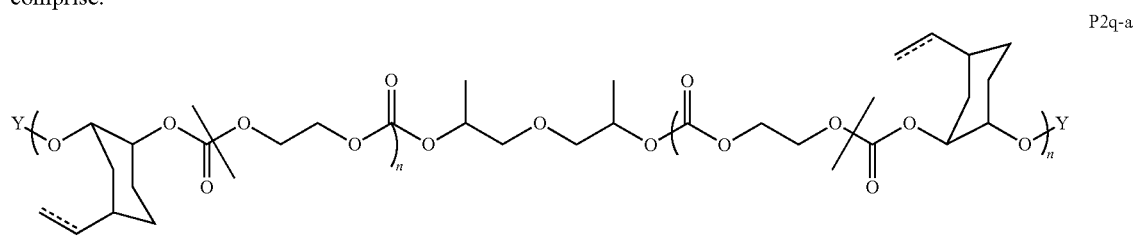

P2q-a wherein each of —Y, ===, and n is as defined above and described in classes and subclasses herein.

In certain embodiments, aliphatic polycarbonate chains comprise:

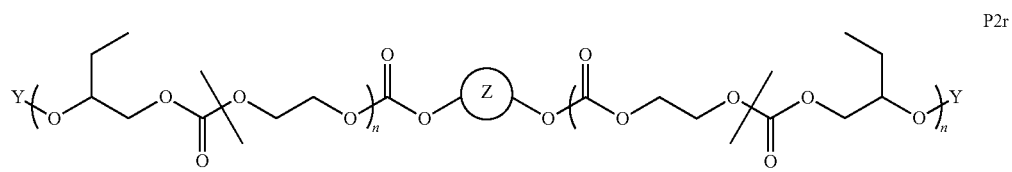

P2r wherein each of (Z), —Y, and n is as defined above and described in classes and subclasses herein.

In certain embodiments, aliphatic polycarbonate chains comprise:

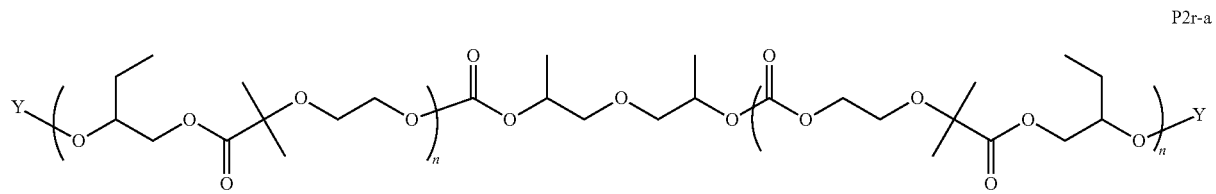

P2r-a wherein each of —Y and n is as defined above and described in classes and subclasses herein.

In certain embodiments, in polycarbonates of structures P2a, P2c, P2d, P2f, P2h, P2j, P2l, P2l-a, P2n, P2p, and P2r, (Z) is selected from the group consisting of: ethylene glycol; diethylene glycol, triethylene glycol, 1,3 propane diol; 1,4 butane diol, hexylene glycol, 1,6 hexane diol, neopentyl glycol, propylene glycol, dipropylene glycol, tripopylene glycol, and alkoxylated derivatives of any of these.

In certain embodiments, in polycarbonates of structures P2a, P2c, P2d, P2f, P2h, P2j, P2l, P2l-a, P2n, P2p, and P2r, —Y is —H.

For polycarbonates comprising repeat units derived from two or more epoxides, such as those represented by structures P2f through P2r-a, depicted above, it is to be understood that the structures drawn may represent mixtures of positional isomers or regioisomers that are not explicitly depicted. For example, the polymer repeat unit adjacent to either end group of the polycarbonate chains can be derived from either one of the two epoxides comprising the copolymers. Thus, while the polymers may be drawn with a particular repeat unit attached to an end group, the terminal repeat units might be derived from either of the two epoxides and a given polymer composition might comprise a mixture of all of the possibilities in varying ratios. The ratio of these end-groups can be influenced by several factors including the ratio of the different epoxides used in the polymerization, the structure of the catalyst used, the reaction conditions used (i.e temperature pressure, etc.) as well as by the timing of addition of reaction components. Similarly, while the drawings above may show a defined regiochemistry for repeat units derived from substituted epoxides, the polymer compositions will, in some cases, contain mixtures of regioisomers. The regioselectivity of a given polymerization can be influenced by numerous factors including the structure of the catalyst used and the reaction conditions employed. To clarify, this means that the composition represented by structure P2r above, may contain a mixture of several compounds as shown in the diagram below. This diagram shows the isomers graphically for polymer P2r, where the structures below the depiction of the chain show each regio- and positional isomer possible for the monomer unit adjacent to the chain transfer agent and the end groups on each side of the main polymer chain. Each end group on the polymer may be independently selected from the groups shown on the left or right while the central portion of the polymer including the chain transfer agent and its two adjacent monomer units may be independently selected from the groups shown. In certain embodiments, the polymer composition comprises a mixture of all possible combinations of these. In other embodiments, the polymer composition is enriched in one or more of these.

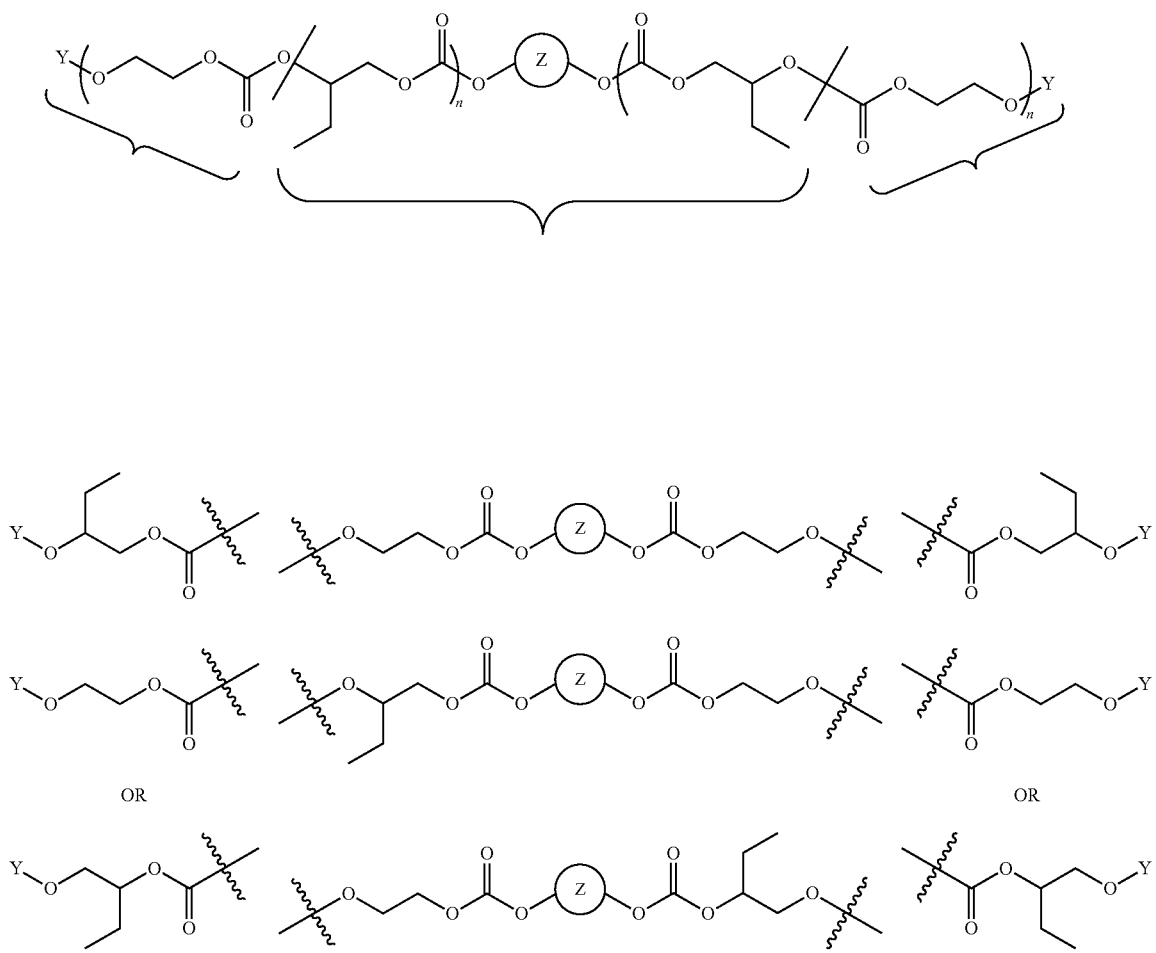

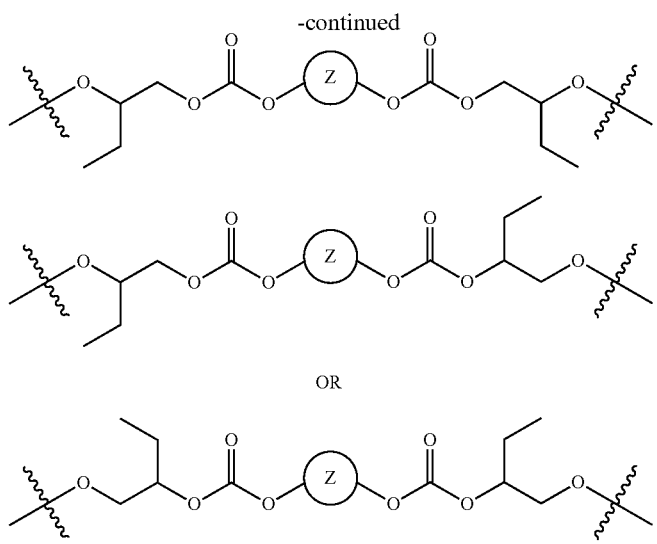
In certain embodiments, the aliphatic polycarbonate polyol is selected from the group consisting of Q1, Q2, Q3, Q4, Q5, Q6, and mixtures of any two or more of these.
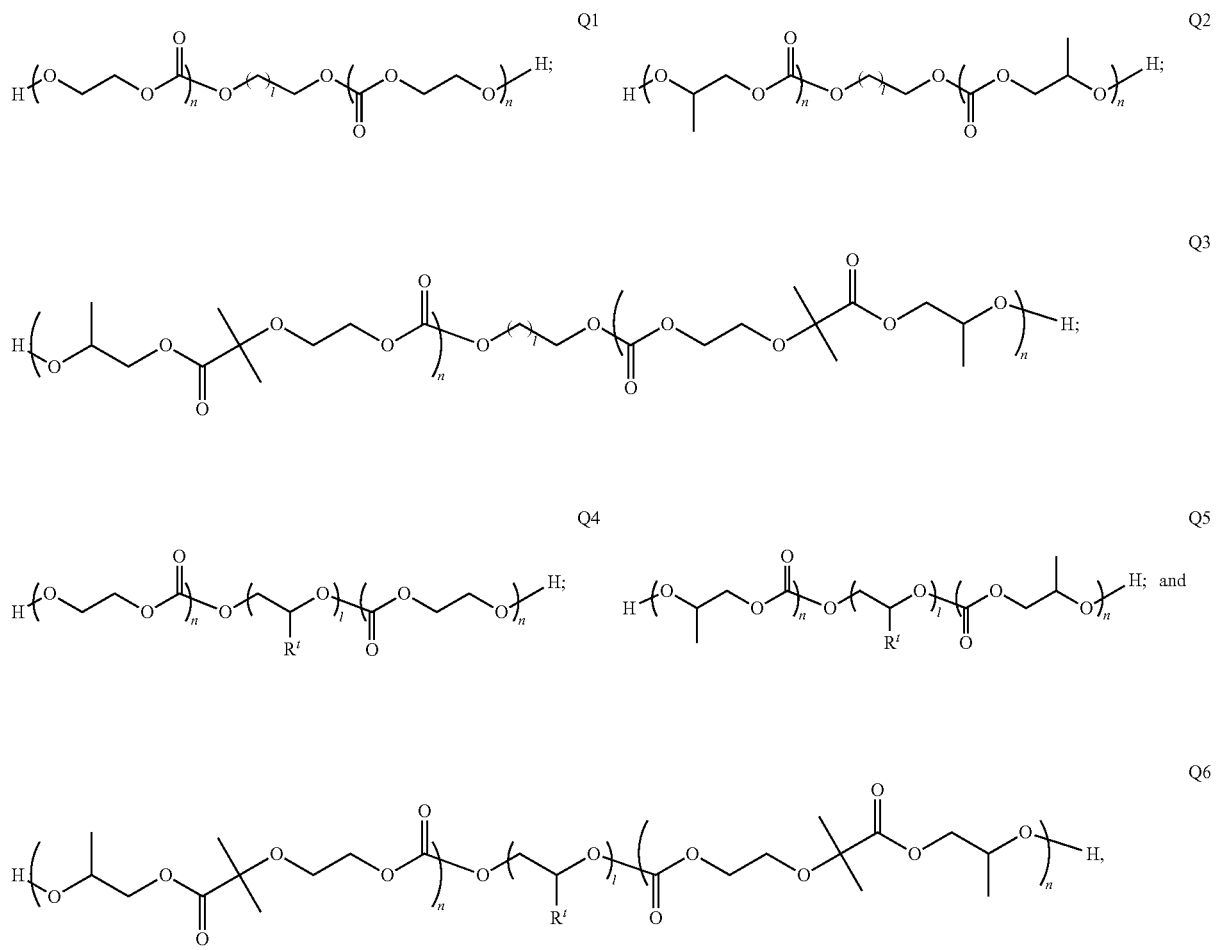
wherein, t is an integer from 1 to 12 inclusive, and $R^t$ is independently at each occurrence —H, or —$CH_3$.

In certain embodiments, the aliphatic polycarbonate polyol is selected from the group consisting of:

Poly(ethylene carbonate) of formula Q1 having an average molecular weight number of between about 500 g/mol and about 3,000 g/mol, a polydispersity index less than about 1.25, at least 85% carbonate linkages, and at least 98% —OH end groups;

Poly(ethylene carbonate) of formula Q1 having an average molecular weight number of about 500 g/mol, a polydispersity index less than about 1.25, at least 85% carbonate linkages, and at least 98% —OH end groups;

Poly(ethylene carbonate) of formula Q1 having an average molecular weight number of about 1,000 g/mol, a polydispersity index less than about 1.25, at least 85% carbonate linkages, and at least 98% —OH end groups;

Poly(ethylene carbonate) of formula Q1 having an average molecular weight number of about 2,000 g/mol, a polydispersity index less than about 1.25, at least 85% carbonate linkages, and at least 98% —OH end groups;

Poly(ethylene carbonate) of formula Q1 having an average molecular weight number of about 3,000 g/mol, a polydispersity index less than about 1.25, at least 85% carbonate linkages, and at least 98% —OH end groups;

Poly(propylene carbonate) of formula Q2 having an average molecular weight number of between about 500 g/mol and about 3,000 g/mol, a polydispersity index less than about 1.25, at least 95% carbonate linkages, and at least 98% —OH end groups;

Poly(propylene carbonate) of formula Q2 having an average molecular weight number of about 500 g/mol, a polydispersity index less than about 1.25, at least 95% carbonate linkages, and at least 98% —OH end groups;

Poly(propylene carbonate) of formula Q2 having an average molecular weight number of about 1,000 g/mol, a polydispersity index less than about 1.25, at least 95% carbonate linkages, and at least 98% —OH end groups;

Poly(propylene carbonate) of formula Q2 having an average molecular weight number of about 2,000 g/mol, a polydispersity index less than about 1.25, at least 95% carbonate linkages, and at least 98% —OH end groups;

Poly(propylene carbonate) of formula Q2 having an average molecular weight number of about 3,000 g/mol, a polydispersity index less than about 1.25, at least 95% carbonate linkages, and at least 98% —OH end groups;

Poly(ethylene-co-propylene carbonate) of formula Q3 having an average molecular weight number of between about 500 g/mol and about 3,000 g/mol, a polydispersity index less than about 1.25, at least 90% carbonate linkages, and at least 98% —OH end groups;

Poly(ethylene-co-propylene carbonate) of formula Q3 having an average molecular weight number of about 500 g/mol, a polydispersity index less than about 1.25, at least 90% carbonate linkages, and at least 98% —OH end groups;

Poly(ethylene-co-propylene carbonate) of formula Q3 having an average molecular weight number of about 1,000 g/mol, a polydispersity index less than about 1.25, at least 90% carbonate linkages, and at least 98% —OH end groups;

Poly(ethylene-co-propylene carbonate) of formula Q3 having an average molecular weight number of about 2,000 g/mol (e.g. n is on average between about 10 and about 11), a polydispersity index less than about 1.25, at least 90% carbonate linkages, and at least 98% —OH end groups;

Poly(ethylene-co-propylene carbonate) of formula Q3 having an average molecular weight number of about 3,000 g/mol, a polydispersity index less than about 1.25, at least 95% carbonate linkages, and at least 98% —OH end groups;

Poly(ethylene carbonate) of formula Q4 having an average molecular weight number of between about 500 g/mol and about 3,000 g/mol (e.g. each n is between about 4 and about 16), a polydispersity index less than about 1.25, at least 95% carbonate linkages, and at least 98% —OH end groups;

Poly(ethylene carbonate) of formula Q4 having an average molecular weight number of about 500 g/mol, a polydispersity index less than about 1.25, at least 85% carbonate linkages, and at least 98% —OH end groups;

Poly(ethylene carbonate) of formula Q4 having an average molecular weight number of about 1,000 g/mol, a polydispersity index less than about 1.25, at least 85% carbonate linkages, and at least 98% —OH end groups;

Poly(ethylene carbonate) of formula Q4 having an average molecular weight number of about 2,000 g/mol, a polydispersity index less than about 1.25, at least 85% carbonate linkages, and at least 98% —OH end groups;

Poly(ethylene carbonate) of formula Q4 having an average molecular weight number of about 3,000 g/mol, a polydispersity index less than about 1.25, at least 85% carbonate linkages, and at least 98% —OH end groups.

Poly(propylene carbonate) of formula Q5 having an average molecular weight number of between about 500 g/mol and about 3,000 g/mol, a polydispersity index less than about 1.25, at least 95% carbonate linkages, and at least 98% —OH end groups;

Poly(propylene carbonate) of formula Q5 having an average molecular weight number of about 500 g/mol, a polydispersity index less than about 1.25, at least 95% carbonate linkages, and at least 98% —OH end groups;

Poly(propylene carbonate) of formula Q5 having an average molecular weight number of about 1,000 g/mol, a polydispersity index less than about 1.25, at least 95% carbonate linkages, and at least 98% —OH end groups;

Poly(propylene carbonate) of formula Q5 having an average molecular weight number of about 2,000 g/mol, a polydispersity index less than about 1.25, at least 95% carbonate linkages, and at least 98% —OH end groups;

Poly(propylene carbonate) of formula Q5 having an average molecular weight number of about 3,000 g/mol, a polydispersity index less than about 1.25, at least 95% carbonate linkages, and at least 98% —OH end groups;

Poly(ethylene-co-propylene carbonate) of formula Q6 having an average molecular weight number of between about 500 g/mol and about 3,000 g/mol, a polydispersity index less than about 1.25, at least 90% carbonate linkages, and at least 98% —OH end groups;

Poly(ethylene-co-propylene carbonate) of formula Q6 having an average molecular weight number of about 500 g/mol, a polydispersity index less than about 1.25, at least 90% carbonate linkages, and at least 98% —OH end groups;

Poly(ethylene-co-propylene carbonate) of formula Q6 having an average molecular weight number of about 1,000 g/mol, a polydispersity index less than about 1.25, at least 90% carbonate linkages, and at least 98% —OH end groups;

Poly(ethylene-co-propylene carbonate) of formula Q6 having an average molecular weight number of about 2,000 g/mol (e.g. n is on average between about 10 and about 11), a polydispersity index less than about 1.25, at least 90% carbonate linkages, and at least 98% —OH end groups;

Poly(ethylene-co-propylene carbonate) of formula Q6 having an average molecular weight number of about 3,000 g/mol, a polydispersity index less than about 1.25, at least 95% carbonate linkages, and at least 98% —OH end groups; and Mixtures of any two or more of these.

In certain embodiments, the Ⓩ in the embedded chain transfer agent is a moiety derived from a polymeric diol or higher polyhydric alcohol. In certain embodiments, such polymeric alcohols are polyether or polyester polyols. In certain embodiments Ⓩ is a polyether polyol comprising ethylene glycol or propylene glycol repeating units (—OCH$_2$CH$_2$O—, or —OCH$_2$CH(CH$_3$)O—) or combinations of these. In certain embodiments, Ⓩ is a polyester polyol comprising the reaction product of a diol and a diacid, or a material derived from ring-opening polymerization of one or more lactones.

In certain embodiments where Ⓩ comprises a polyether diol, the aliphatic polycarbonate polyol has a structure Q7:

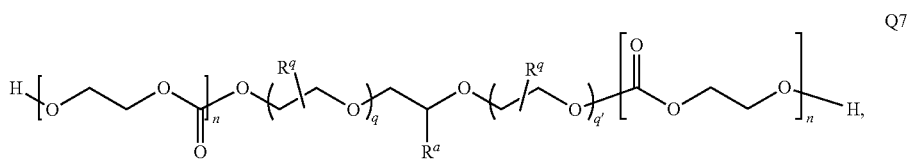

wherein,

R$^q$ is at each occurrence in the polymer chain independently —H or —CH$_3$;

R$^a$ is —H, or —CH$_3$;

q and q' are independently an integer from about 0 to about 40; and and n is as defined above and in the examples and embodiments herein.

In certain embodiments, an aliphatic polycarbonate polyol is selected from the group consisting of:

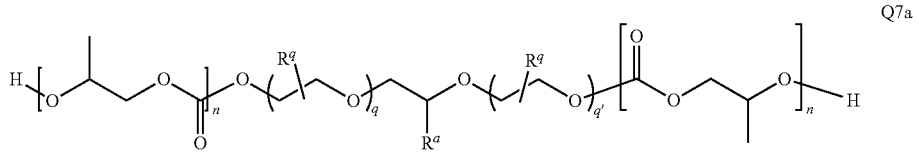

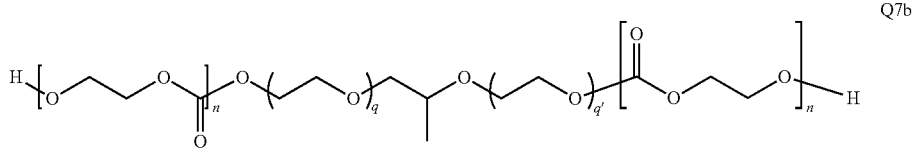

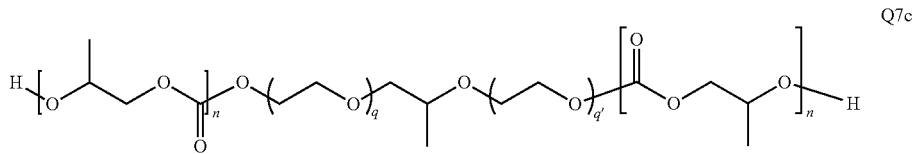

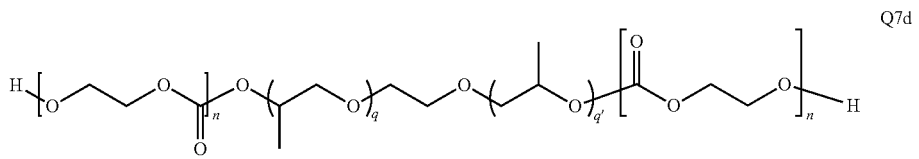

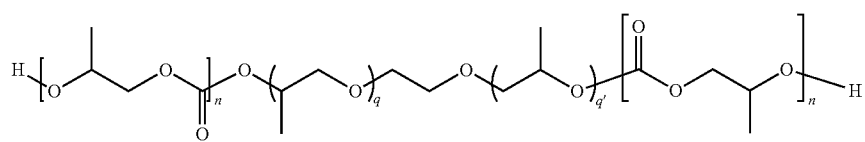
Q7e

In certain embodiments, where aliphatic polycarbonate polyols comprise compounds conforming to structure Q7, the moiety (Z) is derived from a commercially available polyether polyol such as those typically used in the formulation of polyurethane compositions.

In certain embodiments where (Z) comprises a polyester diol, the aliphatic polycarbonate polyol has a structure Q8:

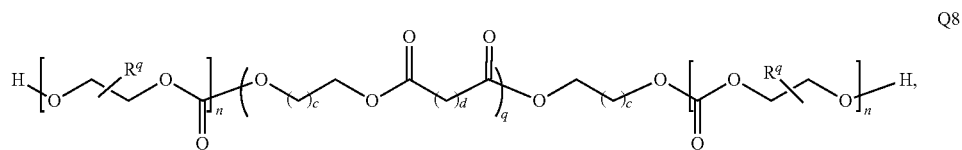
Q8 wherein,
c at each occurrence in the polymer chain independently is an integer from 0 to 6;
d at each occurrence in the polymer chain independently is an integer from 1 to 11; and
each of $R^q$, n, and q is as defined above and in the examples and embodiments herein.

In certain embodiments, an aliphatic polycarbonate polyol is selected from the group consisting of:

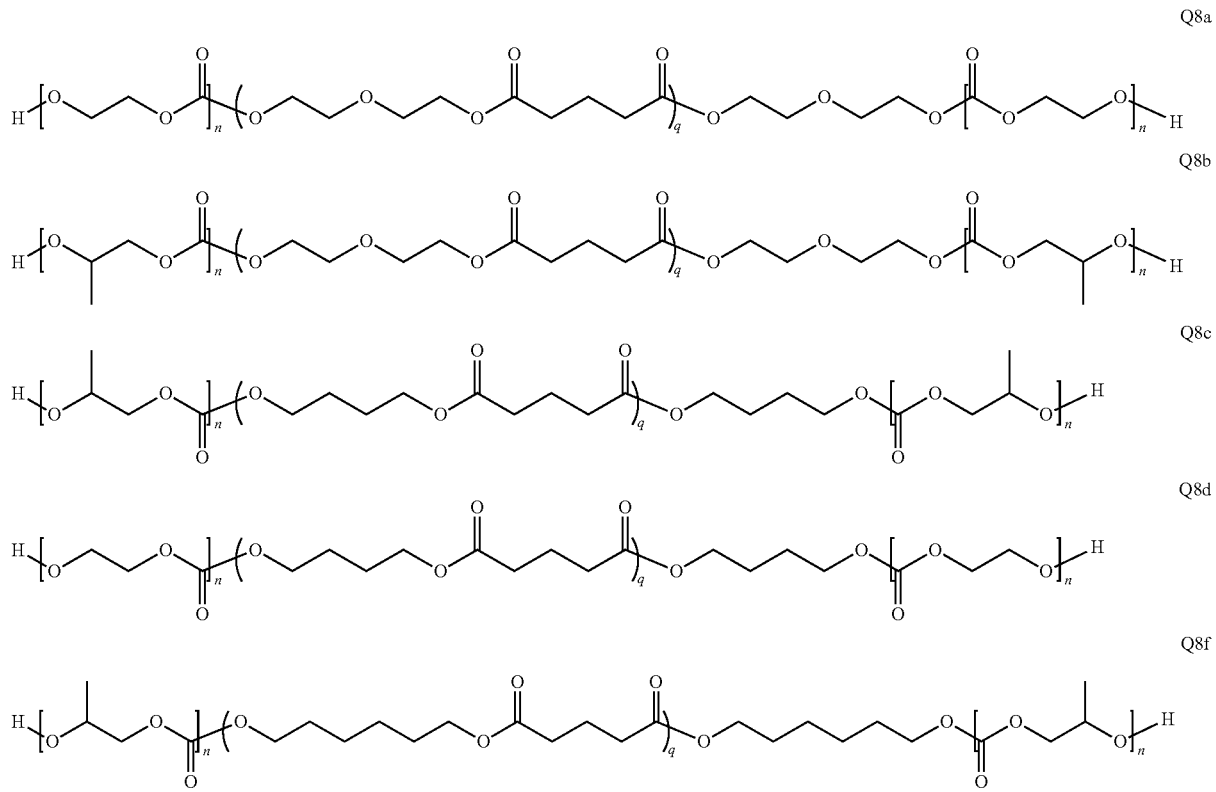

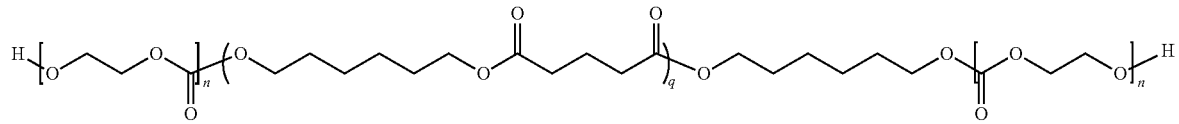

In certain embodiments, where aliphatic polycarbonate polyols comprise compounds conforming to structure Q8, the moiety ⓩ is derived from a commercially available polyester polyol such as those typically used in the formulation of polyurethane compositions.

B. Isocyanate Reagents

As described above, polyurethanes useful in the present invention are derived from the reaction of one other polyols with isocyanate reagents. The purpose of these isocyanate reagents is to react with the reactive end groups on the polyols to form higher molecular weight structures through chain extension and/or cross-linking.

The art of polyurethane synthesis is well advanced and a very large number of isocyanates and related polyurethane precursors are known in the art. While this section of the specification describes isocyanates suitable for use in certain embodiments of the present invention, it is to be understood that it is within the capabilities of one skilled in the art of polyurethane formulation to use alternative isocyanates along with the teachings of this disclosure to formulate additional compositions of matter within the scope of the present invention. Descriptions of suitable isocyanate compounds and related methods can be found in: *Chemistry and Technology of Polyols for Polyurethanes* Ionescu, Mihail 2005 (ISBN 978-1-84735-035-0), and H. Ulrich, "Urethane Polymers," Kirk-Othmer Encyclopedia of Chemical Technology, 1997 the entirety of each of which is incorporated herein by reference.

In certain embodiments, the isocyanate reagents comprise two or more isocyanate groups per molecule. In certain embodiments, the isocyanate reagents are diisocyanates. In other embodiments, the isocyanate reagents are higher polyisocyanates such as triisocyanates, tetraisocyanates, isocyanate polymers or oligomers, and the like, which are typically a minority component of a mix of predominantly diisocyanates. In certain embodiments, the isocyanate reagents are aliphatic polyisocyanates or derivatives or oligomers of aliphatic polyisocyanates. In other embodiments, the isocyanates are aromatic polyisocyanates or derivatives or oligomers of aromatic polyisocyanates. In certain embodiments, the compositions may comprise mixtures of any two or more of the above types of isocyanates.

In certain embodiments, isocyanate reagents usable for the production of the polyurethane adhesive include aliphatic, cycloaliphatic and aromatic diisocyanate compounds.

Suitable aliphatic and cycloaliphatic isocyanate compounds include, for example, 1,3-trimethylene diisocyanate, 1,4-tetramethylene diisocyanate, 1,6-hexamethylene diisocyanate, 2,2,4-trimethylhexamethylene diisocyanate, 2,4,4-trimethylhexamethylene diisocyanate, 1,9-nonamethylene diisocyanate, 1,10-decamethylene diisocyanate, 1,4-cyclohexane diisocyanate, isophorone diisocyanate, 4,4,'-dicyclohexylmethane diisocyanate, 2,2'-diethylether diisocyanate, hydrogenated xylylene diisocyanate, and hexamethylene diisocyanate-biuret.

The aromatic isocyanate compounds include, for example, p-phenylene diisocyanate, tolylene diisocyanate, xylylene diisocyanate, 4,4'-diphenyl diisocyanate, 2,4'-diphenylmethane diisocyanate, 1,5-naphthalene diisocyanate, 4,4'-diphenylmethane diisocyanate (MDI), 3,3'-methyleneditolylene-4,4'-diisocyanate, tolylenediisocyanate-trimethylolpropane adduct, triphenylmethane triisocyanate, 4,4'-diphenylether diisocyanate, tetrachlorophenylene diisocyanate, 3,3'-dichloro-4,4'-diphenylmethane diisocyanate, and triisocyanate phenylthiophosphate.

In certain embodiments, the isocyanate compound employed comprises one or more of: 4,4'-diphenylmethane diisocyanate, 1,6-hexamethylene hexamethylene diisocyanate and isophorone diisocyanate. In certain embodiments, the isocyanate compound employed is 4,4'-diphenylmethane diisocyanate. The above-mentioned diisocyanate compounds may be employed alone or in mixtures of two or more thereof.

In certain embodiments, an isocyanate reagent is selected from the group consisting of: 1,6-hexamethylaminediisocyanate (HDI), isophorone diisocyanate (IPDI), 4,4' methylene-bis(cyclohexyl isocyanate) ($H_{12}$MDI), 2,4-toluene diisocyanate (TDI), 2,6-toluene diisocyanate (TDI), diphenylmethane-4,4'-diisocyanate (MDI), diphenylmethane-2,4'-diisocyanate (MDI), xylylene diisocyanate (XDI), 1,3-Bis (isocyanatomethyl)cyclohexane (H6-XDI), 2,2,4-trimethylhexamethylene diisocyanate, 2,4,4-trimethylhexamethylene diisocyanate (TMDI), m-tetramethylxylylene diisocyanate (TMXDI), p-tetramethylxylylene diisocyanate (TMXDI), isocyanatomethyl-1,8-ictane diisocyanate (TIN), triphenylmethane-4,4',4"triisocyanate, Tris(p-isocyanatomethyl)thiosulfate, 1,3-Bis (isocyanatomethyl)benzene, 1,4-tetramethylene diisocyanate, trimethylhexane diisocyanate, 1,6-hexamethylene diisocyanate, 1,4-cyclohexyl diisocyanate, lysine diisocyanate, HDI allophonate trimer, HDI urethdione and HDI-trimer and mixtures of any two or more of these.

In certain embodiments, an isocyanate reagent is selected from the group consisting of 4,4'-diphenylmethane diisocyanate, 1,6-hexamethylene diisocyanate and isophorone diisocyanate. In certain embodiments, an isocyanate reagent is 4,4'-diphenylmethane diisocyanate. certain embodiments, an isocyanate reagent is 1,6-hexamethylene diisocyanate. certain embodiments, an isocyanate reagent is isophorone diisocyanate.

Isocyanates suitable for certain embodiments of the present invention are available commercially under various trade names. Examples of suitable commercially available isocyanates include materials sold under trade names: Desmodur® (Bayer Material Science), Tolonate® (Perstorp), Takenate® (Takeda), Vestanat® (Evonik), Desmotherm® (Bayer Material Science), Bayhydur® (Bayer Material Science), Mondur (Bayer Material Science), Suprasec (Huntsman Inc.), Lupranate® (BASF), Trixene (Baxenden), Hartben® (Benasedo), Ucopol® (Sapici), and Basonat® (BASF). Each of these trade names encompasses a variety of isocyanate materials available in various grades and formulations. The selection of suitable commercially available isocyanate materials as reagents to produce polyurethane compositions for a particular application is within the capability of one skilled in the art of polyurethane coating technology using the teachings and disclosure of this patent application along with the information provided in the product data sheets supplied by the above-mentioned suppliers.

Additional isocyanates suitable for certain embodiments of the present invention are sold under the trade name Lupranate® (BASF). In certain embodiments, the isocyanates are selected from the group consisting of the materials shown in Table 1, and typically from the subset of isocyanates from this list with the functionality between 1.95 and 2.1.

TABLE 1

| Product | Description | % NCO | Nominal Funct. |
|---|---|---|---|
| Lupranate ® M | 4,4' MDI | 33.5 | 2 |
| Lupranate ® MS | 4,4' MDI | 33.5 | 2 |
| Lupranate ® MI | 2,4' and 4,4' MDI Blend | 33.5 | 2 |
| Lupranate ® LP30 | Liquid Pure 4,4' MDI | 33.1 | 2 |
| Lupranate ® 227 | Monomeric/Modified MDI Blend | 32.1 | 2 |
| Carbodiimide Modified MDI | | | |
| Lupranate ® 5143 | Carboiimide Modified 4,4' MDI | 29.2 | 2.2 |
| Lupranate ® MM103 | Carboiimide Modified 4,4' MDI | 29.5 | 2.2 |
| Lupranate ® 219 | Carboiimide Modified 4,4' MDI | 29.2 | 2.2 |
| Lupranate ® 81 | Carboiimide Modified MDI | 29.5 | 2.2 |
| Lupranate ® 218 | Carboiimide Modified MDI | 29.5 | 2.2 |
| Polymeric MDI (PMDI) | | | |
| Lupranate ® 241 | Low Functionality Polymeric | 32.6 | 2.3 |
| Lupranate ® 230 | Low Viscosity Polymeric | 32.5 | 2.3 |
| Lupranate ® 245 | Low Viscosity Polymeric | 32.3 | 2.3 |
| Lupranate ® TF2115 | Mid Functionality Polymeric | 32.3 | 2.4 |
| Lupranate ® 78 | Mid Functionality Polymeric | 32 | 2.3 |
| Lupranate ® 234 | Low Functionality Polymeric | 32 | 2.4 |
| Lupranate ® 273 | Low Viscosity Polymeric | 32 | 2.5 |
| Lupranate ® 266 | Low Viscosity Polymeric | 32 | 2.5 |
| Lupranate ® 261 | Low Viscosity Polymeric | 32 | 2.5 |
| Lupranate ® 255 | Low Viscosity Polymeric | 31.9 | 2.5 |
| Lupranate ® 268 | Low Viscosity Polymeric | 30.6 | 2.4 |
| Select MDI Prepolymers | | | |
| Lupranate ® 5010 | High Functional Prepolymer | 28.6 | 2.3 |
| Lupranate ® 233 | Low Visc. Derivative ot Pure MDI | 27.5 | 2.2 |
| Lupranate ® 5040 | Mid Functional, Low Viscosity | 26.3 | 2.1 |
| Lupranate ® 5110 | Polymeric MDI Prepolymer | 25.4 | 2.3 |
| Lupranate ® MP102 | 4,4' MDI Prepolymer | 23 | 2 |
| Lupranate ® 5090 | Special 4,4' MDI Prepolymer | 23 | 2.1 |
| Lupranate ® 5050 | Mid Functional, Mid NCO Prepol | 21.5 | 2.1 |
| Lupranate ® 5030 | Special MDI Prepolymer | 18.9 | NA |
| Lupranate ® 5080 | 2,4'-MDI Enhanced Prepolymer | 15.9 | 2 |
| Lupranate ® 5060 | Low Funct, Higher MW Prepol | 15.5 | 2 |
| Lupranate ® 279 | Low Funct, Special Prepolymer | 14 | 2 |
| Lupranate ® 5070 | Special MDI Prepolymer | 13 | 2 |
| Lupranate ® 5020 | Low Functionality, Low NCO | 9.5 | 2 |
| Toluene Diisocyanate (TDI) | | | |
| Lupranate ® T80- | 80/20:2,4/2,6 TDI | 48.3 | 2 |
| Lupranate ® T80- | High Acidity TDI | 48.3 | 2 |
| Lupranate ® 8020 | 80/20:TDI/Polymeric MDI | 44.6 | 2.1 |

Other isocyanates suitable for certain embodiments of the present invention are sold under the trade name Desmodur® available from Bayer Material Science. In certain embodiments, the isocyanates are selected from the group consisting of the materials shown in Table 2, and typically from the subset of isocyanates from with functionality between 1.95 and 2.1.

TABLE 2

| Trade Name | Description |
| --- | --- |
| Desmodur ® 2460 M | Monomeric diphenylmethane diisocyanate with high 2,4'-isomer content |
| Desmodur ® 44 M | A monomeric diphenylmethane-4,4'-diisocyanate (MDI). |
| Desmodur ® 44 MC | Desmodur 44 MC Flakes is a monomeric diphenylmethane-4,4'-diisocyanate (MDI). |
| Desmodur ® BL 1100/1 | Blocked aromatic polyisocyanate based on TDI |
| Desmodur ® BL 1265 MPA/X | Blocked aromatic polyisocyanate based on TDI |
| Desmodur ® BL 3175 SN | Blocked, aliphatic polyisocyanate based on HDI |
| Desmodur ® BL 3272 MPA | Blocked aliphatic polyisocyanate based on HDI |
| Desmodur ® BL 3370 MPA | Blocked aliphatic polyisocyanate based on HDI |
| Desmodur ® BL 3475 BA/SN | Aliphatic crosslinking stoving urethane resin based on HDI/IPDI |
| Desmodur ® BL 3575/1 MPA/SN | Blocked aliphatic polyisocyanate based on HDI |
| Desmodur ® BL 4265 SN | Blocked, aliphatic polyisocyanate based on IPDI |
| Desmodur ® BL 5375 | Blocked aliphatic polyisocyanate based on H 12 MDI |
| Desmodur ® CD-L | Desmodur CD-L is a modified isocyanate based on diphenylmethane-4,4'-diisocyanate. |
| Desmodur ® CD-S | Desmodur CD-S is a modified isocyanate based on diphenylmethane-4,4'-diisocyanate. |
| Desmodur ® D XP 2725 | Hydrophilically modified polyisocyanate |
| Desmodur ® DA-L | Hydrophilic aliphatic polyisocyanate based on hexamethylene diisocyanate |
| Desmodur ® DN | Aliphatic polyisocyanate of low volatility |
| Desmodur ® E 1160 | Aromatic polyisocyanate prepolymer based on toluene diisocyanate |
| Desmodur ® E 1361 BA | Aromatic polyisocyanate prepolymer based on toluylene diisocyanate |
| Desmodur ® E 1361 MPA/X | Aromatic polyisocyanate prepolymer based on toluene diisocyanate |
| Desmodur ® E 14 | Aromatic polyisocyanate prepolymer based on toluene diisocyanate |
| Desmodur ® E 15 | Aromatic polyisocyanate prepolymer based on toluene diisocyanate. |
| Desmodur ® E 1660 | Aromatic polyisocyanate prepolymer based on toluene diisocyanate. |
| Desmodur ® E 1750 PR | Polyisocyanate prepolymer based on toluene diisocyanate |
| Desmodur ® E 20100 | Modified polyisocyanate prepolymer based on diphenylmethane diisocyanate. |
| Desmodur ® E 21 | Aromatic polyisocyanate prepolymer based on diphenylmethane diisocyanate (MDI). |
| Desmodur ® E 2190 X | Aromatic polyisocyanate prepolymer based on diphenylmethane diisocyanate (MDI) |
| Desmodur ® E 22 | Aromatic polyisocyanate prepolymer based on diphenylmethane diisocyanate. |
| Desmodur ® E 2200/76 | Desmodur E 2200/76 is a prepolymer based on (MDI) with isomers. |
| Desmodur ® E 23 | Aromatic polyisocyanate prepolymer based on diphenylmethane diisocyanate (MDI). |
| Desmodur ® E 29 | Polyisocyanate prepolymer based on diphenylmethane diisocyanate. |
| Desmodur ® E 305 | Desmodur E 305 is a largely linear aliphatic NCO prepolymer based on hexamethylene diisocyanate. |
| Desmodur ® E 3265 MPA/SN | Aliphatic polyisocyanate prepolymer based on hexamethylene diisocyanate (HDI) |
| Desmodur ® E 3370 | Aliphatic polyisocyanate prepolymer based on hexamethylene diisocyanate |
| Desmodur ® E XP 2605 | Polyisocyanate prepolymer based on toluene diisocyanate and diphenylmethan diisocyanate |
| Desmodur ® E XP 2605 | Polyisocyanate prepolymer based on toluene diisocyanate and diphenylmethan diisocyanate |
| Desmodur ® E XP 2715 | Aromatic polyisocyanate prepolymer based on 2,4'-diphenylmethane diisocyanate (2,4'-MDI) and a hexanediol |
| Desmodur ® E XP 2723 | Aromatic polyisocyanate prepolymer based on diphenylmethane diisocyanate (MDI). |
| Desmodur ® E XP 2726 | Aromatic polyisocyanate prepolymer based on 2,4'-diphenylmethane diisocyanate (2,4'-MDI) |
| Desmodur ® E XP 2727 | Aromatic polyisocyanate prepolymer based on diphenylmethane diisocyanate. |
| Desmodur ® E XP 2762 | Aromatic polyisocyanate prepolymer based on diphenylmethane diisocyanate (MDI). |

TABLE 2-continued

| Trade Name | Description |
|---|---|
| Desmodur ® H | Monomeric aliphatic diisocyanate |
| Desmodur ® HL | Aromatic/aliphatic polyisocyanate based on toluylene diisocyanate/hexamethylene diisocyanate |
| Desmodur ® I | Monomeric cycloaliphatic diisocyanate. |
| Desmodur ® IL 1351 | Aromatic polyisocyanate based on toluene diisocyanate |
| Desmodur ® IL 1451 | Aromatic polyisocyanate based on toluene diisocyanate |
| Desmodur ® IL BA | Aromatic polyisocyanate based on toluene diisocyanate |
| Desmodur ® IL EA | Aromatic polyisocyante resin based on toluylene diisocyanate |
| Desmodur ® L 1470 | Aromatic polyisocyanate based on toluene diisocyanate |
| Desmodur ® L 67 BA | Aromatic polyisocyanate based on tolulene diisocyanate |
| Desmodur ® L 67 MPA/X | Aromatic polyisocyanate based on tolulene diisocyanate |
| Desmodur ® L 75 | Aromatic polyisocyanate based on tolulene diisocyanate |
| Desmodur ® LD | Low-functionality isocyanate based on hexamethylene diisocyanate (HDI) |
| Desmodur ® LS 2424 | Monomeric diphenylmethane diisocyanate with high 2,4'-isomer content |
| Desmodur ® MT | Polyisocyanate prepolymer based on diphenylmethane diisocyanate |
| Desmodur ® N 100 | Aliphatic polyisocyanate (HDI biuret) |
| Desmodur ® N 3200 | Aliphatic polyisocyanate (low-viscosity HDI biuret) |
| Desmodur ® N 3300 | Aliphatic polyisocyanate (HDI trimer) |
| Desmodur ® N 3368 BA/SN | Aliphatic polyisocyanate (HDI trimer) |
| Desmodur ® N 3368 SN | Aliphatic polyisocyanate (HDI trimer) |
| Desmodur ® N 3386 BA/SN | Aliphatic polyisocyanate (HDI trimer) |
| Desmodur ® N 3390 BA | Aliphatic polyisocyanate (HDI trimer) |
| Desmodur ® N 3390 BA/SN | Aliphatic polyisocyanate (HDI trimer) |
| Desmodur ® N 3400 | Aliphatic polyisocyanate (HDI uretdione) |
| Desmodur ® N 3600 | Aliphatic polyisocyanate (low-viscosity HDI trimer) |
| Desmodur ® N 3790 BA | Aliphatic polyisocyanate (high functional HDI trimer) |
| Desmodur ® N 3800 | Aliphatic polyisocyanate (flexibilizing HDI trimer) |
| Desmodur ® N 3900 | Low-viscosity, aliphatic polyisocyanate resin based on hexamethylene diisocyanate |
| Desmodur ® N 50 BA/MPA | Aliphatic polyisocyanate (HDI biuret) |
| Desmodur ® N 75 BA | Aliphatic polyisocyanate (HDI biuret) |
| Desmodur ® N 75 MPA | Aliphatic polyisocyanate (HDI biuret) |
| Desmodur ® N 75 MPA/X | Aliphatic polyisocyanate (HDI biuret) |
| Desmodur ® NZ 1 | Aliphatic polyisocyanate |
| Desmodur ® PC-N | Desmodur PC-N is a modified diphenyl-methane-4,4'-diisocyanate (MDI). |
| Desmodur ® PF | Desmodur PF is a modified diphenyl-methane-4,4'-diisocyanate (MDI). |
| Desmodur ® PL 340, 60% BA/SN | Blocked aliphatic polyisocyanate based on IPDI |
| Desmodur ® P1350 | Blocked aliphatic polyisocyanate based on HDI |
| Desmodur ® RC | Solution of a polyisocyanurate of toluene diisocyanate (TDI) in ethyl acetate. |
| Desmodur ® RE | Solution of triphenylmethane-4,4',4''-triisocyanate in ethyl acetate |
| Desmodur ® RFE | Solution of tris(p-isocyanatophenyl) thiophosphate in ethyl acetate |
| Desmodur ® RN | Solution of a polyisocyanurate with aliphatic and aromatic NCO groups in ethyl acetate. |
| Desmodur ® T 100 | Pure 2,4'-toluene diisocyanate (TDI) |
| Desmodur ® T 65 N | 2,4- and 2,6-toluene diisocyanate (TDI) in the ratio 67:33 |
| Desmodur ® T 80 | 2,4- and 2,6-toluene diisocyanate (TDI) in the ratio 80:20 |
| Desmodur ® T 80 P | 2,4- and 2,6-toluene diisocyanate (TDI) in the ratio 80:20 with an increased content of hydrolysable chlorine |
| Desmodur ® VH 20 N | Polyisocyanate based on diphenylmethane diisocyanate |
| Desmodur ® VK | Desmodur VK products re mixtures of diphenylmethane-4,4'-diisocyanate (MDI) with isomers and higher functional |
| Desmodur ® VKP 79 | Desmodur VKP 79 is a modified diphenylmethane-4,4'-diisocyanate (MDI) with isomers and homologues. |
| Desmodur ® VKS 10 | Desmodur VKS 10 is a mixture of diphenylmethane-4,4'-diisocyanate (MDI) with isomers and higher functional |
| Desmodur ® VKS 20 | Desmodur VKS 20 is a mixture of diphenylmethane-4,4'-diisocyanate (MDI) with isomers and higher functional |
| Desmodur ® VKS 20 F | Desmodur VKS 20 F is a mixture of diphenylmethane-4,4'-diisocyanate (MDI) with isomers and higher functional |
| Desmodur ® VKS 70 | Desmodur VKS 70 is a mixture of diphenylmethane-4,4'-diisocyanate (MDI) with isomers and homologues. |
| Desmodur ® VL | Aromatic polyisocyanate based on diphenylmethane diisocyanate |
| Desmodur ® VP LS 2078/2 | Blocked aliphatic polyisocyanate based on IPDI |
| Desmodur ® VP LS 2086 | Aromatic polyisocyanate prepolymer based on diphenylmethane diisocyanate |
| Desmodur ® VP LS 2257 | Blocked aliphatic polyisocyanate based on HDI |
| Desmodur ® VP LS 2371 | Aliphatic polyisocyanate prepolymer based on isophorone diisocyanate. |

TABLE 2-continued

| Trade Name | Description |
| --- | --- |
| Desmodur ® VP LS 2397 | Desmodur VP LS 2397 is a linear prepolymer based on polypropylene ether glycol and diphenylmethane diisocyanate |
| Desmodur ® W | Monomeric cycloaliphatic diisocyanate |
| Desmodur ® W/1 | Monomeric cycloaliphatic diisocyanate |
| Desmodur ® XP 2404 | Desmodur XP 2404 is a mixture of monomeric polyisocyanates |
| Desmodur ® XP 2406 | Aliphatic polyisocyanate prepolymer based on isophorone diisocyanate |
| Desmodur ® XP 2489 | Aliphatic polyisocyanate |
| Desmodur ® XP 2505 | Desmodur XP 2505 is a prepolymer containing ether groups based on diphenylmethane-4,4'-diisocyanates (MDI) with |
| Desmodur ® XP 2551 | Aromatic polyisocyanate based on diphenylmethane diisocyanate |
| Desmodur ® XP 2565 | Low-viscosity, aliphatic polyisocyanate resin based on isophorone diisocyanate. |
| Desmodur ® XP 2580 | Aliphatic polyisocyanate based on hexamethylene diisocyanate |
| Desmodur ® XP 2599 | Aliphatic prepolymer containing ether groups and based on hexamethylene-1,6-diisocyanate (HDI) |
| Desmodur ® XP 2617 | Desmodur XP 2617 is a largely linear NCO prepolymer based on hexamethylene diisocyanate. |
| Desmodur ® XP 2665 | Aromatic polyisocyanate prepolymer based on diphenylmethane diisocyanate (MDI). |
| Desmodur ® XP 2675 | Aliphatic polyisocyanate (highly functional HDI trimer) |
| Desmodur ® XP 2679 | Aliphatic polyisocyanate (HDI allophanate trimer) |
| Desmodur ® XP 2714 | Silane-functional aliphatic polyisocyanate based on hexamethylene diisocyanate |
| Desmodur ® XP 2730 | Low-viscosity, aliphatic polyisocyanate (HDI uretdione) |
| Desmodur ® XP 2731 | Aliphatic polyisocyanate (HDI allophanate trimer) |
| Desmodur ® XP 2742 | Modified aliphatic Polyisocyanate (HDI-Trimer), contains SiO2—nanoparticles |

Additional isocyanates suitable for certain embodiments of the present invention are sold under the trade name Tolonate® (Perstorp). In certain embodiments, the isocyanates are selected from the group consisting of the materials shown in Table 3, and typically from the subset of this list with the functionality in the range of 1.95 and 2.1

TABLE 3

| Tolonate ™ D2 | a blocked aliphatic polyisocyanate, supplied at 75% solids in aromatic solvent |
| --- | --- |
| Tolonate ™ HDB | a viscous solvent-free aliphatic polyisocyanate |
| Tolonate ™ HDB-LV | a solvent free low viscosity aliphatic polyisocyanate |
| Tolonate ™ HDB 75 B | an aliphatic polyisocyanate, supplied at 75% solids in methoxy propyl acetate |
| Tolonate ™ HDB 75 BX | an aliphatic polyisocyanate, supplied at 75% solids |
| Tolonate ™ HDT | a medium viscosity, solvent-free aliphatic polyisocyanate |
| Tolonate ™ HDT-LV | is a solvent free low viscosity aliphatic polyisocyanate |
| Tolonate ™ HDT-LV2 | a solvent free, very low viscosity aliphatic polyisocyanate |
| Tolonate ™ HDT 90 | an aliphatic polyisocyanate, based on HDI-trimer (isocyanurate), supplied at 90% solids |
| Tolonate ™ HDT 90 B | an aliphatic polyisocyanate, based on HDI-trimer (isocyanurate), supplied at 90% solids |
| Tolonate ™ IDT 70 B | an aliphatic polyisocyanate, based on HDI-trimer (isocyanurate), supplied at 70% solids |
| Tolonate ™ IDT 70 S | an aliphatic polyisocyanate, based on HDI-trimer (isocyanurate), supplied at 70% solids |
| Tolonate ™ X FD 90 B | a high functionality, fast drying aliphatic polyisocyanate based on HDI-trimer, supplied at 90% solids |

Other isocyanates suitable for certain embodiments of the present invention are sold under the trade name Mondur® available from Bayer Material Science. In certain embodiments, the isocyanates are selected from the group consisting of the materials shown in Table 4, and typically from the subset of isocyanates from this list with functionality between 1.95 and 2.1.

TABLE 4

| Trade Name | Description |
|---|---|
| MONDUR ® 445 | TDI/MDI blend polyisocyanate; blend of toluene diisocyanate and polymeric diphenylmethane diisocyanate; NCO weight 44.5-45.2% |
| MONDUR ® 448 | modified polymeric diphenylmethane diisocyanate (pMDI) prepolymer; NCO weight 27.7%; viscosity 140 mPa · s @ 25° C.; equivalent weight 152; functionality 2.2 |
| MONDUR ® 489 | modified polymeric diphenylmethane diisocyanate (pMDI); NCO weight 31.5%; viscosity 700 mPa · s @ 25° C.; equivalent weight 133; functionality 3.0 |
| MONDUR ® 501 | modified monomeric diphenylmethane diisocyanate (mMDI); isocyanate-terminated polyester prepolymer; NCO weight 19.0%; viscosity 1,100 mPa · s @ 25° C.; equivalent weight 221; functionality 2 |
| MONDUR ® 541 | polymeric diphenylmethane diisocyanate (pMDI); binder for composite wood products and as a raw material in adhesive formulations; NCO weight 31.5%; viscosity 200 mPa · s @ 25° C. |
| MONDUR ® 582 | polymeric diphenylmethane diisocyanate (pMDI); binder for composite wood products and as a raw material in adhesive formulations; NCO weight 31.0%; viscosity 200 mPa · s @ 25° C. |
| MONDUR ® 541-Light | polymeric diphenylmethane diisocyanate (pMDI); NCO weight 32.0%; viscosity 70 mPa · s @ 25° C.; equivalent weight 131; functionality 2.5 |
| MONDUR ® 841 | modified polymeric MDI prepolymer; NCO, Wt 30.5%; Acidity, Wt 0.02%; Amine Equivalent 132; Viscosity at 25° C., mPa · s 350; Specific gravity at 25° C. 1.24; Flash Point, PMCC, ° F. >200 |
| MONDUR ® 1437 | modified diphenylmethane diisocyanate (mMDI); isocyanate-terminated polyether prepolymer; NCO weight 10.0%; viscosity 2,500 mPa · s @ 25° C.; equivalent weight 420; functionality 2 |
| MONDUR ® 1453 | modified diphenylmethane diisocyanate (mMDI); isocyanate-terminated polyether prepolymer based on polypropylene ether glycol (PPG); NCO weight 16.5%; viscosity 600 mPa · s @ 25° C.; equivalent weight 254; functionality 2 |
| MONDUR ® 1515 | modified polymeric diphenylmethane diisocyanate (pMDI) prepolymer; used in the production of rigid polyurethane foams, especially for the appliance industry; NCO weight 30.5%; viscosity 350 mPa · s @ 25° C. |
| MONDUR ® 1522 | modified monomeric 4,4-diphenylmethane diisocyanate (mMDI); NCO weight 29.5%; viscosity 50 mPa · s @ 25° C.; equivalent weight 143; functionality 2.2 |
| MONDUR ® MA-2300 | modified monomeric MDI, allophanate-modified 4,4'-diphenylmethane diisocyanate (mMDI); NCO weight 23.0%; viscosity 450 mPa · s @ 25° C.; equivalent weight 183; functionality 2.0 |
| MONDUR ® MA 2600 | modified monomeric MDI, allophanate-modified 4,4'-diphenylmethane diisocyanate (mMDI); NCO weight 26.0%; viscosity 100 mPa · s @ 25° C.; equivalent weight 162; functionality 2.0 |
| MONDUR ® MA 2601 | aromatic diisocyanate blend, allophanate-modified 4,4'-diphenylmethane diisocyanate (MDI) blended with polymeric diphenylmethane diisocyanate (pMDI) containing 2,4'-isomer; NCO weight 29.0%; viscosity 60 mPa · s @ 25° C.; equivalent weight 145; functionality 2.2 |
| MONDUR ® MA 2603 | MDI prepolymer; isocyanate-terminated (MDI) prepolymer blended with an allophanate-modified 4,4'-diphenylmethane diisocyanate (MDI); NCO weight 16.0%; viscosity 1,050 mPa · s @ 25° C.; equivalent weight 263; functionality 2.0 |
| MONDUR ® MA-2902 | modified monomeric MDI, allophanate-modified 4,4'-diphenylmethane diisocyanate (mMDI); NCO weight 29.0%; viscosity 40 mPa · s @ 25° C.; equivalent weight 145; functionality 2.0 |
| MONDUR ® MA-2903 | modified monomeric MDI; isocyanate-terminated (MDI) prepolymer; NCO weight 19.0%; viscosity 400 mPa · s @ 25° C.; equivalent weight 221; functionality 2.0 |
| MONDUR ® MA-2904 | Allophanate-modified MDI polyether prepolymer; NCO weight 12.0%; viscosity 1,800 mPa · s @ 25° C.; equivalent weight 350; functionality of 2.0 |
| MONDUR ® MB | high-purity grade difunctional isocyanante, diphenylmethane 4,4'-diisocyanate; used in production of polyurethane elastomers, adhesives, coatings and intermediate polyurethane products; appearance colorless solid or liquid; specific gravity @ 50° C. ± 15.5 1.19; flash point 202° C. PMCC; viscosity (in molten form) 4.1 mPa · S; bult density 10 lb/gal (fused) or 9.93 lb/gal (molten); freezing temperature 39° C. |
| MONDUR ® MLQ | monomeric diphenylmethan diisocyanate; used in a foams, cast elastomers, coatings and andesives; appearance light yellow clear liquid, NCO 33.4% wt; 1.19 specific gravity at 25° C., 196° C. flash point, DIN 51758; 11-15° C. freezing temperature |
| MONDUR ® MQ | high-purity-grade difunctional isocyanate, diphenylmethane 4,4'-diisocyanate (MDI); used in production of solid polyurethane elastomers, adhesives, coatings and in intermediate polyurethane products; appearance colorless solid or liquid; specific gravity 1.19 @ 50° C.; flash point 202° C. PMCC; viscosity 4.1 mPa · S; bulk density 10 lb./gal (fused) or 9.93 lb./gal (molten); freezing temperature 39° C. |
| MONDUR ® MR | polymeric diphenylmethane diisocyanate (pMDI); NCO weight 31.5%; viscosity 200 mPa · s @ 25° C.; equivalent weight 133; functionality 2.8 |
| MONDUR ® MR LIGHT | polymeric diphenylmethane diisocyanate (pMDI); NCO weight 31.5%; viscosity 200 mPa · s @ 25° C.; equivalent weight 133; functionality 2.8 |
| MONDUR ® MR-5 | polymeric diphenylmethane diisocyanate (pMDI); NCO weight 32.5%; viscosity 50 mPa · s @ 25° C.; equivalent weight 129; functionality 2.4 |
| MONDUR ® MRS | 2,4' rich polymeric diphenylmethane diisocyanate (pMDI); NCO weight 31.5%; viscosity 200 mPa · s @ 25° C.; equivalent weight 133; functionality2.6 |
| MONDUR ® MRS 2 | 2,4' rich polymeric diphenylmethane diisocyanate (pMDI); NCO weight 33.0%; viscosity 25 mPa · s @ 25° C.; equivalent weight 127; functionality2.2 |
| MONDUR ® MRS-4 | 2,4' rich polymeric diphenylmethane diisocyanate (pMDI); NCO weight 32.5%; viscosity 40 mPa · s @ 25° C.; equivalent weight 129; functionality 2.4 |
| MONDUR ® MRS-5 | 2,4' rich polymeric diphenylmethane diisocyanate (pMDI); NCO weight 32.3%; viscosity 55 mPa · s @ 25° C.; equivalent weight 130; functionality 2.4 |

TABLE 4-continued

| Trade Name | Description |
| --- | --- |
| MONDUR® PC | modified 4,4' diphenylmethane diisocyanate (mMDI); NCO weight 25.8%; viscosity 145 mPa · s @ 25° C.; equivalent weight 163; functionality 2.1 |
| MONDUR® PF | modified 4,4' diphenylmethane diisocyanate (mMDI) prepolymer; NCO weight 22.9%; viscosity 650 mPa · s @ 25° C.; equivalent weight 183; functionality 2 |
| MONDUR® TD-65 | monomeric toluene diisocyanate (TDI); 65/35 mixture of 2,4 and 2.6 TDI; NCO weight 48%; viscosity 3 mPa · s @ 25° C.; equivalent weight 87.5; functionality 2 |
| MONDUR® TD-80 GRADE A | monomeric toluene diisocyanate (TDI); 80/20 mixture of the 2,4 and 2,6 isomer; NCO weight 48%; viscosity 5 mPa · s @ 25° C.; equivalent weight 87.5; functionality 2 |
| MONDUR® TD-80 GRADE A/GRADE B | monomeric toluene diisocyanate (TDI); 80/20 mixture of the 2,4 and 2,6 isomer; NCO weight 48%; viscosity 5 mPa · s @ 25° C.; equivalent weight 87.5; functionality 2 |

In certain embodiments, one or more of the above-described isocyanate compositions is provided in a formulation typical of a mixture known in the art of polyurethane adhesives manufacture. Such mixtures may comprise prepolymers formed by the reaction of a molar excess of one or more isocyanates with reactive molecules comprising reactive functional groups such as alcohols, amines, thiols, carboxylates and the like. These mixtures may also comprise solvents, surfactants, stabilizers, and other additives known in the art.

In certain embodiments, the composition of the adhesive might comprise a blocked isocyanate and a polyol. Such a mixture of blocked isocyanate and a polyol do not react under normal conditions, even in the presence of water and the curing of this mixture is triggered by heating.

C. Pre-Polymers

In another aspect, the present invention encompasses prepolymers comprising isocyanate-terminated polyols. In certain embodiments, such isocyanate-terminated prepolymers comprise a plurality of polyol segments linked via urethane bonds formed by reaction with polyisocyanate compounds.

In certain embodiments, a prepolymer of the present invention is the result of a reaction between one or more of the polyols described above with a stoichiometric excess of any one or more of the diisocyanates described herein. The degree of polymerization of these prepolymers (i.e. the average number of polyol segments contained in the prepolymer chains) can be manipulated by controlling the relative amount of isocyanate, as well as the order of reagent addition and the reaction conditions.

In certain embodiments, prepolymers comprise compounds conforming to a formula:

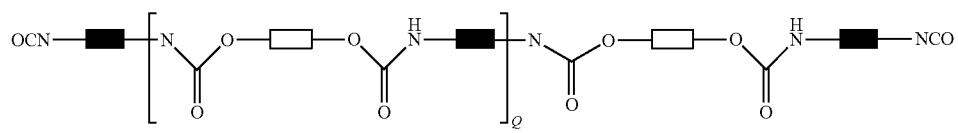

wherein Q is 0 or an integer between 1 and about 50, each open rectangle, ▭, represents a polyol moiety each of which may be the same or different, and where, the black rectangles ■ represent the carbon skeleton of the diisocyanate.

In certain embodiments, prepolymers comprise chains conforming to the formula:

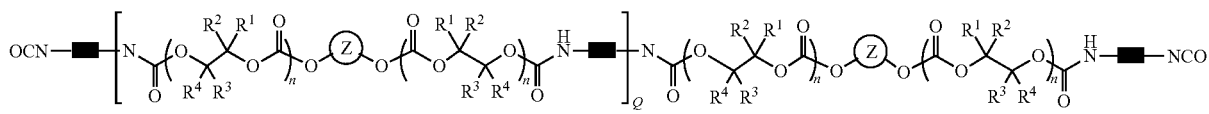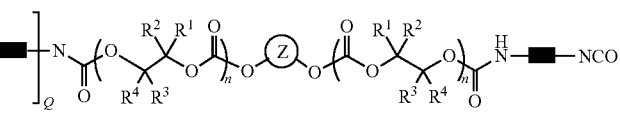

wherein, ■, (Z), Q, $R^1$, $R^2$, $R^3$, $R^4$, and n are as defined above and in the classes and subclasses herein.

In other embodiments, a prepolymer may be formed by reacting a stoichiometric excess of polyol with a limited amount of isocyanate. In such embodiments, the inventive prepolymer has —OH end groups and contains two or more polyol units connected by urethane linkages. In certain embodiments, such prepolymers conform to a structure:

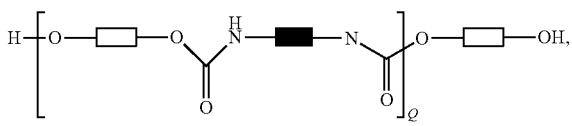

wherein ▢, ■, and Q, are as defined above and in the classes and subclasses herein.

In certain embodiments, such prepolymers have structures conforming to:

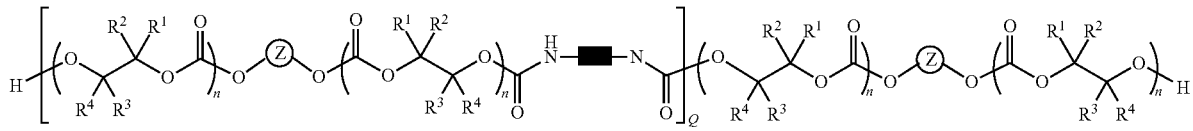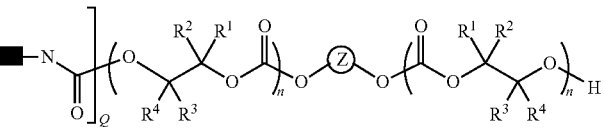

wherein, ■, (Z), Q, $R^1$, $R^2$, $R^3$, $R^4$, and n are as defined above and in the classes and subclasses herein.

D. Other Co-Reactants and Additives

In certain embodiments, polyurethane reaction mixtures comprise additional reactive small molecules known as chain extenders such as amines, alcohols, thiols or carboxylic acids that participate in bond-forming reactions with isocyanates. In certain embodiments, additives are selected from the group consisting of: solvents, fillers, clays, blocking agents, stabilizers, thixotropes, plasticizers, compatibilizers, colorants, UV stabilizers, flame retardants, and the like.

i. Chain Extenders

In certain embodiments, the mixtures of the present invention include one or more small molecules reactive toward isocyanates. In certain embodiments, reactive small molecules included in the inventive mixtures comprise low molecular weight organic molecules having one or more functional groups selected from the group consisting of alcohols, amines, carboxylic acids, thiols, and combinations of any two or more of these.

In certain embodiments, the mixtures of the present invention include one or more alcohols. In certain embodiments, the mixtures include polyhydric alcohols.

In certain embodiments, reactive small molecules included in the inventive mixtures comprise dihydric alcohols. In certain embodiments, the dihydric alcohol comprises a $C_{2-40}$ diol. The polyol compound is selected from aliphatic and cycloaliphatic polyol compounds, for example, ethylene glycol, 1,2-ethanediol, 1,2-propanediol, 1,3-propanediol, 1,2-butanediol, 1,2-propylene glycol, 1,3-butanediol, 1,4-butanediol, 1,5-pentanediol, 1,6-hexanediol, 1,8-octanediol, 1,9-nonane diol, 1,10-decane diol, neopentyl glycol, 3-methyl-1,5-pentane diol, 3,3-dimethylolheptane, 1,4-cyclohexane diol, 1,4-cyclohexanedimethanol and 1,4-dihydroxyethyl cyclohexane; and aliphatic and aromatic polyamine compounds, for example, ethylene diamine, 1,2-propylene diamine, 1,6-hexamethylene diamine, isophorone diamine bis(4-aminocyclohexyl)methane, piperazine and meta- or para-xylene diamine; aliphatic, cycloaliphatic and aromatic aminoalcohol compounds, for example, 2-ethanolamine, N-methyldiethanolamine, N-phenyldipropanolamine; hydroxyalkyl sulfamides, for example, hydroxyethyl sulfamide and hydroxyethylaminoethyl sulfamide; urea and water. Among the above-mentioned chain extending compounds, preferably 1,4-butane diol, 2-ethanolamine, and 1,2-propylenediamine are employed. In certain embodiments, the chain extender is selected from the group consisting of: 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these. The above-mentioned chain-extending compounds may be used alone or in a mixture of two or more thereof.

In certain embodiments, a reactive small molecule included in the inventive mixtures comprises a dihydric alcohol selected from the group consisting of: diethylene glycol, triethylene glycol, tetraethylene glycol, higher poly (ethylene glycol), such as those having number average molecular weights of from 220 to about 2000 g/mol, dipropylene glycol, tripropylene glycol, and higher poly(propylene glycols) such as those having number average molecular weights of from 234 to about 2000 g/mol.

In certain embodiments, a reactive small molecule included in the inventive mixtures comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments, a reactive small molecule included in the inventive mixtures comprises a polymeric diol. In certain embodiments, a polymeric diol is selected from the group consisting of polyethers, polyesters, hydroxy-terminated polyolefins, polyether-copolyesters, polyether polycarbonates, polycarbonate-copolyesters, and alkoxylated analogs of any of these. In certain embodiments, the polymeric diol has an average molecular weight less than about 2000 g/mol.

In certain embodiments, a reactive small molecule comprises a hydroxy-carboxylic acid having the general formula $(HO)_xQ(COOH)_y$, wherein Q is a straight or branched hydrocarbon radical containing 1 to 12 carbon atoms, and x and y are each integers from 1 to 3. In certain embodiments, a coreactant comprises a diol carboxylic acid. In certain embodiments, a coreactant comprises a bis(hydroxyalkyl) alkanoic acid. In certain embodiments, a coreactant comprises a bis(hydroxylmethyl) alkanoic acid. In certain embodiments the diol carboxylic acid is selected from the group consisting of 2,2 bis-(hydroxymethyl)-propanoic acid (dimethylolpropionic acid, DMPA) 2,2-bis(hydroxymethyl) butanoic acid (dimethylolbutanoic acid; DMBA), dihydroxysuccinic acid (tartaric acid), and 4,4'-bis(hydroxyphenyl) valeric acid. In certain embodiments, a coreactant comprises an N,N-bis(2-hydroxyalkyl)carboxylic acid.

In certain embodiments, a reactive small molecule comprises a polyhydric alcohol comprising one or more amino groups. In certain embodiments, a reactive small molecule comprises an amino diol. In certain embodiments, a reactive small molecule comprises a diol containing a tertiary amino group. In certain embodiments, an amino diol is selected from the group consisting of: diethanolamine (DEA), N-methyldiethanolamine (MDEA), N-ethyldiethanolamine (EDEA), N-butyldiethanolamine (BDEA), N,N-bis(hydroxyethyl)-α-amino pyridine, dipropanolamine, diisopropanolamine (DIPA), N-methyldiisopropanolamine, Diisopropanol-p-toluidine, N,N-Bis(hydroxyethyl)-3-chloroaniline, 3-diethylaminopropane-1,2-diol, 3-dimethylaminopropane-1,2-diol and N-hydroxyethylpiperidine. In certain embodiments, a coreactant comprises a diol containing a quaternary amino group. In certain embodiments, a coreactant comprising a quaternary amino group is an acid salt or quaternized derivative of any of the amino alcohols described above.

In certain embodiments, a reactive small molecule is selected from the group consisting of: inorganic or organic polyamines having an average of about 2 or more primary and/or secondary amine groups, polyalcohols, ureas, and combinations of any two or more of these. In certain embodiments, a reactive small molecule is selected from the group consisting of: diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in the present invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, and sulfonated primary and/or secondary amines. In certain embodiments, reactive small molecule is selected from the group consisting of: hydrazine, substituted hydrazines, hydrazine reaction products, and the like, and mixtures thereof. In certain embodiments, a reactive small molecule is a polyalcohol including those having from 2 to 12 carbon atoms, preferably from 2 to 8 carbon atoms, such as ethylene glycol, diethylene glycol, neopentyl glycol, butanediols, hexanediol, and the like, and mixtures thereof. Suitable ureas include urea and its derivatives, and the like, and mixtures thereof.

In certain embodiments, reactive small molecules containing at least one basic nitrogen atom are selected from the group consisting of: mono-, bis- or polyalkoxylated aliphatic, cycloaliphatic, aromatic or heterocyclic primary amines, N-methyl diethanolamine, N-ethyl diethanolamine, N-propyl diethanolamine, N-isopropyl diethanolamine, N-butyl diethanolamine, N-isobutyl diethanolamine, N-oleyl diethanolamine, N-stearyl diethanolamine, ethoxylated coconut oil fatty amine, N-allyl diethanolamine, N-methyl diisopropanolamine, N-ethyl diisopropanolamine, N-propyl diisopropanolamine, N-butyl diisopropanolamine, cyclohexyl diisopropanolamine, N,N-diethoxylaniline, N,N-diethoxyl toluidine, N,N-diethoxyl-1-aminopyridine, N,N'-diethoxyl piperazine, dimethyl-bis-ethoxyl hydrazine, N,N'-bis-(2-hydroxyethyl)-N,N'-diethylhexahydr op-phenylenediamine, N-12-hydroxyethyl piperazine, polyalkoxylated amines, propoxylated methyl diethanolamine, N-methyl-N,N-bis-3-aminopropylamine, N-(3-aminopropyl)-N,N'-dimethyl ethylenediamine, N-(3-aminopropyl)-N-methyl ethanolamine, N,N'-bis-(3-aminopropyl)-N,N'-dimethyl ethylenediamine, N,N'-bis-(3-aminopropyl)-piperazine, N-(2-aminoethyl)-piperazine, N, N'-bisoxyethyl propylenediamine, 2,6-diaminopyridine, diethanolaminoacetamide, diethanolamidopropionamide, N,N-bisoxyethylphenyl thiosemicarbazide, N,N-bis-oxyethylmethyl semicarbazide, p,p'-bis-aminomethyl dibenzyl methylamine, 2,6-diaminopyridine, 2-dimethylaminomethyl-2-methylpropanel, 3-diol. In certain embodiments, chain-extending agents are compounds that contain two amino groups. In certain embodiments, chain-extending agents are selected from the group consisting of: ethylene diamine, 1,6-hexamethylene diamine, and 1,5-diamino-1-methylpentane.

ii. Catalysts

In certain embodiments, no catalysts are used in the mixtures. In certain embodiments, in the polymerization reaction for the polyurethane, a conventional catalyst comprising an amine compound or tin compound can be employed to promote the reaction. These embodiments are most commonly found in reactive extrusion methods of polyurethane adhesive production. Any suitable urethane catalyst may be used, including tertiary amine compounds and organometallic compounds may be used. Exemplary tertiary amine compounds include triethylenediamine, N-methylmorpholine, N,N-dimethylcyclohexylamine, pentamethyldiethylenetriamine, tetramethylethylenediamine, 1-methyl-4-dimethylaminoethylpiperazine, 3-methoxy-N-dimethylpropylamine, N-ethylmorpholine, diethylethanolamine, N-cocomorpholine, N,N-dimethyl-N',N'-dimethyl isopropylpropylenediamine, N,N-diethyl-3-diethylaminopropylamine and dimethylbenzylamine. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin dilaurate, as well as other organometallic compounds such as are disclosed in U.S. Pat. No. 2,846,408. A catalyst for the trimerization of polyisocyanates, resulting in a polyisocyanurate, such as an alkali metal alkoxide may also optionally be employed herein. Such catalysts are used in an amount which measurably increases the rate of polyurethane or polyisocyanurate formation.

In certain embodiments, where mixtures of the present invention comprise catalysts, the catalysts comprise tin based materials. In certain embodiments, tin catalysts are selected from the group consisting of: di-butyl tin dilaurate, dibutylbis(laurylthio)stannate, dibutyltinbis(isooctylmercapto acetate) and dibutyltinbis(isooctylmaleate), tin octanoate and mixtures of any two or more of these.

In certain embodiments, catalysts included in the mixtures comprise tertiary amines. In certain embodiments, catalysts included in the mixtures are selected from the group consisting of: DABCO, pentametyldipropylenetriamine, bis(dimethylamino ethyl ether), pentamethyldiethylenetriamine, DBU phenol salt, dimethylcyclohexylamine, 2,4,6-tris(N,N-dimethylaminomethyl)phenol (DMT-30), triazabicyclodecene (TBD), N-methyl TBD, 1,3,5-tris(3-dimethylaminopropyl)hexahydro-s-triazine, ammonium salts and combinations or formulations of any of these.

Typical amounts of catalyst are 0.001 to 10 parts of catalyst per 100 parts by weight of total polyol in the mixture. In certain embodiments, catalyst levels in the formulation, when used, range between about 0.001 pph (weight parts per hundred) and about 3 pph based on the amount of polyol present in the mixture. In certain embodiments, catalyst levels range between about 0.05 pph and about 1 pph, or between about 0.1 pph and about 0.5 pph.

iii. Mono-Functional Materials

In certain embodiments, monofunctional components are added. Suitable monofunctional components can include molecules having a single isocyanate-reactive functional group such as an alcohol, amine, carboxylic acid, or thiol. A monofunctional component will serve as a chain termination which can be used to limit molecular weight or crosslinking if higher functionality species are used. U.S. Pat. No. 5,545,706 illustrates the use of a monofunctional alcohol in a substantially linear polyurethane formulation. The monofunctional alcohol can be any compound with one alcohol available for reaction with isocyanate such as methanol, ethanol, propanol, isopropanol, butanol, isobutanol, pentanol, hexanol, heptanol, octanol, nonanol, decanol, dodecanol, phenol and the like. Additionally, the monofunctional component can be added as a low molecular weight polymer that has been initiated by or reacted with the monofunctional alcohol. The monofunctional alcohol can be a polyether such as polypropylene oxide or polyethylene oxide initiated with any of the monofunctional alcohols listed. The monofunctional alcohol can be a polyester polymer where the monofunctional alcohol is added to the recipe. The monofunctional alcohol can be a polycarbonate polymer such as polyethylene carbonate or polypropylene carbonate initiated with a monofunctional anion, such as halide, nitrate, azide, carboxylate, or a monohydric alcohol.

Similarly, the monofunctional component could be an isocyanate. Any monofunctional isocyanate could be added for this same function. Possible materials include phenyl isocyanate, naphthyl isocyanate, methyl isocyanate, ethyl isocyanate, propyl isocyanate, butyl isocyanate, hexyl isocyanate, octyl isocyanate and the like.

iv. Additives

In addition to the above components, mixtures of the present invention may optionally contain various additives as are known in the art of polyurethane adhesive technology. Such additives may include, but are not limited to solvents, fillers, clays, blocking agents, stabilizers, thixotropes, plasticizers, compatibilizers, colorants, UV stabilizers, flame retardants, and the like.

a) Solvents

If desired, the polyurethanes or pre-polymers can be dispersed in a solvent which can include water or organic solvents known to those skilled in the art. Suitable solvents can include aliphatic, aromatic, or halogenated hydrocarbons, ethers, esters, ketones, lactones, sulfones, nitriles, amides, nitromethane, propylene carbonate, dimethyl carbonate and the like. Representative examples include, but are not limited to: acetone, acetonitrile, benzene, butanol, butyl acetate, g-butyrolactone, butyl caribitl acetate, carbitol acetate, chloroform, cyclohexane, 1,2-dichloromethane, dibasic ester, diglyme, 1,2-dimethoxyethan e, dimethylacetamide, dimethylsulfoxide, dimethformamide, 1,4-dioxane, ethanol, ethyl acetate, ethyl ether, ethylene glycol, hexane, hydroxylmethyl methacrylate, isopropyl acetate, nethanol, methyl acetate, methyl amyl ketone, methyl isobutyl ketone, methylene chloride, methyl ethyl ketone, monoglyme, methyl methacrylate, propylene carbobonate, propylene oxide, styrene, alpha-terpineol, tetrahydrafuran, texanol, toluene, diethyl succinate, diethylene glycol methyl ether, ethylene glycol diacetate, triethyl phosphate and the like, b) Fillers Optional components of the adhesive of the invention include fillers. Such fillers are well known to those skilled in the art and include carbon black, titanium dioxide, calcium carbonate, surface treated silicas, titanium oxide, fume silica, talc, aluminum trihydrate and the like. In certain embodiments, fillers comprise carbon black. In certain embodiments, more than one reinforcing filler may be used, of which one is carbon black and a sufficient amount of carbon black is used to provide the desired black color to the adhesive. In certain embodiments, a reinforcing filler is used in sufficient amount to increase the strength of the adhesive and/or to provide thixotropic properties to the adhesive. The amounts of filler or other additives will vary depending on the desired application.

c) Clays

Among optional materials in the adhesive composition are clays. Preferred clays useful in the invention include kaolin, surface treated kaolin, calcined kaolin, aluminum silicates and surface treated anhydrous aluminum silicates. The clays can be used in any form which facilitates formulation of a pumpable adhesive. Preferably the clay is in the form of pulverized powder, spray-dried beads or finely ground particles.

d) Blocking Agents

One or more blocking agents are utilized to provide an induction period between the mixing of the two parts of the adhesive composition and the initiation of the cure. The addition of the blocking agents provides an induction period which causes a reduction in the curing rate immediately after mixing of the components of the adhesive. The reduction in the curing rate results in lower initial tensile shear strengths and storage moduli immediately after mixing than those found in compositions that do not contain a blocking agent. Following the induction period the adhesive quickly cures so that the tensile shear strength and storage modulus are similar to those produced by adhesives that do not contain the blocking agent. Such thixotropes are well known to those skilled in the art and include hydroxyl containing compounds such as diethylene glycol, mono alkyl ethers, butanone oxime, methyl ethyle ketone oxime, nonylphenol, phenol and cresol; amine containing compounds such as caprolactam, diisopropyl amine, 1,2,4-triazole and 3,5-dimethyl pyrazole; and aliphatic containing compounds such as dialkyl malonate.

e) Stabilizers

An adhesive of this invention may further comprise stabilizers which function to protect the adhesive composition from moisture, thereby inhibiting advancement and preventing premature crosslinking of the isocyanates in the adhesive formulation. Included among such stabilizers are diethylmalonate and alkylphenol alkylates.

f) Thixotrope

Optionally, the adhesive composition may further comprise a thixotrope. Such thixotropes are well known to those skilled in the art and include alumina, limestone, talc, zinc oxides, sulfur oxides, calcium carbonate, perlite, slate flour, salt (NaCl), cyclodextrin and the like. The thixotrope may be added to the adhesive of composition in a sufficient amount to give the desired rheological properties.

g) Plasticizers

Adhesive compositions of the present invention may further comprise plasticizers so as to modify the rheological properties to a desired consistency. Such materials should be free of water, inert to isocyanate groups and compatible with a polymer. Suitable plasticizers are well known in the art and preferable plasticizers include alkyl phthalates such as dioctylphthalate or dibutylphthalate, partially hydrogenated terpene commercially available as "HB-40", trioctyl phosphate, epoxy plasticizers, toluene-sulfamide, chloroparaffins, adipic acid esters, castor oil, toluene and alkyl naphthalenes. The amount of plasticizer in the adhesive composition is that amount which gives the desired rheological properties and/or which is sufficient to disperse any catalyst that may be present in the system.

h) Compatibilizers

In certain embodiments, the mixtures of the present invention comprise one or more suitable compatibilizers. Compatibilizers are molecules that allow two or more non-miscible ingredients to come together and give a homogeneous liquid phase. Many such molecules are known to the polyurethane industry, these include: amides, amines, hydrocarbon oils, phthalates, polybutyleneglycols, and ureas.

i) Colorants

In certain embodiments, the mixtures of the present invention comprise one or more suitable colorants. Typical inorganic coloring agents included titanium dioxide, iron oxides and chromium oxide. Organic pigments originated from the azo/diazo dyes, phthalocyanines and dioxazines, as well as carbon black. Recent advances in the development of polyol-bound colorants are described in:

Miley, J. W.; Moore, P. D. "Reactive Polymeric Colorants For Polyurethane", Proceedings Of The SPI-26th Annual Technical Conference; Technomic: Lancaster, Pa., 1981; 83-86.

Moore, P. D.; Miley, J. W.; Bates, S. H.; "New Uses For Highly Miscible Liquid Polymeric Colorants In The Manufacture of Colored Urethane Systems"; Proceedings of the SPI-27th Annual Technical/Marketing Conference; Technomic: Lancaster, Pa., 1982; 255-261.

Bates, S. H.; Miley, J. W. "Polyol-Bound Colorants Solve Polyurethane Color Problems"; Proceedings Of The SPI-30th Annual Technical/Marketing Conference; Technomic: Lancaster, Pa., 1986; 160-165

Vielee, R. C.; Haney, T. V. "Polyurethanes"; In Coloring of Plastics; Webber, T. G., Ed., Wiley-Interscience: New York, 1979, 191-204.

j) UV Stabilizers

In certain embodiments, the mixtures of the present invention comprise one or more suitable UV stabilizers. Polyurethanes based on aromatic isocyanates will typically turn dark shades of yellow upon aging with exposure to light. A review of polyurethane weathering phenomena is presented in: Davis, A.; Sims, D. Weathering Of Polymers; Applied Science: London, 1983, 222-237. Light protection agents, such as hydroxybenzotriazoles, zinc dibutyl thiocarbamate, 2,6-dietertiary butylcatechol, hydroxybenzophenones, hindered amines and phosphites have been used to improve the light stability of polyurethanes. Color pigments have also been used successfully.

k) Flame Retardants

In certain embodiments, the mixtures of the present invention comprise one or more suitable flame retardants. Flame retardants are often added to reduce flammability. The choice of flame retardant for any specific polyurethane adhesive often depends upon the intended service application of that adhesive and the attendant flammability testing scenario governing that application. Aspects of flammability that may be influenced by additives include the initial ignitability, burning rate and smoke evolution.

The most widely used flame retardants are the chlorinated phosphate esters, chlorinated paraffins and melamine powders. These and many other compositions are available from specialty chemical suppliers. A review of this subject has been published: Kuryla, W. C.; Papa, A. J. Flame Retardancy of Polymeric Materials, Vol. 3; Marcel Dekker: New York, 1975, 1-133.

II. Block Copolymers i. Copolymers

In certain embodiments, compositions of the present invention comprise a block copolymer. In some embodiments, a block copolymer comprises at least two homopolymer subunits selected from the group consisting of polyolefins and fluoropolymers.

In certain embodiments, compositions of the present invention comprise between about 0.1 weight percent and about 10 weight percent of the block copolymer. In certain embodiments, compositions of the present invention comprise between about 0.1 weight percent and about 8 weight percent of the block copolymer. In certain embodiments, compositions of the present invention comprise between about 0.1 weight percent and about 6 weight percent of the block copolymer. In certain embodiments, compositions of the present invention comprise between about 0.1 weight percent and about 4 weight percent of the block copolymer. In certain embodiments, compositions of the present invention comprise between about 0.1 weight percent and about 2 weight percent of the block copolymer. In certain embodiments, compositions of the present invention comprise between about 0.1 weight percent and about 1 weight percent of the block copolymer.

In certain embodiments, compositions of the present invention comprise between about 1 weight percent and about 10 weight percent of the block copolymer. In certain embodiments, compositions of the present invention comprise between about 2 weight percent and about 10 weight percent of the block copolymer. In certain embodiments, compositions of the present invention comprise between about 4 weight percent and about 10 weight percent of the block copolymer. In certain embodiments, compositions of the present invention comprise between about 6 weight percent and about 10 weight percent of the block copolymer. In certain embodiments, compositions of the present invention comprise between about 8 weight percent and about 10 weight percent of the block copolymer.

In certain embodiments, compositions of the present invention comprise between about 1 weight percent and about 8 weight percent of the block copolymer. In certain embodiments, compositions of the present invention comprise between about 2 weight percent and about 8 weight percent of the block copolymer. In certain embodiments, compositions of the present invention comprise between about 2 weight percent and about 6 weight percent of the block copolymer. In certain embodiments, compositions of the present invention comprise between about 4 weight percent and about 6 weight percent of the block copolymer. In certain embodiments, compositions of the present invention comprise between about 3 weight percent and about 7 weight percent of the block copolymer.

In some embodiments, a block copolymer comprises at least two homopolymer subunits. In some embodiments, a block copolymer comprises three or more homopolymer subunits. In some embodiments, a block copolymer comprises four or more homopolymer subunits. In some embodiments, a block copolymer comprises five or more homopolymer subunits. In some embodiments, a block copolymer comprises six or more homopolymer subunits. In some embodiments, a block copolymer comprises seven or more homopolymer subunits. In some embodiments, a block copolymer comprises eight or more homopolymer subunits.

In some embodiments, a block copolymer is a diblock copolymer. In some embodiments, a block copolymer is a triblock copolymer. In some embodiments, a block copolymer is a tetrablock copolymer. In some embodiments, a block copolymer is a pentablock copolymer. In some embodiments, a block copolymer is a hexablock copolymer. In some embodiments, a block copolymer is a heptablock copolymer. In some embodiments, a block copolymer is a octablock copolymer.

In some embodiments, a block copolymer comprises homopoymer subunits A and B arranged as A-B-A-B . . . where "-" represents a covalent bond. In certain embodiments, a block copolymer is a diblock copolymer that comprises homopolymer subunits A and B arranged as A-B where "-" represents a covalent bond. In certain embodiments, a block copolymer is a triblock copolymer that comprises homopolymer subunits A and B arranged as A-B-A where "-" represents a covalent bond. In certain embodiments, a block copolymer is a tetrablock copolymer that comprises homopolymer subunits A and B arranged as A-B-A-B where "-" represents a covalent bond. In certain embodiments, a block copolymer is a pentablock copolymer that comprises homopolymer subunits A and B arranged as A-B-A-B-A where "-" represents a covalent bond. In certain embodiments, a block copolymer is a hexablock copolymer that comprises homopolymer subunits A and B arranged as A-B-A-B-A-B where "-" represents a covalent bond. In certain embodiments, a block copolymer is a heptablock copolymer that comprises homopolymer subunits A and B arranged as A-B-A-B-A-B-A where "-" represents a covalent bond. In certain embodiments, a block copolymer is an octablock copolymer that comprises homopolymer subunits A and B arranged as A-B-A-B-A-B-A-B where "-" represents a covalent bond.

In some embodiments, a block copolymer comprises one or more polyolefin subunits. In some embodiments, a block copolymer comprises one or more polyethylene subunits. In some embodiments, a block copolymer comprises one or more polypropylene subunits. In some embodiments, a block copolymer comprises one or more α-polyolefin subunits. In some embodiments, the α-polyolefin is a $C_3$-$C_{12}$ α-polyolefin. In some embodiments, the α-polyolefin is a $C_6$-$C_{12}$ α-polyolefin. In some embodiments, the α-polyolefin is a $C_9$-$C_{12}$ α-polyolefin. In some embodiments, the α-polyolefin is a $C_3$-$C_9$ α-polyolefin. In some embodiments, the α-polyolefin is a $C_3$-$C_6$ α-polyolefin. In some embodiments, the α-polyolefin is a $C_6$-$C_9$ α-polyolefin.

In some embodiments, a block copolymer comprises one or more polyethylene subunits and one or more polypropylene subunits. In some embodiments, a block copolymer comprises one or more polyethylene subunits and one or more α-polyolefin subunits, wherein each polyolefin subunits is defined above and described herein.

In some embodiments, a block copolymer comprises one or more fluoropolymer subunits. In some embodiments, a block copolymer comprises one or more polytetrafluoroethylene subunits. In some embodiments, a block copolymer comprises one or more polyvinylfluoride subunits. In some embodiments, a block copolymer comprises one or more polyvinylidene fluoride subunits. In some embodiments, a block copolymer comprises one or more polychlorotrifluoroethylene subunits. In some embodiments, a block copolymer comprises one or more perfluoroalkoxy polymer subunits. In some embodiments, a block copolymer comprises one or more polyethylenetetrafluoroethylene subunits. In some embodiments, a block copolymer comprises one or more polyethylenechlorotrifluoroethylene subunits. In some embodiments, a block copolymer comprises one or more perfluoropolyether subunits. In some embodiments, a block copolymer comprises one or more perfluorosulfonic acid subunits.

In some embodiments, each homopolymer subunit independently comprises between about 2 and about 200 repeating units. In some embodiments, each homopolymer subunit independently comprises between about 2 and about 200 repeating units. In some embodiments, each homopolymer subunit independently comprises between about 10 and about 200 repeating units. In some embodiments, each homopolymer subunit independently comprises between about 50 and about 200 repeating units. In some embodiments, each homopolymer subunit independently comprises between about 100 and about 200 repeating units. In some embodiments, each homopolymer subunit independently comprises between about 150 and about 200 repeating units. In some embodiments, each homopolymer subunit independently comprises between about 2 and about 150 repeating units. In some embodiments, each homopolymer subunit independently comprises between about 2 and about 100 repeating units. In some embodiments, each homopolymer subunit independently comprises between about 2 and about 50 repeating units. In some embodiments, each homopolymer subunit independently comprises between about 2 and about 10 repeating units. In some embodiments, each homopolymer subunit independently comprises between about 10 and about 150 repeating units. In some embodiments, each homopolymer subunit independently comprises between about 10 and about 100 repeating units. In some embodiments, each homopolymer subunit independently comprises between about 50 and about 100 repeating units. In some embodiments, each homopolymer subunit independently comprises between about 50 and about 150 repeating units. In some embodiments, each homopolymer subunit independently comprises between about 10 and about 50 repeating units. In some embodiments, each homopolymer subunit independently comprises between about 10 and about 30 repeating units.

In some embodiments, a block copolymer has a $M_n$ between about 10,000 and about 500,000 g/mol. In some embodiments, a block copolymer has a $M_n$ between about 10,000 and about 250,000 g/mol. In some embodiments, a block copolymer has a $M_n$ between about 10,000 and about 100,000 g/mol. In some embodiments, a block copolymer has a $M_n$ between about 10,000 and about 50,000 g/mol. In some embodiments, a block copolymer has a $M_n$ between about 10,000 and about 25,000 g/mol. In some embodiments, a block copolymer has a $M_n$ between about 50,000 and about 500,000 g/mol. In some embodiments, a block copolymer has a $M_n$ between about 100,000 and about 500,000 g/mol. In some embodiments, a block copolymer has a $M_n$ between about 250,000 and about 500,000 g/mol. In some embodiments, a block copolymer has a $M_n$ between about 50,000 and about 250,000 g/mol. In some embodiments, a block copolymer has a $M_n$ between about 100,000 and about 200,000 g/mol.

ii. Methods of Making Block Copolymers

In some embodiments, block copolymers of the present invention are prepared by methods known in the art. For example, in some embodiments, block copolymers are prepared by methods disclosed by Eagan, J. M. et al., *Combining polyethylene and polypropylene: Enhanced performance with PE/iPP multiblock polymers* (Science, 2017, 355, 814-816).

III. Polyurethane Coating Compositions

In one aspect, a composition of the present invention is a coating composition. In some embodiments, a substrate is coated with a composition described above and herein. In one aspect, the present invention encompasses the recognition that, where a substrate comprises a polyolefin or a fluoropolymer, and a coating composition comprises a block copolymer comprising one or more subunits of the polyolefin or fluoropolymer present within the substrate, the coating composition will exhibit improved adhesion to the substrate relative to a coating composition lacking the block copolymer.

In some embodiments, a substrate comprises a first polyolefin and the block copolymer comprises one or more subunits of the first polyolefin and one or more subunits of a second polyolefin that is structurally different from the first polyolefin. In some embodiments, a substrate comprises a fluoropolymer and the block copolymer comprises one or more subunits of the fluoropolymer and one or more subunits of a polyolefin.

In some embodiments, a substrate comprises a polyolefin. In some embodiments, a substrate comprises polyethylene. In some embodiments, a substrate comprises polypropylene. In some embodiments, a substrate comprises an α-polyolefin. In some embodiments, a substrate comprises a $C_3$-$C_{12}$ α-polyolefin. In some embodiments, a substrate comprises a $C_6$-$C_{12}$ α-polyolefin. In some embodiments, a substrate comprises a $C_9$-$C_{12}$ α-polyolefin. In some embodiments, a substrate comprises a $C_3$-$C_9$ α-polyolefin. In some embodiments, a substrate comprises a $C_3$-$C_6$ α-polyolefin. In some embodiments, a substrate comprises a $C_6$-$C_9$ α-polyolefin.

In some embodiments, a substrate comprises polyethylene and a block copolymer comprises one or more polyethylene subunits. In some embodiments, a substrate comprises polyethylene and a block copolymer comprises one or more polyethylene subunits and one or more polypropylene subunits. In some embodiments, a substrate comprises polyethylene and a block copolymer is a polyethylene/polypropylene tetrablock copolymer.

In some embodiments, a substrate comprises polypropylene and a block copolymer comprises one or more polypropylene subunits. In some embodiments, a substrate comprises polypropylene and a block copolymer comprises one or more polyethylene subunits and one or more polypropylene subunits. In some embodiments, a substrate comprises polypropylene and a block copolymer is a polyethylene/polypropylene tetrablock copolymer.

In some embodiments, a substrate comprises one or more fluoropolymers. In some embodiments, a substrate comprises polytetrafluoroethylene. In some embodiments, a substrate comprises polyvinylfluoride. In some embodiments, a substrate comprises polyvinylidene fluoride. In some embodiments, a substrate comprises polychlorotrifluoroethylene. In some embodiments, a substrate comprises perfluoroalkoxy polymer. In some embodiments, a substrate comprises polyethylenetetrafluoroethylene. In some embodiments, a substrate comprises polyethylenechlorotrifluoroethylene. In some embodiments, a substrate comprises perfluoropolyether. In some embodiments, a substrate comprises perfluorosulfonic acid.

In some embodiments, a substrate comprises polytetrafluoroethylene and a block copolymer comprises one or more polyethylene or one or more polypropylene subunits. In some embodiments, a substrate comprises polytetrafluoroethylene and a block copolymer is a polytetrafluoroethylene/polyethylene tetrablock copolymer or a polytetrafluoroethylene/polypropylene tetrablock copolymer.

IV. Coatings with Improved Properties

In some embodiments, a substrate described above and herein is coated with a composition described above and herein. In certain embodiments, a substrate is characterized in that, after curing, the coating composition exhibits an improved property relative to a corresponding coating composition that lacks the block copolymer.

Coating compositions of the present invention may exhibit improved performance as defined herein, for example they may exhibit improved hardness, flexibility, corrosion resistance and/or outdoor durability. The cured coatings resulting from compositions present invention may exhibit a broad range of protective properties like one or more of: excellent hardness, flexibility, processability, resistance against solvent, stain, corrosion and/or dirt pick up, hydrolytic stability against humidity and/or sterilization and/or outdoor durability.

Such improved properties may be in at least one, preferably a plurality, more preferably three of more of those properties labeled numerically below. Preferred polymers and/or compositions and/or coating compositions may exhibit comparable properties in one or more, preferably a plurality, more preferably three or more, most preferably in the rest of those properties labelled numerically herein.

A. Properties i. Hardness

Hardness (Konig, Persoz and/or pencil hardness measured as described DIN 53157/1-87 (Konig), DIN 53157/11-87 (Persoz) and/or ISO 3270-1984, *DIN EN* 13523-4, ECCA T4 and/or ISO 15184:1998 (pencil hardness) and/or otherwise as described herein).

ii. Flexibility

Flexibility (may be measured using the T-bend test as described in European standard EN 13523-7:2001 and/or otherwise as described herein).

iii. Corrosion Resistance

Corrosion resistance (measured as described herein) is visually determined as described herein and rated from 1-5.

iv. Hydrolysis Resistance

Hydrolysis resistance (according to the methods described herein to determine hydrolysis of coatings as described herein). Hydrolysis resistance is a general property useful for all coatings while sterilization is usually only useful for specific types of coatings such as those used to coat cans.

v. Sterilization Resistance

Sterilization resistance (according to the methods described herein to sterilize coatings on cans such as described herein). Sterilization resistance is a specific type of hydrolysis resistance.

vi. Outdoor Durability

Outdoor durability (for example with respect to UV-A and UV-B resistance such as in the QUV-test (a laboratory simulation of the damaging forces of weather, for the purpose of predicting the relative durability of coatings/materials exposed to the outdoor environment and described in ASTM G 53-95 and/or otherwise as described herein)).

vii. Chemical Resistance

Chemical resistance (to methyl ethyl ketone (MEK) in the MEK double rubs test as described herein).

B. Application Tests i. Visual Rating Scale

The degree of damage to a coating in various tests herein is determined visually based on the following ratings where 5 is the best and 0 is the worse:

5=very good: no visible damage or degradation/discoloration;
4=only slight visible damage or haze/blooming;
3=clear haze/blooming or damage;
2=coating partially dissolved;
1=coating is almost completely dissolved;
0=very poor: coating is completely dissolved.

ii. Surface Hardness (Konig Hardness)

König hardness is determined following DIN 53157 NEN5319 using Erichsen hardness measuring equipment. The values are given in seconds and the higher the value is the harder is the coating. A Koenig hardness above 100 and combined with a T-bend of IT or lower is considered very good.

iii. Surface Hardness (Pencil Hardness)

Pencil hardness was determined following ISO 15184: 1998 using a set of KOH-I-NOR drawing pencils in the following range: 6B-5B-4B-3B-2B-B-HB-F-H-2H-3H-4H-5H-6H (soft to hard). The hardest lead which does not penetrate the coating determines the degree of hardness. The minimum needed hardness is 1H. When at least 3H is obtained combined with a T-bend of IT or lower, this is considered very good.

iv. Flexibility (T-Bend)

May be measured using the T-bend test as described in European standard EN 13523-7:2001. A T-bend of IT or lower is considered very flexible. In general a flexibility 1.5 T or lower is aimed for.

v. Flexibility (Wedgebend)

Flexibility may also be measured using a Wedgebend test. The Wedgebend test is used to measure the flexibility of a coating on a metal substrate by a quick deformation. The bent coated metal substrate is subjected to a prescribed impact force. The non-damaged part of the coating on the bend is decisive. The apparatus used are an Erichsen bend and impact tester, model 471; coated panels, 50 mm×140 mm. The reagents used are copper sulfate solution ($CuSO_4.5H_2O$) 100.0%; Citric acid 50.0%, Hydrochloric acid 37% (1.37%) and demineralized DM-water (1000).

The coated panel is slowly bent over a small bar and an impact tool is attached to the top of the tester. The bent panel is bent over the anvil with one side touching the stop plate. The panel is deformed by the free-falling impact tool. The impact tool is lifted from the anvil, and the deformed panel is removed and dipped into copper sulphate solution for 5 minutes.

The non-damaged part of the coating on the bend is decisive and this is defined as the percentage crack free of a coating which is calculated as follows.

$$\% \ crackfree = \frac{mm. \ no \ cracking}{length \ of \ coating \ on \ panel \ (118 \ mm.)} \times 100\%$$

A "line of corrosion" is determined as follows. The starting point of measurement is the least sharp bend and the end point of measurement is the end of cracked area (indicated by the red-brown color from the reaction of the copper sulphate with the tinplate.

$$mm. \ no \ cracking = length \ of \ panel - length \ \text{"line of corrosion"}.$$

A crack free percentage of greater than 80% is considered very flexible.

vi. Flexibility (Asymmetric Box)

Flexibility may be measured using an Asymetric Box test. A box is stamped out of a sheet so the deformation is different than in the Wedgebend test. In most cases the asymmetric box is also sterilized in different environments, to assess flexibility. It is acceptable for a coating composition suitable for universal application that the sharpest edge of the box can be damaged. Assessment is on a visual scale where 5 denotes that the sharpest edge is not damaged, 4 denotes the sharpest edge is damaged, and 3 denotes that the following edge is also damaged.

vii. Flexibility (Reversed Impact)

Resistance to rapid deformation or Reversed Impact is another flexibility test. It is measured according ECCA-T5. A result of 70 inchpounds, or 8 J, on aluminum panels, is considered good.

viii. Sterilization Resistance and Pasteurization Resistance

Coatings that are intended for direct food contact may be evaluated to assess their resistance. The coatings are exposed to standard solutions and temperatures that simulate real practice pasteurization conditions of filled containers. The apparatus used to assess sterilization resistance are an PBI Beta 25 autoclave and PBI Mini-Matic autoclave. The apparatus used to assess pasteurization resistance are the electronic temperature sensor IKA-Werke ETS-D4 fussy and a hot plate. The reagents used are: Drinking water; 2% lactic acid in (DM) water; 2% citric acid in DM-water; 2% acetic acid in DM-water; 3% acetic acid in DM-water; 3% NaCl in DM-water; 2% NaCl+3% acetic acid in DM-water; and other requested solutions.

Sterilization resistance is tested under the following conditions (1 hour at 130° C., ±1.8 bar) and the method is as follows. Panels (at least 35 mm wide), cups or can ends are prepared for sterilization. An autoclave container with test material is placed in the autoclave. The autoclave is partly filled with water, so that the flat panels are dipped half in the water. Cups should be dipped completely. When using reagents others than water, the autoclave should not be filled (directly) with these solutions. Instead the material is placed in a glass jar, and the jar is placed the autoclave which is then filled with water until same level is reached as the solutions in the jar. The lid and the pressure valve of the autoclave are closed and the power supply connected and the requested sterilization sequence is set and then started. The pressure is released after sterilization by opening the pressure valve, and the container and panels are removed from the autoclave.

Pasteurization resistance is tested under the following conditions (45 minutes at 80° C.) and the method is as follows. Panels (at least 35 mm wide), cups or can ends are prepared for pasteurization. A glass is filled with drinking water which is heated with a hot plate to 80° C. (as measured by the electronic temperature sensor). The test items are placed in the water for 45 minutes and allowed to pasteurize and then the test panels are removed from the water.

Both sterilization and pasteurization are evaluated visually in the same manner. The panels are removed from the warm solution and rinsed with tap water immediately and then wiped dry immediately and placed with the coated side down onto a towel. The vapour and liquid phase are evaluated as are blushing, blisters, colour differences, softening and adhesion. Blushing, spots, corrosion and adhesion are each separately evaluated using the visual scale described herein (5=best, 1=worst). Can ends are evaluated only for the liquid phase. Porosity (small cracks) of the coating is also measured before and after sterilisation by measuring electric current.

For Can end, Porosity initially and after sterilization<10 mA.

For Can end Corrosion>4, adhesion>4, Blush>4.

For Flat plate in the gas phase>4.5.

For Flat plate in the liquid phase>4 for all environments.

ix. Chemical Resistance (MEK Rubs)

The degree of cross-linking of a coating is determined by means of its resistance against wiping a cloth which is wetted with a strong organic solvent. The apparatus used is a DJH Designs MEK rub test machine and Greenson 4×4 pads. The reagent used is methyl ethyl ketone (MEK). The coated panel to be tested is at least 13×3 cm and is taped or clamped onto the machine. The pad is wetted automatically with approx 2 mL MEK. The wet pad is moved automatically over a length of about 12 cm forwards and backward in one movement, which is repeated continuously with a pressure of 3 kg and a cycle time of about 1 second. One double rub is one cycle and the procedure is repeated for 100 cycles or until the coating is ruptured or dissolved and the bare metal (or the primer layer) becomes visible. Matt coatings become glossy during the MEK test but this is not rated as coating damage. After the test the coating is visually examined in the middle of the rubbed area and given a rating from 5 to 1 as indicated above. To be acceptable for use in many applications typically coatings have chemical resistance of at least 100 MEK double rubs. For coating cans MEK resistance is not a relevant criteria.

x. Outdoor Durability (QUV Test)

The QUV-test is a laboratory simulation of the damaging forces of weather, for the purpose of predicting the relative durability of coatings/materials exposed to the outdoor environment according to ASTMG 53-95. Apparatus used is a Q.U.V. accelerated weathering tester and eight fluorescent UV-B 313 lamps. Reagent used is demineralised water. Test panels/materials of 75×150 mm size were coated with the test coatings and exposed to test cycles for four hours of UV radiation at 50° C., relative humidity 40%. The test panels/materials are mounted in the specimen racks with the test surfaces facing the UV lamps. Empty spaces are filled with blank panels to maintain the test conditions within the chamber. The total time of exposure is measured by the apparatus. The gloss 20°, 60° and L*, a*, b* values are measured and the test is finished when for high gloss coatings: 20° gloss is <20% and for semi gloss coatings: 60° gloss is 50% of original gloss. According to to ECCA T10, 2000 hrs QUV-A is obtained for a good outdoor durable system. According to to ECCA T10, 1000 hrs QUV-B is obtained for a good outdoor durable system.

xi. Salt Spray Test

The resistance to salt spray fog was tested using ECCA test method T8. A neutral saltspray spray fog of 5% NaCL solution was used. The sample was designed according Option 2 in the test method. The back and edges of the panel were protected by adhesion tape. After 1000 hrs the panels were checked for adhesion loss, creep and blistering. Passing a Salt Spray test of 1000 hrs is considered good.

C. Hardness

In some embodiments, a substrate is characterized in that, after curing, the coating composition has a higher Konig hardness relative to a corresponding coating composition that lacks the block copolymer, wherein the Konig hardness is measured in accordance with DIN 53157/1-87. In some embodiments, a substrate is characterized in that, after curing, the coating composition has a Konig hardness that is at least 10%, at least 20%, at least 30%, at least 40%, at least 50%, at least 75%, at least 100, or at least 200%, higher relative to a corresponding coating composition that lacks the block copolymer, wherein the Konig hardness is measured in accordance with DIN 53157/1-87.

In some embodiments, a substrate is characterized in that, after curing, the coating composition has a higher Persoz hardness relative to a corresponding coating composition that lacks the block copolymer, wherein the Persoz hardness is measured in accordance with DIN 53157/11-87. In some embodiments, a substrate is characterized in that, after curing, the coating composition has a Persoz hardness that is at least 10%, at least 20%, at least 30%, at least 40%, at least 50%, at least 75%, at least 100, or at least 200%, higher relative to a corresponding coating composition that lacks the block copolymer, wherein the Persoz hardness is measured in accordance with DIN 53157/11-87.

In some embodiments, a substrate is characterized in that, after curing, the coating composition has a higher Pencil hardness relative to a corresponding coating composition that lacks the block copolymer, wherein the Pencil hardness is measured in accordance with ISO 15184:1998. In some embodiments, a substrate is characterized in that, after curing, the coating composition has a Pencil hardness that is at least 10%, at least 20%, at least 30%, at least 40%, at least 50%, at least 75%, at least 100, or at least 200%, higher relative to a corresponding coating composition that lacks the block copolymer, wherein the Pencil hardness is measured in accordance with ISO 15184:1998.

D. Flexibility

In some embodiments, a substrate is characterized in that, after curing, the coating composition has a lower T-bend flexibility relative to a corresponding coating composition that lacks the block copolymer, wherein the T-bend flexibility is measured in accordance with EN 13523-7:2001. In some embodiments, a substrate is characterized in that, after curing, the coating composition has a T-bend flexibility that is at least 10%, at least 20%, at least 30%, at least 40%, at least 50%, at least 75%, at least 100, or at least 200%, lower relative to a corresponding coating composition that lacks the block copolymer, wherein the T-bend flexibility is measured in accordance with EN 13523-7:2001.

E. Corrosion Resistance

In some embodiments, a substrate is characterized in that, after curing, the coating composition has a higher corrosion resistance relative to a corresponding coating composition that lacks the block copolymer, wherein the corrosion resistance is measured as described above. In some embodiments, a substrate is characterized in that, after curing, the coating composition has a corrosion resistance that is at least 10%, at least 20%, at least 30%, at least 40%, at least 50%, at least 75%, at least 100, or at least 200%, lower relative to a corresponding coating composition that lacks the block copolymer, wherein the corrosion resistance is measured as described above.

F. Hydrolysis Resistance

In some embodiments, a substrate is characterized in that, after curing, the coating composition has an improved hydrolysis resistance relative to a corresponding coating composition that lacks the block copolymer, wherein the hydrolysis resistance is measured as described above. In some embodiments, a substrate is characterized in that, after curing, the coating composition has a hydrolysis resistance that is at least 10%, at least 20%, at least 30%, at least 40%, at least 50%, at least 75%, at least 100, or at least 200%, lower relative to a corresponding coating composition that lacks the block copolymer, wherein the hydrolysis resistance is measured as described above.

G. Sterilization Resistance

In some embodiments, a substrate is characterized in that, after curing, the coating composition has an improved sterilization resistance relative to a corresponding coating composition that lacks the block copolymer, wherein the sterilization resistance is measured as described above. In some embodiments, a substrate is characterized in that, after curing, the coating composition has a sterilization resistance that is at least 10%, at least 20%, at least 30%, at least 40%, at least 50%, at least 75%, at least 100, or at least 200%, lower relative to a corresponding coating composition that lacks the block copolymer, wherein the sterilization resistance is measured as described above.

H. Outdoor Durability

In some embodiments, a substrate is characterized in that, after curing, the coating composition has an improved outdoor durability relative to a corresponding coating composition that lacks the block copolymer, wherein the outdoor durability is measured in accordance with the QUV-test. In some embodiments, a substrate is characterized in that, after curing, the coating composition has an outdoor durability that is at least 10%, at least 20%, at least 30%, at least 40%, at least 50%, at least 75%, at least 100, or at least 200%, lower relative to a corresponding coating composition that lacks the block copolymer, wherein the outdoor durability is measured in accordance with the QUV-test.

I. Chemical Resistance

In some embodiments, a substrate is characterized in that, after curing, the coating composition has an improved chemical resistance relative to a corresponding coating composition that lacks the block copolymer, wherein the chemical resistance is measured in accordance with the salt-spray test described above. In some embodiments, a substrate is characterized in that, after curing, the coating composition has a chemical resistance that is at least 10%, at least 20%, at least 30%, at least 40%, at least 50%, at least 75%, at least 100, or at least 200%, lower relative to a corresponding coating composition that lacks the block copolymer, wherein the chemical resistance is measured in accordance with the salt-spray test described above.

V. Polyurethane Adhesive Compositions

In another aspect, a composition of the present invention is an adhesive composition. In certain embodiments, the polyurethane adhesive compositions comprise the reaction product of one or more isocyanates and a composition comprising a polyurethane and a block copolymer defined above.

A. Reactive 1-Component Polyurethane Adhesives

In one aspect, the present invention encompasses reactive one-component adhesives. In certain embodiments, such one-component adhesives compositions are derived from a composition comprising a polyurethane and a block copolymer as defined above and in the embodiments and examples herein.

In certain embodiments the one-component adhesives are prepolymers made with one or more polyols; these prepolymers typically have low isocyanate values and are produced by reacting an excess of isocyanate with a relatively high molecular weight polyol. These adhesives are typically cured with water which can be added or which is present in the atmosphere or the material being bonded.

In certain embodiments MDI is the preferred isocyanate to react with one or more polyols and optionally one or more other polyols as described above. In certain embodiments requiring unique adhesive performance properties, TDI and/or aliphatic isocyanates are used in place of, or in addition to, MDI.

In certain embodiments the one component adhesives comprise 100% solids (e.g. no solvent is present at the time of application). In certain embodiments, the one component adhesives formulations may be dissolved, dispersed, and/or emulsified in a solvent or water to reduce viscosity or otherwise improve the applicability of the one component adhesive in these applications.

In certain embodiments no catalysts are used. In certain embodiments catalysts are included in the formulation to increase the reaction rate of free isocyanate and water.

In certain embodiments, hydroxyethyl acrylate groups may be included in the aliphatic polycarbonate polyol, other polyols, and/or the derivative prepolymers to introduce ultraviolet light curing properties.

In certain embodiments, fatty acid groups and/or other molecules with unsaturation functionality may be included in polyols and/or the derivative prepolymers to enable cross linking via oxidation.

In certain embodiments, the 1-component adhesive mixture forms a final, cured polyurethane adhesive with the following composition:
  1-80 parts by weight of one or more isocyanate components or pre-polymers based on isocyanate components as described above and in the specific embodiments and examples herein;
  20-99 parts by weight of a polyol component or a polyol-based pre-polymer component described above and in the specific embodiments and examples herein;
  0.1-10 parts by weight of a block copolymer component described above and in specific embodiments herein;
  0 to 1 parts by weight of one or more catalysts as described above and in the specific embodiments and examples herein;
  0 to 20 parts by weight of one or more chain extenders, wherein the chain extenders molecules are substantially as described above and in the specific embodiments and examples herein; and
  0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardants as described above and in the specific embodiments and examples herein.

B. Reactive 2-Component Polyurethane Adhesives

In another aspect, the present invention encompasses reactive two-component adhesive compositions. In certain embodiments, such two-component adhesive compositions are derived from a composition comprising a polyurethane and a block copolymer as defined above and in the embodiments and examples herein.

In certain embodiments the two-component adhesives include prepolymers derived from one or more polyols. These prepolymers can be produced with excess isocyanate and/or excess hydroxyl content and are then mixed with one or more of the isocyanates, polyols, and other components described above.

In certain embodiments, the two-component adhesives are formulated to an isocyanate index range of 90 to 150. In certain embodiments, isocyanate indexes above 100 are used to increase hardness of the adhesive and to improve bonding to substrates, in particular those substrates with hydroxyl groups on their surfaces. In certain embodiments, isocyanate indexes below 100 are used to produce softer and more flexible adhesives.

In certain embodiments MDI is the preferred isocyanate used in the formulation of the two-component adhesives. In certain embodiments TDI is the preferred isocyanate used in the formulation of the two-component adhesives. In certain embodiments these isocyanates have a functionality greater than two, and may be polymeric. In certain embodiments other isocyanates are used, including aliphatic isocyanates in cases where resistance to ultraviolet light is a requirement.

In certain embodiments, the two-component adhesives are formulated with isocyanates and/and or polyols which are 2.0 functional or lower. In certain embodiments the adhesives are formulated with isocyanates and/or polyols functionality greater than 2.0 (in other words, some degree of branching) to introduce cross-linking in the cured two-component adhesives. In certain embodiments, the total level of crosslinking is relatively high to produce adhesives with high modulus, high hardness, and good tensile, shear stress, and peel strength properties. In certain embodiments, the total level of crosslinking is relatively low to produce adhesives with greater elasticity.

In certain embodiments the two-component adhesives are applied as 100% solids. In certain embodiments, the two component adhesives may be dissolved, dispersed, and/or emulsified in a solvent or water to reduce viscosity or otherwise improve their applicability. In certain embodiments, solvents such as acetone, methyl ethyl ketone, ethylacetate, toluene, or xylene are preferred.

In certain embodiments no fillers are present in the two-component adhesives. In other embodiments calcium carbonate, talc, clays, or the like are added as fillers to control rheology, reduce shrinkage, reduce cost, and/or for other reasons. In certain embodiments the two-component adhesives include thixotropic agents, flow agents, film-forming additives, and/or catalysts to achieve the processing and finished adhesives properties required.

In certain embodiments, the 2-component adhesive mixture forms a final, cured polyurethane adhesive with the following composition:
  10-40 parts by weight of one or more isocyanate components or pre-polymers based on isocyanate components as described above and in the specific embodiments and examples herein;
  60-90 parts by weight of a polyol component or a polyol-based pre-polymer component described above and in the specific embodiments and examples herein;
  0.1-10 parts by weight of a block copolymer component described above and in specific embodiments herein;
  0 to 1 parts by weight of one or more catalysts as described above and in the specific embodiments and examples herein;
  0 to 20 parts by weight of one or more chain extenders, wherein the chain extenders molecules are substantially as described above and in the specific embodiments and examples herein; and
  0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardants as described above and in the specific embodiments and examples herein.

C. Hot-Melt Polyurethane Adhesives

In one aspect, the present invention encompasses reactive hot melt adhesives. In certain embodiments, such reactive hot melt adhesive compositions are derived from a composition comprising a polyurethane and a block copolymer as defined above and in the embodiments and examples herein.

In certain embodiments the hot-melt adhesives include prepolymers derived from one polyols. These prepolymers can be produced with excess isocyanate and/or excess hydroxyl content and are then mixed with one or more of the isocyanates, polyols, and other components described above. In certain embodiments the molar ratio of isocyanate to polyol is between 1.5:1 and 4:1, preferably between 1.9:1 and 3:1, and often very near 2:1.

In certain embodiments, MDI is the preferred isocyanate to react with one or more aliphatic polyols and possibly one or more other polyols as described above. In certain embodiments requiring unique hot melt adhesive performance properties, TDI and/or aliphatic isocyanates are used in place of or in addition to MDI.

In certain embodiments the reactive hot melt adhesive prepolymers are produced by reacting an excess of isocyanate with a relatively high molecular weight polyol. These prepolymers thus have an excess of isocyanate, or "free" isocyanate groups, which react with atmospheric moisture to improve the finished properties of the reactive hot melt adhesive. In certain embodiments the amount of free isocyante is about 1-5 percent by weight.

In certain embodiments the polyols, isocyanates, and/or prepolymers comprising the primary components of the reactive hot melt adhesive are formulated such that the viscosity of the adhesive formulation is sufficiently low at the application temperature to enable efficient application to the substrate. The reactive hot melt viscosity increases as it cools to rapidly provide good adhesive properties.

In certain embodiments, the reactive hot melt polyurethane adhesive mixture forms a final, cured polyurethane adhesive with the following composition:
  5-40 parts by weight of one or more isocyanate components or pre-polymers based on isocyanate components as described above and in the specific embodiments and examples herein;
  60-95 parts by weight of a polyol component or a polyol-based pre-polymer component described above and in the specific embodiments and examples herein;
  0.1-10 parts by weight of a block copolymer component described above and in specific embodiments herein;
  0 to 1 parts by weight of one or more catalysts as described above and in the specific embodiments and examples herein;
  0 to 20 parts by weight of one or more chain extenders, wherein the chain extenders molecules are substantially as described above and in the specific embodiments and examples herein; and
  0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardants as described above and in the specific embodiments and examples herein.

D. Non-Reactive Solvent-Borne Polyurethane Adhesive

In another aspect, the present invention encompasses non-reactive solvent-borne adhesives. In certain embodiments, such solvent-borne adhesives compositions are derived a composition comprising a polyurethane and a block copolymer as defined above and in the embodiments and examples herein.

In certain embodiments the solvent-borne adhesives are produced by reacting one or more polyols with one or more isocyanates and/or all other additives described above to create higher molecular weight prepolymers and/or polyurethane adhesives. These high molecular weight polyurethanes are then dissolved in one or more solvents for application onto various substrates. In these embodiments the solvent-borne adhesive is described as a one-component system. Additional fillers and performance enhancing additives may be included in the formulation.

In certain embodiments, solvent-borne cross-linkers are added to solvent-born polyurethane adhesives as described above to improve the strength and resistance of the finished adhesive. The crosslinkers may be any combination polyols and isocyanates described above and may also be other types of thermosetting components. In these embodiments the solvent-borne adhesive is described as a two-component reactive system and are thus similar and/or equivalent to the two-component reactive adhesives described above, in the embodiments in which these systems are dissolved in one or more solvents.

In certain embodiments, the non-reactive solvent-borne adhesive mixture forms a final, cured polyurethane adhesive with the following composition:
- 5-30 parts by weight of one or more isocyanate components or pre-polymers based on isocyanate components as described above and in the specific embodiments and examples herein;
- 70-95 parts by weight of a polyol component or a polyol-based pre-polymer component described above and in the specific embodiments and examples herein;
- 0.1-10 parts by weight of a block copolymer component described above and in specific embodiments herein;
- 0 to 1 parts by weight of one or more catalysts as described above and in the specific embodiments and examples herein;
- 0 to 20 parts by weight of one or more chain extenders, wherein the chain extenders molecules are substantially as described above and in the specific embodiments and examples herein; and
- 0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardants as described above and in the specific embodiments and examples herein.

E. Non-Reactive Water-Borne Adhesive

In one aspect, the present invention encompasses reactive water-borne adhesives. In certain embodiments, such water-borne adhesives compositions are derived from a composition comprising a polyurethane and a block copolymer as defined above and in the embodiments and examples herein.

In certain embodiments the water-borne adhesives are produced by reacting one or more polyols with one or more isocyanates and/or all other additives described above to create higher molecular weight prepolymers and/or polyurethane adhesives, which are then dispersed in water and known as polyurethane dispersions (PUDs). In certain embodiments, they may contain low levels of solvents to help stabilize the polymers in water.

In certain embodiments, the solids content of the final PUD adhesive is in the range of 25-75%, preferably in the range of 35-50%. In certain embodiments, the water-borne adhesives are formulated to be on the very high or low end of these ranges depending on viscosity requirements, other processing considerations, and finished adhesive properties required.

In certain embodiments, water-borne cross-linkers are added to water-born PUDs as described above to improve the performance of the finished adhesive. The crosslinkers may be any combination of polyols and isocyanates described above and may also be other types of thermosetting components. In these embodiments the water-borne adhesive is akin to the two-component reactive system described above (except it is dispersed in an aqueous system) in the embodiments in which these systems are dispersed or emulsified in water.

In certain embodiments, the non-reactive water-borne adhesive mixture forms a final, cured polyurethane adhesive with the following composition:
- 20-50 parts by weight of one or more isocyanate components or pre-polymers based on isocyanate components as described above and in the specific embodiments and examples herein;
- 50-80 parts by weight of a polyol component or a polyol-based pre-polymer component described above and in the specific embodiments and examples herein;
- 0.1-10 parts by weight of a block copolymer component described above and in specific embodiments herein;
- 0 to 1 parts by weight of one or more catalysts as described above and in the specific embodiments and examples herein;
- 0 to 20 parts by weight of one or more chain extenders, wherein the chain extenders molecules are substantially as described above and in the specific embodiments and examples herein; and
- 0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardants as described above and in the specific embodiments and examples herein.

F. Non-Reactive Hot Melt Adhesives

In one aspect, the present invention encompasses non-reactive hot melt adhesives. In certain embodiments, such non-reactive hot melt adhesives compositions are derived from a composition comprising a polyurethane and a block copolymer as defined above and in the embodiments and examples herein.

In certain embodiments the non-reactive hot melt adhesives are produced by reacting one or more polyols with one or more isocyanates an and/or all other additives described above to create higher molecular weight polymers and/or polyurethane adhesives. Additional fillers and performance enhancing additives may be included in the formulation.

In certain embodiments the polyols, isocyanates, prepolymers and/or polyurethane adhesives comprising the primary components of the non-reactive hot melt adhesive are formulated such that the viscosity of the adhesive formulation is sufficiently low at the application temperature to enable efficient application to the substrate. The non-reactive hot melt viscosity increases as it cools to rapidly provide good adhesive properties. In certain applications, they are formulated to have melt viscosities between 25,000 and 500,000 mPa*s, more preferable between 50,000 to 250,000 mPa*s.

In certain embodiments, the non-reactive hot-melt adhesive mixture forms a final, cured polyurethane adhesive with the following composition:
- 1-80 parts by weight of one or more isocyanate components or pre-polymers based on isocyanate components as described above and in the specific embodiments and examples herein;

20-99 parts by weight of a polyol component or a polyol-based pre-polymer component described above and in the specific embodiments and examples herein;

0.1-10 parts by weight of a block copolymer component described above and in specific embodiments herein;

0 to 1 parts by weight of one or more catalysts as described above and in the specific embodiments and examples herein;

0 to 20 parts by weight of one or more chain extenders, wherein the chain extenders molecules are substantially as described above and in the specific embodiments and examples herein; and 0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardants as described above and in the specific embodiments and examples herein.

G. Hybrid Systems

In certain embodiments, any of the above reactive and non-reactive adhesive formulations are combined with other adhesive chemistries in hybrid systems. In certain embodiments, the finished adhesives are urethane acrylic systems which can take a number of forms, including aqueous systems using water-dispersable isocyanates with PUDs and acrylic emulsion polymers, mixing acrylic and hydroxyl polyols to create co-polymerized resins, and the like. In certain embodiments, vinyl-terminated acrylic polymers are used to improve impact resistance. In certain embodiments, polyurethanes with acrylic functionality are also used in anaerobic or radiation-cured adhesives to increase toughness. In certain embodiments, urethanes are combined with epoxy chemistries using amine curing systems to create fast-curing adhesives for structural and heavy duty applications.

VI. Adhesives with Improved Properties

A. Improved High Temperature Strength

Adhesives provide by the present invention have unique and unexpected properties. As described above, the block copolymers incorporated into adhesives of the present invention differ from existing commercial adhesive compositions. Without being bound by theory or thereby limiting the scope of the invention, one possibility is that the incorporation of a block copolymer as described above and herein leads to the unexpected increases in desirable properties such as adhesion and high temperature strength.

In certain embodiments, the present invention encompasses adhesives comprising a polyurethane and a block copolymer and characterized in that the cured adhesives have unexpectedly high strength at elevated temperatures. The high strength at elevated temperature can be demonstrated by measuring the strength of the cured adhesive strength on metal substrate using the ASTM D1002 lap sheer test at ambient temperature and then performing the same measurement at one or more elevated temperatures.

In certain embodiments, adhesives fo the present invention (i.e., any of the adhesive compositions described hereinabove) are characterized in that the strength of the cured bond formed by the adhesive composition between two specimens of the substrate has a greater strength relative to a corresponding adhesive composition that lacks the block copolymer, wherein the strength is measured by an ASTM D1002 lap sheer test. In certain embodiments, adhesives of the present invention are characterized in that the strength of the cured adhesive measured is least 5%, is least 10%, at least 20%, at least 30%, at least 40%, at least 50%, at least 60%, at least 70%, at least 80%, at least 90%, at least 100%, at least 150%, or at least 200% greater than the corresponding adhesive composition that lacks the block copolymer. In certain embodiments, the strengths compared above are indicated by a measurement selected from the group consisting of: Load at Failure; Tensile Energy to Break; Stress at Yield; and Strain at Yield.

In certain embodiments, adhesives of the present invention (i.e. any of the adhesive compositions described hereinabove) are characterized in that the strength of the cured bond formed by the adhesive composition between two specimens retains at least 50% of its room temperature strength when heated to a temperature of 50° C. In some embodiments the strength is measured using ASTM D1002. In certain embodiments, adhesives of the present invention are characterized in that the strength of the cured bond formed by the adhesive composition between two specimens measured at 50° C. is least 5%, least 10%, least 20%, least 30%, least 40%, least 50%, least 60%, least 65%, at least 70%, at least 75%, at least 80%, at least 85%, at least 90%, at least 92%, at least 95%, or at least 98%; or between about 5% and about 10%, about 5% and about 25%, about 5% and about 50%, about 5% and about 75%, about 5% and about 100%, about 10% and about 100%, about 25% and about 100%, about 50% and about 100%, about 75% and about 100%, about 20% and about 80%, and about 40% and about 60% of the strength measured using the same procedure at room temperature. In certain embodiments, adhesives of the present invention are characterized in that the strength of the cured bond formed by the adhesive composition between two specimens measured at 70° C. is least 5%, least 10%, least 20%, least 30%, least 40%, least 50%, least 60%, least 65%, at least 70%, at least 75%, at least 80%, at least 85%, at least 90%, at least 92%, at least 95%, or at least 98%; or between about 5% and about 10%, about 5% and about 25%, about 5% and about 50%, about 5% and about 75%, about 5% and about 100%, about 10% and about 100%, about 25% and about 100%, about 50% and about 100%, about 75% and about 100%, about 20% and about 80%, and about 40% and about 60% of the strength measured using the same procedure at room temperature. In certain embodiments, the strengths compared above are indicated by a measurement selected from the group consisting of: Load at Failure; Tensile Energy to Break; Stress at Yield; and Strain at Yield.

In certain embodiments, adhesives of the present invention (i.e. any of the adhesive compositions described hereinabove) are characterized in that the strength of the cured bond formed by the adhesive composition between two specimens indicated by Load at Failure measured using ASTM D1002 at 50° C. is at least 60% of the Load at Failure measured using the same procedure at 25° C. In certain embodiments, adhesives of the present invention are characterized in that the Load at Failure of the cured adhesive measured at 50° C. is least 65%, at least 70%, at least 75%, at least 80%, at least 85%, at least 90%, at least 92%, at least 95%, or at least 98% of the Load at Failure measured using the same procedure at 25° C. In certain embodiments, adhesives of the present invention are characterized in that the Load at Failure of the cured adhesive measured at 50° C. is between 50 and 100% of the Load at Failure measured using the same procedure at 25° C. In certain embodiments, adhesives of the present invention are characterized in that the Load at Failure of the cured adhesive measured at 50° C. is between 50% and 80%, between 70% and 80%, between 60% and 80%, between 70% and 100%, or between 80% and 100% of the Load at Failure measured using the same procedure at 25° C.

In certain embodiments, adhesives of the present invention (i.e. any of the adhesive compositions described hereinabove) are characterized in that the strength of the cured bond formed by the adhesive composition between two specimens indicated by the Tensile Energy to Break measured using ASTM D1002 at 50° C. is at least 60% of the Tensile Energy to Break measured using the same procedure at 25° C. In certain embodiments, adhesives of the present invention are characterized in that the Tensile Energy to Break the cured adhesive measured at 50° C. is least 65%, at least 70%, at least 75%, at least 80%, at least 85%, at least 90%, at least 92%, at least 95%, or at least 98% of the Tensile Energy to Break measured using the same procedure at 25° C. In certain embodiments, adhesives of the present invention are characterized in that the Tensile Energy to Break the cured adhesive measured at 50° C. is between 50 and 100% of the Tensile Energy to Break measured using the same procedure at 25° C. In certain embodiments, adhesives of the present invention are characterized in that the Tensile Energy to Break the cured adhesive measured at 50° C. is between 50% and 80%, between 70% and 80%, between 60% and 80%, between 70% and 100%, or between 80% and 100% of the Tensile Energy to Break measured using the same procedure at 25° C.

In certain embodiments, adhesives of the present invention (i.e. any of the adhesive compositions described hereinabove) are characterized in that the strength of the cured bond formed by the adhesive composition between two specimens indicated by Stress at Yield or Strain at Yield measured using ASTM D1002 at 50° C. is at least 60% of the corresponding parameter measured using the same procedure at 25° C. In certain embodiments, adhesives of the present invention are characterized in that the Stress at Yield or Strain at Yield of the cured adhesive measured at 50° C. is least 65%, at least 70%, at least 75%, at least 80%, at least 85%, at least 90%, at least 92%, at least 95%, or at least 98% of the corresponding parameter measured using the same procedure at 25° C. In certain embodiments, adhesives of the present invention are characterized in that the Stress at Yield or Strain at Yield of the cured adhesive measured at 50° C. is between 50 and 100% of the corresponding parameter measured using the same procedure at 25° C. In certain embodiments, adhesives of the present invention are characterized in that the Stress at Yield or Strain at Yield of the cured adhesive measured at 50° C. is between 50% and 80%, between 70% and 80%, between 60% and 80%, between 70% and 100%, or between 80% and 100% of the corresponding parameter measured using the same procedure at 25° C.

In certain embodiments, adhesives of the present invention (i.e. any of the adhesive compositions described hereinabove) are characterized in that the strength of the cured adhesive measured using ASTM D1002 at 50° C. is greater than the strength at 25° C. In certain embodiments, adhesives of the present invention are characterized in that the strength of the cured adhesive measured using ASTM D1002 at 50° C. is at least 10% higher than the strength measured using the same procedure at 25° C. In certain embodiments, adhesives of the present invention are characterized in that the strength of the cured adhesive at 50° C. is at least 15%, at least 20%, at least 30%, at least 40%, at least 50%, at least 75%, at least 100%, or at least 150% greater than the strength measured using the same procedure at 25° C. In certain embodiments, adhesives of the present invention are characterized in that the strength of the cured adhesive measured at 50° C. is between 100% and 200%, between 100% and 150%, between 120% and 180%, between 120% and 150%, or between 100% and 120% of the strength measured using the same procedure at 25° C. In certain embodiments, the strengths compared above are indicated by a measurement selected from the group consisting of: Load at Failure; Tensile Energy to Break; Stress at Yield; and Strain at Yield. In certain embodiments, the strengths compared above are indicated by a measurement selected from the group consisting of: Load at Failure; Tensile Energy to Break; and Strain at Yield.

In certain embodiments, adhesives of the present invention (i.e. any of the adhesive compositions described hereinabove) are characterized in that the strength of the cured bond formed by the adhesive composition between two specimens indicated by Load at Failure measured using ASTM D1002 at 50° C. is greater than the Load at Failure at 25° C. In certain embodiments, adhesives of the present invention are characterized in that the Load at Failure of the cured adhesive measured using ASTM D1002 at 50° C. is at least 10% higher than the Load at Failure measured using the same procedure at 25° C. In certain embodiments, adhesives of the present invention are characterized in that the Load at Failure of the cured adhesive at 50° C. is at least 15%, at least 20%, at least 30%, at least 40%, at least 50%, at least 75%, at least 100%, or at least 150% greater than the Load at Failure at 25° C. In certain embodiments, adhesives of the present invention are characterized in that the Load at Failure of the cured adhesive measured at 50° C. is between 100% and 200%, between 100% and 150%, between 120% and 180%, between 120% and 150%, or between 100% and 120% of the Load at Failure measured using the same procedure at 25° C.

In certain embodiments, adhesives of the present invention (i.e. any of the adhesive compositions described hereinabove) are characterized in that the strength of the cured bond formed by the adhesive composition between two specimens indicated by the Tensile Energy to Break measured using ASTM D1002 at 50° C. is greater than the Tensile Energy to Break at 25° C. In certain embodiments, adhesives of the present invention are characterized in that the Tensile Energy to Break the cured adhesive measured using ASTM D1002 at 50° C. is at least 10% higher than the Tensile Energy to Break measured using the same procedure at 25° C. In certain embodiments, adhesives of the present invention are characterized in that the Tensile Energy to Break the cured adhesive at 50° C. is at least 15%, at least 20%, at least 30%, at least 40%, at least 50%, at least 75%, at least 100%, or at least 150% greater than the Tensile Energy to Break the adhesive at 25° C. In certain embodiments, adhesives of the present invention are characterized in that the Tensile Energy to Break the cured adhesive measured at 50° C. is between 100% and 200%, between 100% and 150%, between 120% and 180%, between 120% and 150%, or between 100% and 120% of the Tensile Energy to Break the adhesive at 25° C.

In certain embodiments, adhesives of the present invention (i.e. any of the adhesive compositions described hereinabove) are characterized in that the strength of the cured bond formed by the adhesive composition between two specimens indicated by the Strain at Yield measured using ASTM D1002 at 50° C. is greater than the Strain at Yield at 25° C. In certain embodiments, adhesives of the present invention are characterized in that the Strain at Yield of the cured adhesive measured using ASTM D1002 at 50° C. is at least 10% higher than the Strain at Yield measured using the same procedure at 25° C. In certain embodiments, adhesives of the present invention are characterized in that the Strain at Yield of the cured adhesive at 50° C. is at least 15%, at least 20%, at least 30%, at least 40%, at least 50%, at least 75%, at least 100%, or at least 150% greater than the Strain at Yield of the adhesive at 25° C. In certain embodiments, adhesives of the present invention are characterized in that the Strain at Yield of the cured adhesive measured at 50° C. is between 100% and 200%, between 100% and 150%, between 120% and 180%, between 120% and 150%, or between 100% and 120% of the Strain at Yield of the adhesive at 25° C.

In certain embodiments, adhesives of the present invention (i.e. any of the adhesive compositions described hereinabove) are characterized in that the strength of the cured adhesive measured using ASTM D1002 at 70° C. retains at least 40% of the strength measured using the same procedure at 25° C. In certain embodiments, adhesives of the present invention are characterized in that the strength of the cured adhesive measured at 50° C. is least 55%, at least 60%, at least 65%, at least 70%, at least 75%, or at least 80% of the strength measured using the same procedure at 25° C. In certain embodiments, adhesives of the present invention are characterized in that the strength of the cured adhesive measured at 70° C. is between 40% and 100% of the strength measured using the same procedure at 25° C. In certain embodiments, adhesives of the present invention are characterized in that the strength of the cured adhesive measured at 70° C. is between 40% and 80%, between 40% and 60%, between 50% and 80%, between 50% and 70%, or between 70% and 90% of the strength measured using the same procedure at 25° C. In certain embodiments, the strengths compared above are indicated by a measurement selected from the group consisting of: Load at Failure; Tensile Energy to Break; Stress at Yield; and Strain at Yield.

In certain embodiments, adhesives of the present invention (i.e. any of the adhesive compositions described hereinabove) are characterized in that the strength of the cured bond formed by the adhesive composition between two specimens indicated by the Strain at Yield measured using ASTM D1002 at 70° C. is greater than the Strain at Yield at 25° C. In certain embodiments, adhesives of the present invention are characterized in that the Strain at Yield of the cured adhesive measured using ASTM D1002 at 70° C. is at least 10% higher than the Strain at Yield measured using the same procedure at 25° C. In certain embodiments, adhesives of the present invention are characterized in that the Strain at Yield of the cured adhesive at 70° C. is at least 15%, at least 20%, at least 30%, at least 40%, at least 50%, at least 75%, at least 100%, or at least 150% greater than the Strain at Yield of the adhesive at 25° C. In certain embodiments, adhesives of the present invention are characterized in that the Strain at Yield of the cured adhesive measured at 70° C. is between 100% and 200%, between 100% and 150%, between 120% and 180%, between 120% and 150%, or between 100% and 120% of the Strain at Yield of the adhesive at 25° C.

B. Improved Resistance to Solvents

In another aspect, the present invention encompasses adhesive compositions comprising epoxide-$CO_2$-based polyols and block copolymers characterized in that the cured adhesive is highly resistant to solvents. Such solvent resistance properties are unexpected since analogous adhesives formulated with commercially available polycarbonate polyols (e.g. those having more than two carbon atoms enchained between adjacent carbonate linkages) are degraded by solvent to a greater degree than the adhesives of the present invention.

In certain embodiments, adhesive compositions of the present invention comprise epoxide-$CO_2$-based polyols and block copolymers and are further characterized in that they have excellent resistance to hydrocarbon solvents. In certain embodiments, adhesive compositions of the present invention are characterized in that they have superb resistance to aromatic hydrocarbons. In certain embodiments, the present invention comprises epoxide-$CO_2$-based polyols characterized in that they gain less than 5% mass when immersed in aromatic hydrocarbon liquid for 1 week. In certain embodiments, they gain less than 5% mass when immersed in toluene for 1 week. In certain embodiments, they gain less than 1% mass when immersed in xylenes for 1 week.

EQUIVALENTS

All material cited in this application, including, but not limited to, patents and patent applications, regardless of the format of such literature and similar materials, are expressly incorporated herein by reference in their entirety. In the event that one or more of the incorporated literature and similar materials differs from or contradicts this application, including but not limited to defined terms, term usage, described techniques, or the like, this application controls.

What is claimed is:

1. A composition comprising a polyurethane and a block copolymer comprising four or more homopolymer subunits selected from the group consisting of polyolefins and fluoropolymers,
wherein:
the block copolymer comprises one or more fluoropolymer subunits; and
the polyolefin homopolymer subunits of the block copolymer are selected from the group consisting of polyethylene subunits or $C_3$-$C_6$ α-polyolefin subunits.

2. The composition of claim 1, wherein the block copolymer comprises one or more polytetrafluoroethylene subunits.

3. The composition of claim 1, wherein the block copolymer comprises one or more polytetrafluoroethylene subunits and one or more polyethylene subunits.

4. The composition of claim 1, wherein each homopolymer subunit independently comprises between about 2 and about 200 repeating units.

5. The composition of claim 1, wherein the block copolymer has a $M_n$ between about 10,000 and about 500,000 g/mol.

6. The composition of claim 1, wherein the composition is an adhesive composition.

7. The composition of claim 1, wherein the composition is a coating composition.

8. A substrate coated with a composition of claim 1.

9. The coated substrate of claim 8, wherein the composition is an adhesive composition.

10. The coated substrate of claim 8, wherein the composition is a coating composition.

11. The composition of claim 1, wherein the composition comprises between about 3 weight percent and about 7 weight percent of the block copolymer.

12. The composition of claim 1, wherein the composition comprises between about 0.1 weight percent and about 10 weight percent of the block copolymer.

13. The composition of claim 1, wherein the block copolymer is a tetrablock copolymer.

14. The composition of claim 13, wherein the tetrablock copolymer comprises homopolymer subunits A and B arranged as A-B-A-B where "-" represents a covalent bond.

15. The composition of claim 1, wherein the block copolymer comprises one or more polyethylene subunits.

16. The composition of claim 1, wherein the block copolymer comprises one or more polypropylene subunits.

17. The composition of claim 1, wherein the block copolymer comprises one or more polyethylene subunits and one or more polypropylene subunits.

18. The composition of claim 1, wherein the block copolymer is a polytetrafluoroethylene/polyethylene tetrablock copolymer or a polytetrafluoroethylene/polypropylene tetrablock copolymer.

19. The coated substrate of claim 8 wherein the block copolymer is a tetrablock copolymer.

20. The coated substrate of claim 8 wherein the block copolymer is a polytetrafluoroethylene/polyethylene tetrablock copolymer or a polytetrafluoroethylene/polypropylene tetrablock copolymer.

* * * * *